(12) United States Patent
Morrison

(10) Patent No.: US 8,423,048 B2
(45) Date of Patent: *Apr. 16, 2013

(54) MOBILE ALERTING NETWORK

(75) Inventor: James Morrison, Henderson, NV (US)

(73) Assignee: Global Alert Network, Inc., Howard, PA (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/360,192

(22) Filed: Jan. 27, 2012

(65) Prior Publication Data

US 2012/0196625 A1    Aug. 2, 2012

Related U.S. Application Data

(63) Continuation of application No. 12/251,155, filed on Oct. 14, 2008, now Pat. No. 8,126,479, which is a continuation-in-part of application No. 11/970,922, filed on Jan. 8, 2008, now Pat. No. 8,099,113.

(51) Int. Cl.
  *H04W 24/00* (2009.01)
(52) U.S. Cl.
  USPC ...................................... 455/456.3
(58) Field of Classification Search ............. 455/456.6, 455/406, 456.3; 701/201, 213, 209, 211, 701/217, 202, 117, 36; 340/593.12, 995.19, 340/909, 905; 342/357.09, 357.1, 357.06, 342/342.12; 375/150
See application file for complete search history.

(56) References Cited

U.S. PATENT DOCUMENTS

| | | |
|---|---|---|
| 4,894,642 A | 1/1990 | Ashbaugh et al. |
| 5,021,780 A | 6/1991 | Fabiano et al. |
| 5,091,906 A | 2/1992 | Reed et al. |
| 5,181,027 A | 1/1993 | Shafer |
| 5,235,329 A | 8/1993 | Jackson |
| 5,289,181 A | 2/1994 | Watanabe et al. |
| 5,307,060 A | 4/1994 | Prevulsky et al. |
| 5,402,117 A | 3/1995 | Zijderhand |
| 5,440,489 A | 8/1995 | Newman |
| 5,554,982 A | 9/1996 | Shirkey et al. |
| 6,236,336 B1 | 5/2001 | Oliva et al. |
| 6,411,220 B1 | 6/2002 | Davis et al. |

(Continued)

FOREIGN PATENT DOCUMENTS

| | | |
|---|---|---|
| JP | 2003217088 A1 | 7/2003 |
| KR | 20030041112 A | 5/2003 |

(Continued)

OTHER PUBLICATIONS

"U.S. Appl. No. 11/970,922, Response filed Aug. 17, 2011 to Non Final Office Action mailed Jun. 21, 2011", 13 pgs.

(Continued)

*Primary Examiner* — Melody Mehrpour
(74) *Attorney, Agent, or Firm* — Schwegman Lundberg Woessner P.A.

(57) ABSTRACT

Systems and methods for sending messages to a mobile device based on a location determined by a receive-only sensor network are described. A method can include receiving a signal from a mobile device, detecting contextual parameters associated with the mobile device, preparing a message for the mobile device, and transmitting the message to the mobile device. The signal from the mobile device can be received on a receive-only sensor array. The contextual parameters can include at least a location associated with the mobile device. The message can be prepared based on the contextual parameters.

20 Claims, 38 Drawing Sheets

U.S. PATENT DOCUMENTS

| | | | |
|---|---|---|---|
| 6,590,507 B2 | 7/2003 | Burns | |
| 6,882,837 B2 | 4/2005 | Fernandez et al. | |
| 6,944,679 B2 | 9/2005 | Parupudi et al. | |
| 6,973,384 B2 | 12/2005 | Zhao et al. | |
| 6,990,407 B1 | 1/2006 | Mbekeani et al. | |
| 7,099,774 B2 | 8/2006 | King et al. | |
| 7,260,472 B2 | 8/2007 | Sutardja | |
| 7,319,931 B2 | 1/2008 | Uyeki et al. | |
| 7,385,499 B2 | 6/2008 | Horton et al. | |
| 7,502,687 B2 | 3/2009 | Flick | |
| 7,609,203 B2 | 10/2009 | Dockemeyer, Jr. et al. | |
| 7,653,480 B2 | 1/2010 | Tsuge et al. | |
| 7,764,946 B1 | 7/2010 | Sennett et al. | |
| 7,769,544 B2 | 8/2010 | Blesener et al. | |
| 7,898,407 B2 | 3/2011 | Hufton | |
| 8,099,113 B2 * | 1/2012 | Morrison | 455/456.6 |
| 8,126,479 B2 * | 2/2012 | Morrison | 455/456.3 |
| 8,126,480 B2 * | 2/2012 | Morrison | 455/456.3 |
| 2002/0103668 A1 | 8/2002 | Ecklund et al. | |
| 2003/0014187 A1 | 1/2003 | Chun et al. | |
| 2003/0046541 A1 | 3/2003 | Gerdes et al. | |
| 2004/0203851 A1 | 10/2004 | Vetro et al. | |
| 2005/0250440 A1 | 11/2005 | Zhou et al. | |
| 2005/0266894 A9 | 12/2005 | Rankin | |
| 2006/0089160 A1 | 4/2006 | Othmer | |
| 2006/0246911 A1 | 11/2006 | Petermann | |
| 2007/0091836 A1 | 4/2007 | Oprescu-Surcobe et al. | |
| 2007/0149214 A1 | 6/2007 | Walsh et al. | |
| 2007/0155411 A1 * | 7/2007 | Morrison | 455/466 |
| 2007/0265006 A1 | 11/2007 | Washok et al. | |
| 2007/0293210 A1 | 12/2007 | Strub et al. | |
| 2007/0299601 A1 | 12/2007 | Zhao et al. | |
| 2008/0083000 A1 | 4/2008 | Orrell et al. | |
| 2008/0133336 A1 | 6/2008 | Altman et al. | |
| 2008/0134276 A1 | 6/2008 | Orrell et al. | |
| 2008/0167017 A1 | 7/2008 | Wentker et al. | |
| 2009/0118995 A1 | 5/2009 | Zhao et al. | |
| 2009/0163183 A1 | 6/2009 | O'donoghue et al. | |
| 2009/0176511 A1 * | 7/2009 | Morrison | 455/456.3 |
| 2009/0176512 A1 | 7/2009 | Morrison | |
| 2009/0209233 A1 * | 8/2009 | Morrison | 455/411 |
| 2009/0233575 A1 * | 9/2009 | Morrison | 455/404.2 |
| 2009/0233633 A1 * | 9/2009 | Morrison | 455/466 |
| 2009/0299857 A1 | 12/2009 | Brubaker | |
| 2009/0315770 A9 | 12/2009 | Abraham et al. | |
| 2010/0069093 A1 | 3/2010 | Morrison | |
| 2012/0021763 A1 * | 1/2012 | Morrison | 455/456.1 |
| 2012/0086583 A1 * | 4/2012 | Morrison | 340/905 |

FOREIGN PATENT DOCUMENTS

| | | |
|---|---|---|
| KR | 1020030041112 A | 5/2003 |
| KR | 1020050017256 A | 2/2005 |
| KR | 1020070005762 A | 1/2007 |
| KR | 1020070071664 A | 7/2007 |
| WO | WO-2009089246 A2 | 7/2009 |
| WO | WO-2009089251 A2 | 7/2009 |

OTHER PUBLICATIONS

"U.S. Appl. No. 11/970,922, Final Office Action mailed Apr. 8, 2011", 20 pgs.

"U.S. Appl. No. 11/970,922, Non Final Office Action mailed Jun. 21, 2011", 6 pgs.

"U.S. Appl. No. 11/970,922, Non Final Office Action mailed Dec. 21, 2010", 18 pgs.

"U.S. Appl. No. 11/970,922, Notice of Allowance mailed Sep. 14, 2011", 5 pgs.

"U.S. Appl. No. 11/970,922, Response filed Mar. 21, 2011 to Non Final Office Action mailed Dec. 21, 2010", 17 pgs.

"U.S. Appl. No. 11/970,922, Response filed Jun. 8, 2011 to Final Office Action mailed Apr. 8, 2011", 20 pgs.

"U.S. Appl. No. 12/251,155, Non Final Office Action mailed Jun. 29, 2011", 14 pgs.

"U.S. Appl. No. 12/251,155, Notice of Allowance mailed Oct. 13, 2011", 5 pgs.

"U.S. Appl. No. 12/251,155, Response filed Sep. 29, 2011 to Non Final Office Action mailed Jun. 29, 2011", 12 pgs.

"U.S. Appl. No. 12/351,641, Non Final Office Action mailed Dec. 13, 2011", 10 pgs.

"U.S. Appl. No. 12/351,641, Notice of Allowance mailed Aug. 12, 2011", 6 pgs.

"U.S. Appl. No. 12/402,286, Advisory Action mailed Jul. 1, 2011", 3 pgs.

"U.S. Appl. No. 12/402,286, Decision on Pre-Appeal Brief mailed Aug. 23, 2011", 2 pgs.

"U.S. Appl. No. 12/402,286, Final Office Action mailed Apr. 14, 2011", 15 pgs.

"U.S. Appl. No. 12/402,286, Non Final Office Action mailed Jan. 3, 2011", 14 pgs.

"U.S. Appl. No. 12/402,286, Non Final Office Action mailed Oct. 31, 2011", 15 pgs.

"U.S. Appl. No. 12/402,286, Pre-Appeal Brief filed Jul. 14, 2011", 5 pgs.

"U.S. Appl. No. 12/402,286, Response filed Apr. 4, 2011 to Non Final Office Action mailed Jan. 3, 2011", 15 pgs.

"U.S. Appl. No. 12/402,286, Response filed Jun. 14, 2011 to Final Office Action mailed Apr. 14, 2011", 8 pgs.

"U.S. Appl. No. 12/402,310, Non Final Office Action mailed Apr. 7, 2011", 11 pgs.

"U.S. Appl. No. 12/566,012, Final Office Action mailed Aug. 11, 2011", 17 pgs.

"U.S. Appl. No. 12/566,012, Non Final Office Action mailed Apt. 20, 2011", 16 pgs.

"U.S. Appl. No. 12/566,012, Non Final Office Action mailed Dec. 28, 2010", 12 pgs.

"U.S. Appl. No. 12/566,012, Notice of Allowance mailed Oct. 19, 2011", 5 pgs.

"U.S. Appl. No. 12/566,012, Response filed Mar. 25, 2011 to Non Final Office Action mailed Dec. 28, 2010", 16 pgs.

"U.S. Appl. No. 12/566,012, Response filed Mar. 28, 2011 to Non Final Office Action mailed Dec. 28, 2010", 16 pgs.

"U.S. Appl. No. 12/566,012, Response filed Jul. 20, 2011 to Non Final Office Action mailed Apr. 20, 2011", 17 pgs.

"U.S. Appl. No. 12/566,012, Response filed Oct. 11, 2011 to Final Office Action mailed Aug. 11, 2011", 9 pgs.

"U.S. Appl. No. 13/323,111, Preliminary Amendment filed Dec. 12, 2011", 7 pgs.

"International Application No. PCT/US2009/030271, International Search Report mailed Aug. 20, 2009", 3 pgs.

"International Application No. PCT/US2009/030278, International Search Report mailed Aug. 27, 2009", 3 pgs.

"International Application No. PCT/US2009/030278, Written Opinion mailed Aug. 27, 2009", 4 pgs.

* cited by examiner

122 — determining a location of the mobile communicator from location data provided by mobile communication stations of a mobile communication network or from data provided by a global positioning system 123 — selecting the user-zone as an area centered at the location of the mobile communicator with a shape and extent

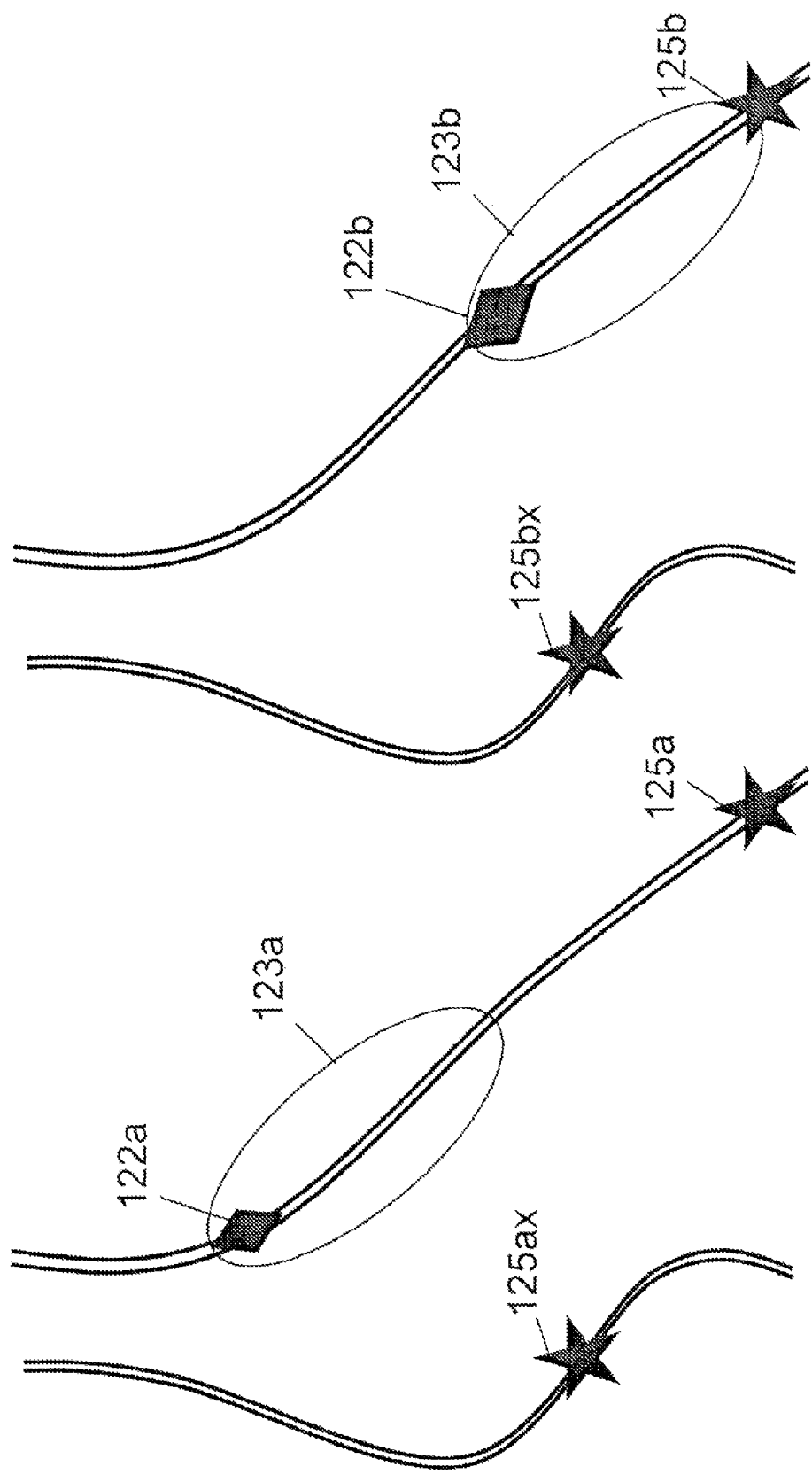

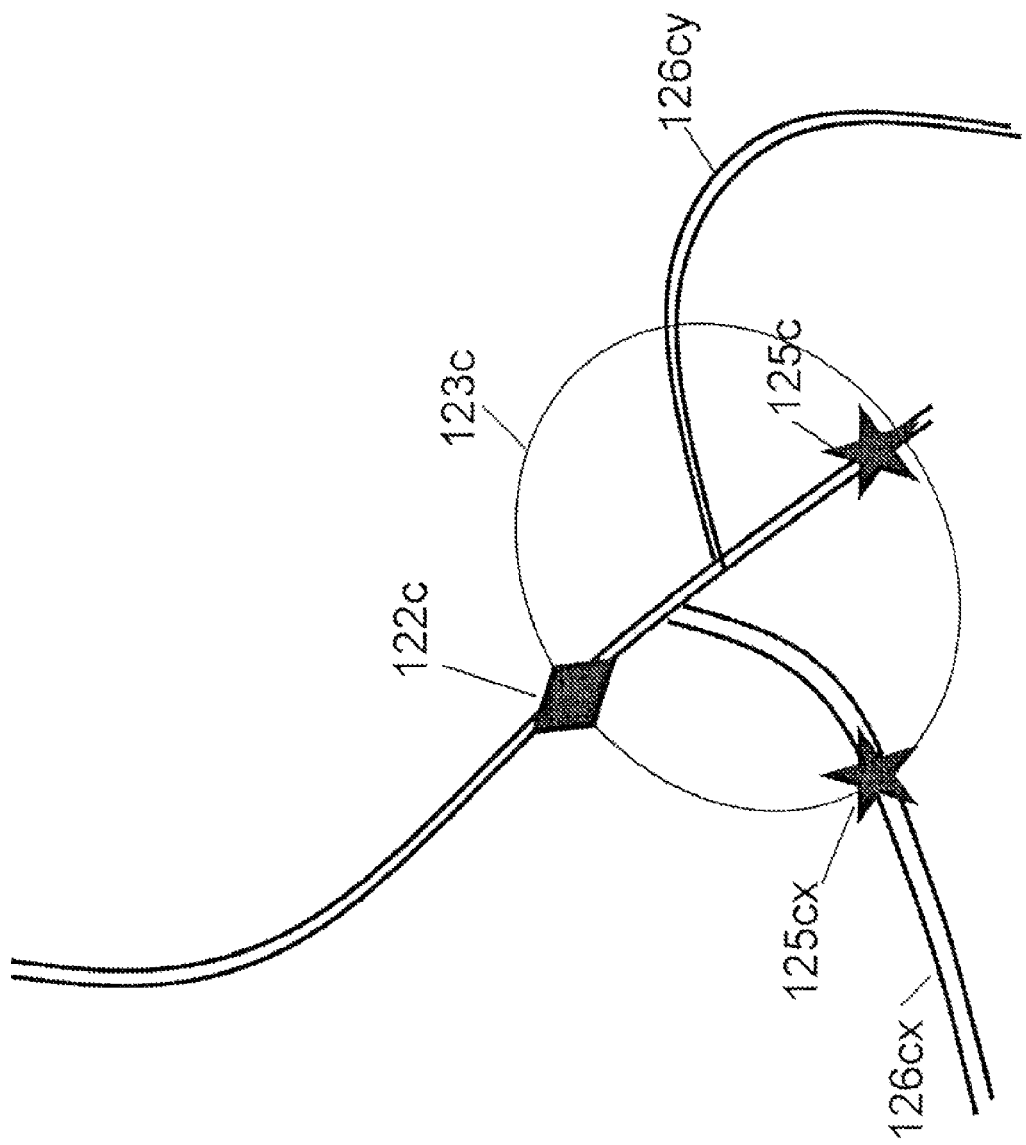

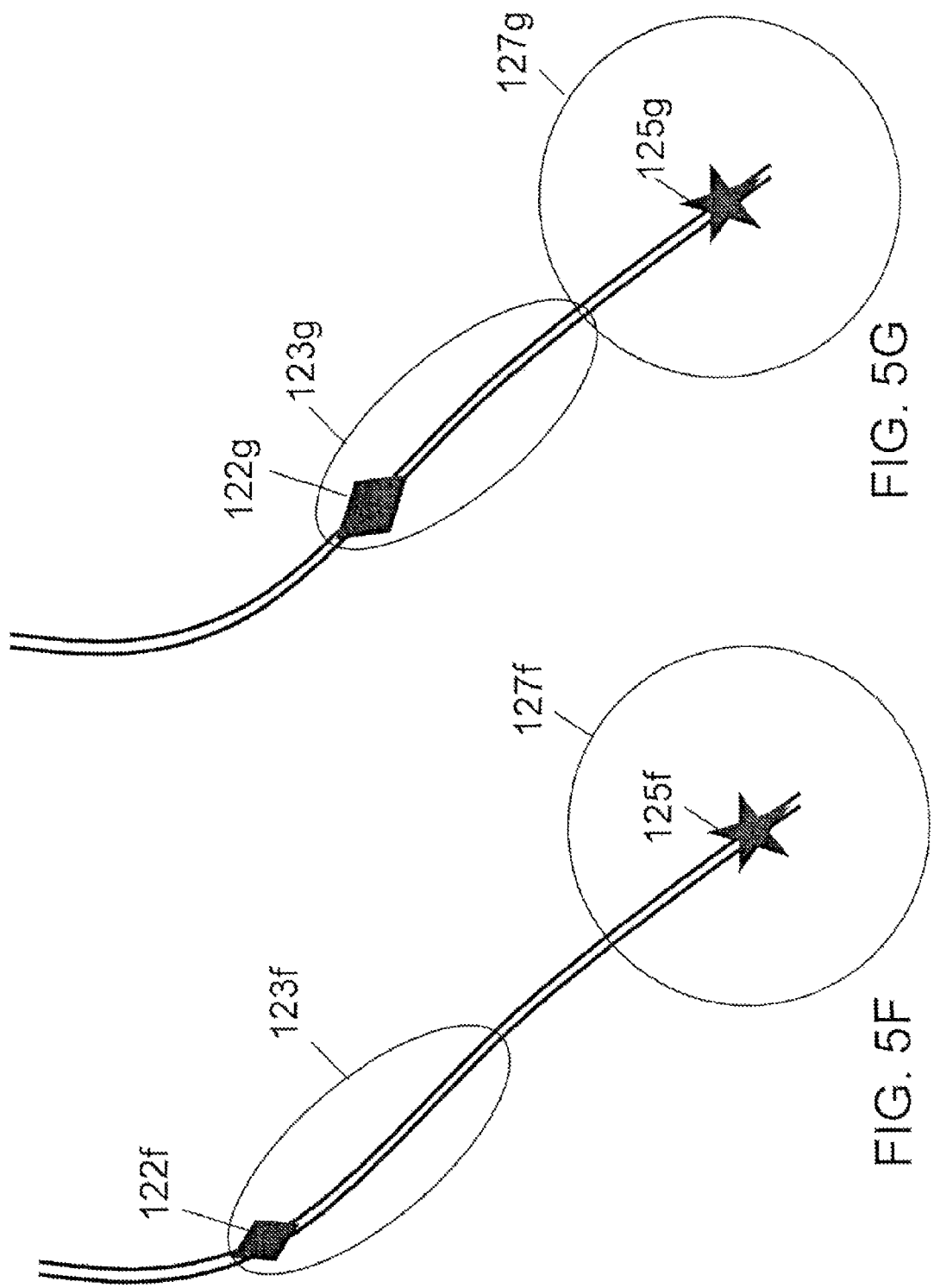

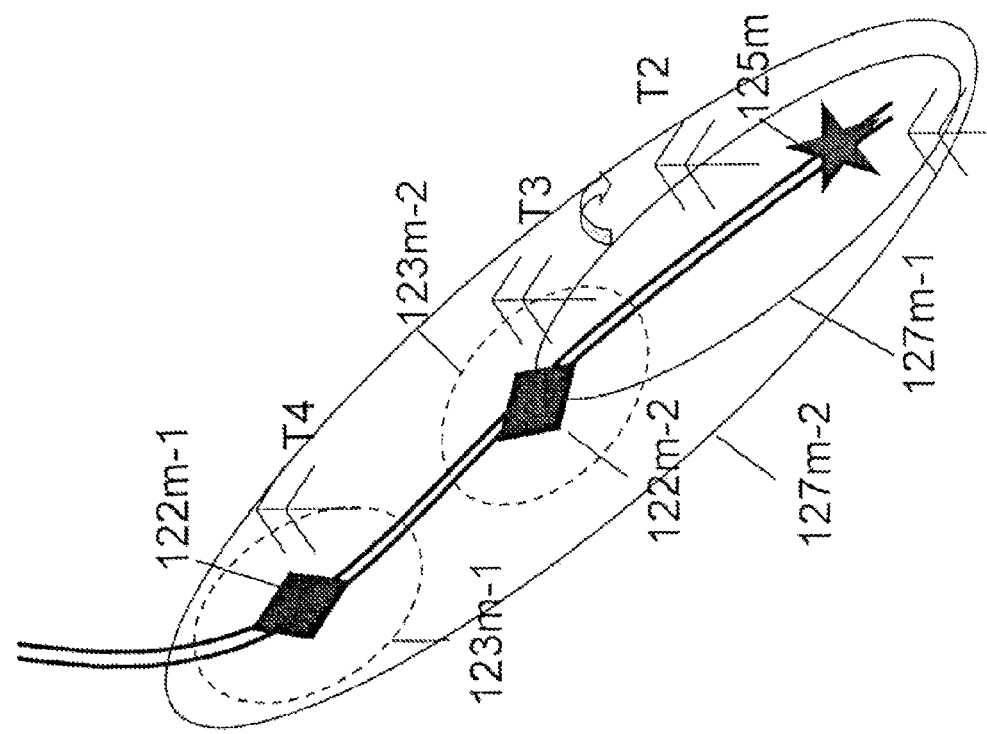
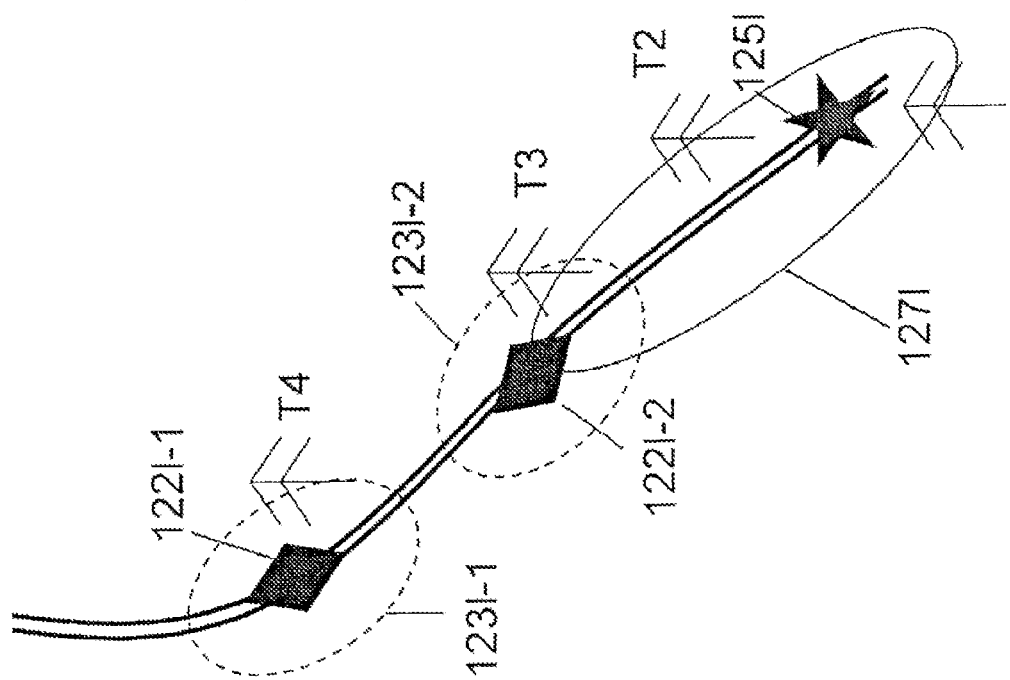

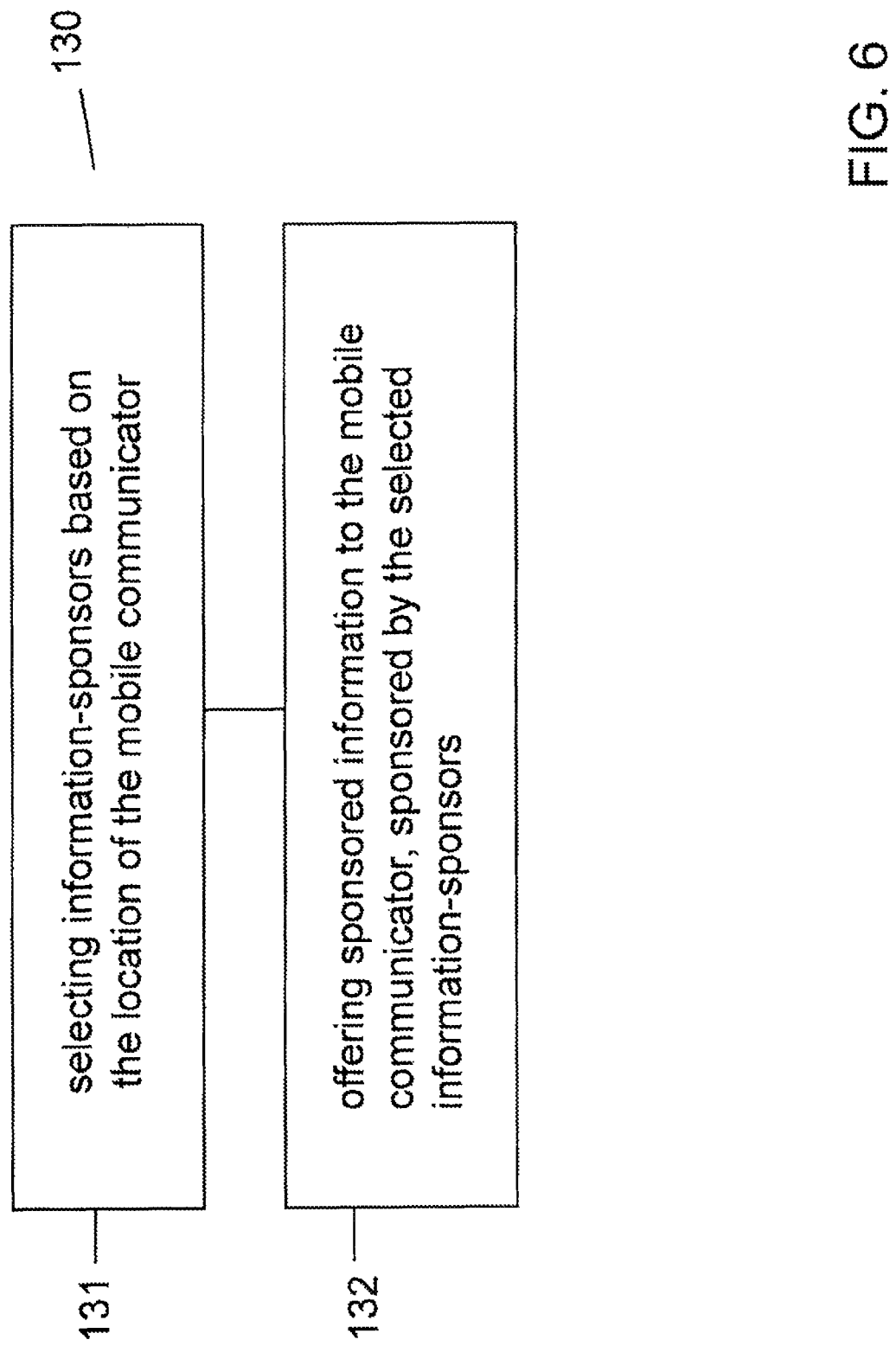

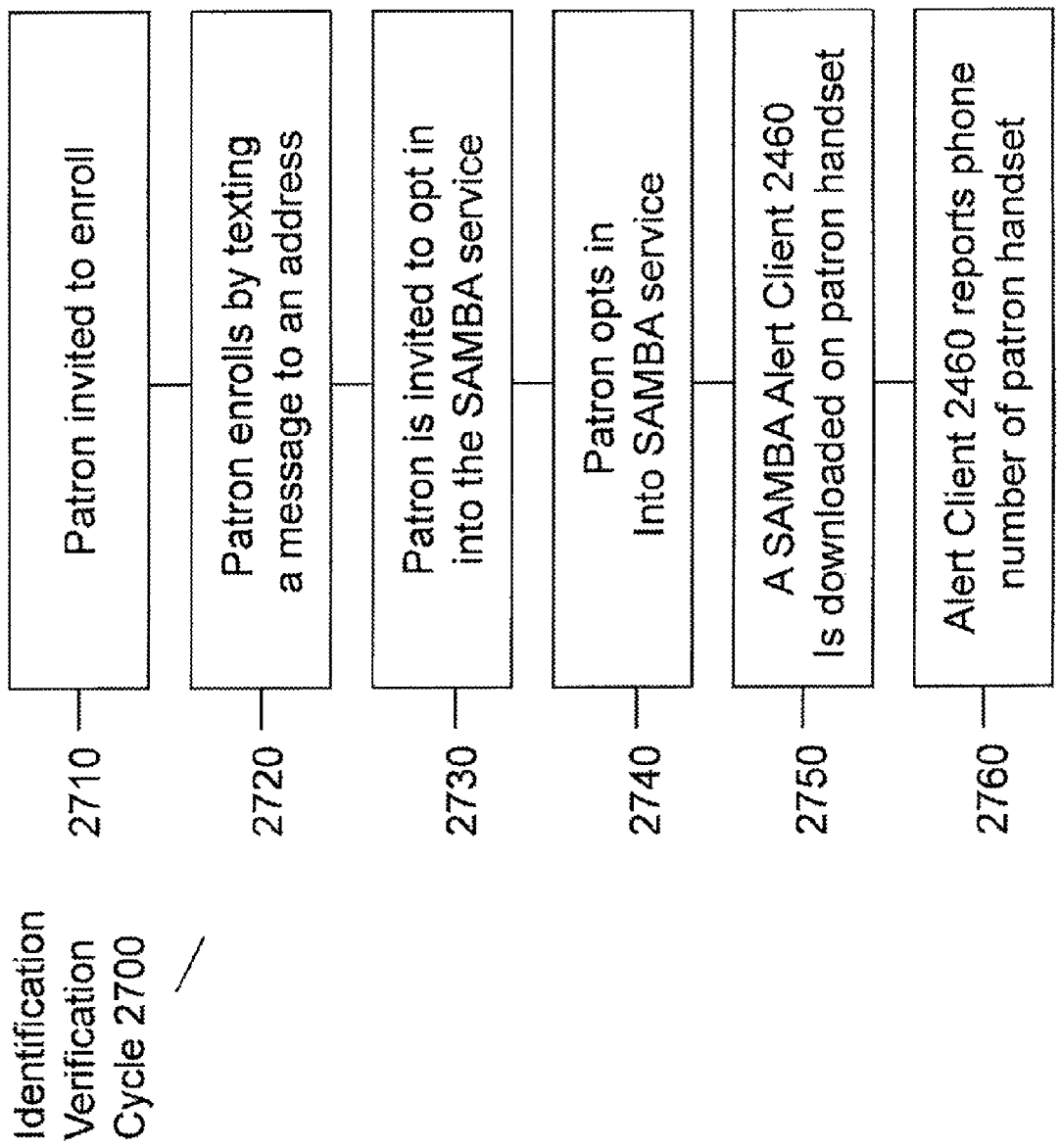

MOBILE ALERTING NETWORK

CLAIM OF PRIORITY

This application is a continuation of and claims the benefit of priority under 35 U.S.C. §120 to U.S. patent application Ser. No. 12/251,155, filed on Oct. 14, 2008, which is a continuation-in-part of U.S. patent application Ser. No. 11/970,922, filed on Jan. 8, 2008, now issued as U.S. Pat. No. 8,099,113, the benefit of each of which is claimed hereby, and each of which are incorporated by reference herein in its entirety.

BACKGROUND

1. Field of Invention

The present invention relates to mobile alerting systems, more precisely to location based alerting systems related to traffic and promotional content.

2. Description of Related Art

With great progress on every front of telecommunications, many new types of uses of these technologies emerge. One thrust of evolution involves providing traffic information more efficiently. At this time, traffic information is gathered in a somewhat disorganized manner. It is also relayed through inefficient channels.

Presently, the traffic information is often gathered from police reports, or the traffic helicopters of news channels, or road-side sensors. However, after an initial announcement of an overturned truck blocking traffic, the police may fail to inform the news channels that the overturned truck has been removed. Or the road side sensors may not appreciate that a lack of "slow car speed" signals does not necessarily indicate an "all clear" traffic condition. Famously, when the 35W bridge collapsed in Minneapolis in 2007, the roadside sensors signaled "normal traffic" several hours tiller the bridge collapse and total paralysis of the Minneapolis traffic. Thus, presently used traffic information may be outdated or incorrectly interpreted in some systems. Therefore, current methods of reporting traffic information are not necessarily reliable and leave room for improvements.

Further, the present methods of broadcasting traffic information are quite ineffective as well. In a larger metropolitan area news channels typically broadcast a long traffic report, which may list many traffic delays, accident and other problems all over the metropolitan area. However, most of these reports are not relevant for any particular driver on a particular road, forcing most users of this service to be exposed to unnecessarily long announcements. Worse yet, drivers inundated with a long report of traffic problems may get numbed and miss the one report which was relevant for their commute.

Various electronic service providers now offer devices which deliver more personalized traffic information. However, in many cases the driver has to enter e.g. on a webpage or into the device itself the specific route he or she is going to take, or store in a memory his/her typical commute route. In return, the service provides the road conditions only for the entered or stored roads. Thus, if e.g. a driver takes a less customary road on a given day and forgot to enter his choice, the provided traffic information is less useful. Further, the service provides the overall traffic information, not the one relevant for the particular location of the driver on the road, such as a convenient exit to take, or what is the expected time delay given the driver's location.

Also, many of these services require the driver to actively manipulate the device, e.g. launch an application on a cell phone. This requirement is problematic, as an increasing number of states and countries now require that the driver shall not divert his or her attention from driving by e.g. banning manual handling of cell phones. And even if a driver is prepared to launch an application, this interrupts the function presently carried out by the cell phone, such as the conversation the driver was having. Finally, many of these services are fee based—another inconvenience.

All of the aspects of present traffic delivery systems, described above, define areas where improvements are called for.

SUMMARY

Briefly and generally, a new passive traffic alerting method may include the steps of: identifying traffic events from analyzing traffic information; selecting an identified traffic event based on a location related to a mobile communicator; and alerting the mobile communicator with a passive message regarding the selected traffic event without prompting the mobile communicator to launch an application on a mobile communication device.

Some embodiments include the steps of: identifying traffic events from analyzing traffic information; selecting an identified traffic event based on a location related to a mobile communicator; and alerting the mobile communicator with a passive message regarding the selected traffic event without prompting the mobile communicator to launch an application on a mobile communication device.

Some embodiments include the steps of: identifying traffic events from analyzing traffic information; selecting a user-zone based on a location related to a mobile communicator; selecting an identified traffic event based on a relation of identified traffic events and the user-zone; and alerting the mobile communicator with a passive message regarding the selected traffic event.

Some embodiments include the steps of: identifying traffic events from analyzing traffic information; selecting an identified traffic event based on a location related to a mobile communicator; and alerting the mobile communicator regarding the selected traffic event with a plurality of messages in a hierarchical manner.

Some embodiments include the steps of: determining an alert zone by rating a traffic incident and overlaying a map of the incident, a map of cell-phone towers, and a map of a corresponding road network; acquiring user identification of cell phone users from data from cell-phone towers in the alert-zone; identifying subscribers from acquired cell-phone tower data; matching subscribers with appropriate alerts; sending appropriate alert messages to cell phones of identified subscribers.

Some embodiments include the steps of: receiving traffic alert information and start composing an alert message in response; composing alert message; compiling alert message in different formats; routing differently formatted alert messages to subscribers expecting that format; sending the routed alert messages to the corresponding subscribers through matching gateways of a service provider and a cell-phone carrier.

Some embodiments include a Mobile Alert Network service and system. The Mobile Alert Network (MAN) service can include identifying an Alert Area related to an Event Location, identifying a group of subscribers in the Alert Area, and broadcasting an Alert Message to the identified subscribers in a push-to-talk-equivalent (PTTE) environment.

The event can be any one of a wide variety of events, including a traffic accident, a weather alert, a recreational or sports event, or an E911 emergency situation, e.g. a chemical or hazardous material spill, possibly threatening with a health hazard.

The subscribers can be identified by their subscriber mobile ID, or by their International Mobile Equipment Identity (IMEI), or by any other handset identification information, such as an IMSI or MIN number, or by their phone number.

An Alert Message can be prepared and broadcast to the identified subscribers by a master broadcaster. The master broadcaster can be a Broadcast Module of a server of the MAN Service. The Alert Message can include a Short Message System (SMS) message. The MAN Service can be provided instead of, or in parallel to the regular SMS Aggregators.

The Alert Messages can contain three parts. Part 1 can alert the subscribers and inform them about the cause of alert, such as an accident or any other event. Part 2 can offer Alert Message related choices, such as receiving the Alert Message in audio. Part 3 may offer event related choices, such as receiving promotional information or offers in relation to the event, such as in the proximity of the event.

The MAN Service may include an Alert Information Service, generating an Alert Information in relation to the Event. The MAN Service can also include a Subscriber Selector, locating and identifying subscribers of the MAN service, in relation to the identified Event, such as subscribers in the proximity of a traffic accident.

The Subscriber Selector may contact a Broadcast Module with the Alert Information and the list of Identified Subscribers. The Broadcast Module may generate and assemble an Alert Message in response to the communication from the Alert Information Service and the Subscriber Selector.

The Event related choices in Part 3 of the Alert Message may be generated based on campaigns by Promotional Agents, who could be of interest for the mobile communicator.

The Alert Message can be then broadcast by the Broadcast Module to Alert Clients which have been downloaded onto the subscriber's handsets. The Alert Message can be broadcast through one or more Carrier Networks.

The Alert Message can contain an SMS with the following components: date, time, message ID, size, and hot key number.

In some implementations a Wrapper is downloaded on the handsets as a part of the Alert Client. The functions of the Wrapper may include: managing Alert Messages, managing a mailbox function, including prioritizing messages, downloading and updating applications, managing subscriptions, storing data, related to messages and promotions, and personalizing.

The Wrapper can update the on-board application to a level required by the operation of the handset, such as by the requirement of downloading and properly displaying of a multimedia message Some implementations include a Logger application to provide a detailed account of the operation of the handset and its user. The Logger may record and report that the transmission of the Alert Message has been completed, the time when the transmission of the Alert Message was completed, whether the subscriber actually requested, or pulled the available promotional material, and whether the subscriber placed an actual order in response to the promotional message.

Some implementations can include a web-based Campaign Interface. A Participating Vendor may use such a Campaign Interface to publish various campaign items.

Using the Campaign Interface, the Participating Vendor may specify the type of Alert Messages, the details of the Promotional Offer, the location aspects of the Promotional Offer, and other logistics of the campaign, such as the duration of the Offer.

The Campaign Interface may also include a module for the Billing Arrangements and a Reporting Module to provide feedback to the Promotion Agents and Vendors about the progress of the campaign.

The above functions can be facilitated and managed by the MAN System Manager, deployed on MAN servers. The MAN System Manager may include: an Alert Information Manager, a Subscriber Manager, a Broadcast Manager, a Promotion Agent Manager, a Carrier Manager, an SMS Aggregator Manager, an Alert Client Manager, and a Billing Manager.

Implementations also include a Sensor Array-based Mobile Broadcast Alert (SAMBA) Service and corresponding SAMBA System. The SAMBA System and Managers can operate analogously to the MAN System and Managers. Some of the differences between the SAMBA and the MAN systems include that the Subscriber Manager in the SAMBA System may locate and identify subscribers using a specialized Sensor Array. The Sensor Array may contain a large number of sensors, whose functionalities include receiving self-identification information, broadcast by the cell phones; determining the location of the cell phones using e.g. triangulation of these self-identification signals; and correlating the location and the identification information.

In some implementations, establishing the identity of the cell phone and the corresponding user may require cooperation between the Sensor Array and the SAMBA Central Servers.

Cell phones relay some of their identification information regularly, so that the Carrier Networks can locate them when an incoming call is trying to reach the phone. This identification information may include the mobile ID, the International Mobile Equipment Identity (IMEI), or any other handset identification information, such as an IMSI or MIN. In some cases this identification information can be a GPS information, which can then be used to establish the MIN (Mobile Identification Number) of the phone number of the handset. In some cases the identification information can be any combination of the above.

In principle the triangulation or GPS information can determine the precise location of the cell phone and the broadcast identification information can determine the identity of the cell phone and its user. This information is typically sufficient for the operation of the rest of the SAMBA system, such as sending out Alert Messages and promotions to the SAMBA subscribers among the localized and identified users.

A SAMBA Operation Display can display the location of the subscribers, and possibly some of their personal identifiers, which can include the IMEI, IMSI, MIN or other handset identification information, as well as personal information.

In order to verify the identity of two phones which are closer than the resolution of the Sensor Array, implementations of the SAMBA system may include verification cycles to determine the proper identification of the handsets and their users.

An embodiment of an Identification—Verification Cycle may include: new patrons can be given invitations to subscribe/enroll to the SAMBA Service. When the patrons enroll into the SAMBA Service by e.g. texting a message, the Sensor Array can pick up this message and extract the IMEI, IMSI, MIN or other handset identification information of the enrolling patron.

Further, in response to the text message, the patron maybe invited to opt in into the SAMBA Service, having been informed about the tracking features of the SAMBA service. The patron may opt in into the SAMBA Service, e.g. by texting "yes" to an address.

Next, an Alert Client may be downloaded onto the patron's handset. The Alert Client may report to the SAMBA servers the phone number or any other identification information of the patron. This information can be used to verify the identity of a cell phone.

In some embodiments of the SAMBA Operation Display, different classes or groups of users can be indicated by different symbols.

BRIEF DESCRIPTION OF THE DRAWINGS

FIG. 4 illustrates the sub-steps 122-123 of user-zone selecting sub-step 121.

FIG. 6. illustrates the steps 131-132 of generating sponsored alert messages step 130.

FIG. 30 illustrates an Identification and Verification Cycle 2700.

DETAILED DESCRIPTION

Figure 1:
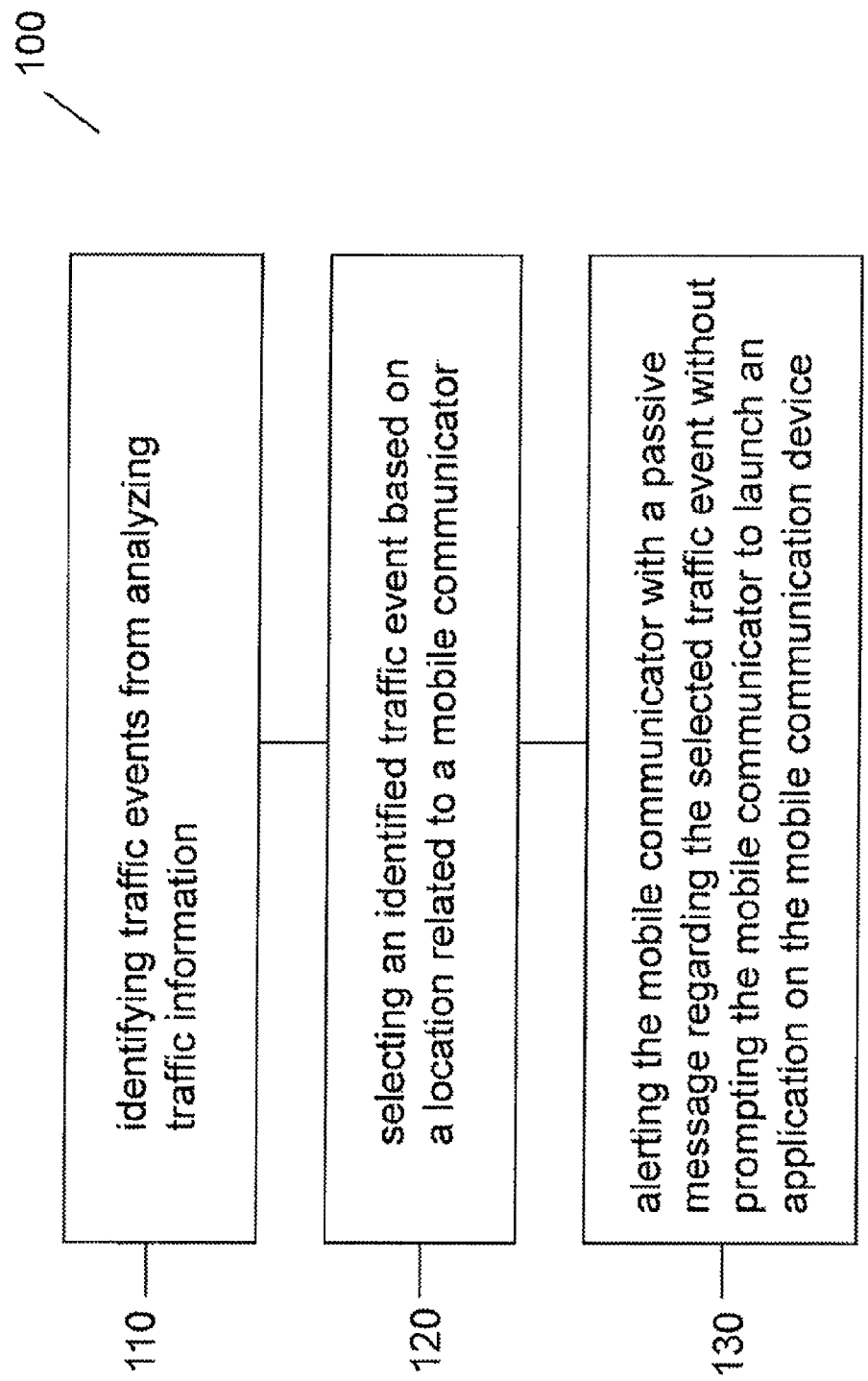
FIG. 1 illustrates the steps 110-130 of passive traffic alerting method 100.

FIG. 1 illustrates a passive traffic alerting method 100. The passive alerting method 100 can include: identifying traffic events from analyzing traffic information (step 110); selecting an identified traffic event based on a location related to a mobile communicator (step 120), and alerting the mobile communicator with a passive message regarding the selected traffic event without prompting the mobile communicator to launch an application on a mobile communication device (step 130).

Figure 2:
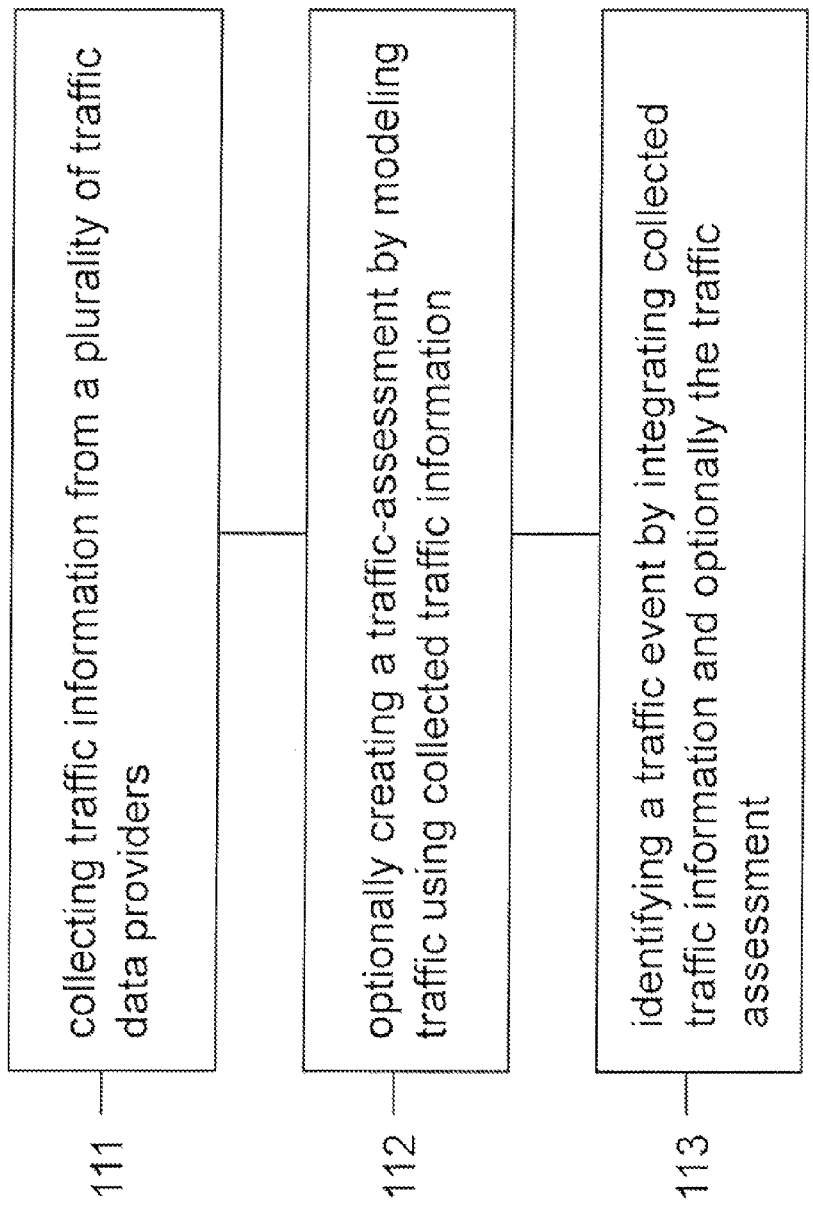
FIG. 2 illustrates the sub-steps 111-113 of the identifying and analyzing step 110.

FIG. 2 illustrates that step 110 may include collecting traffic information from a plurality of traffic data sources (step 111) and identifying a traffic event by integrating collected traffic information (step 113). Step 113 may include identifying an accident, a traffic slow-down, a traffic-jam, a road-construction, and a traffic condition. Besides typical accidents, such traffic events can be caused e.g. by a sporting event, an entertainment event, a weather event, or a traffic control event. Typical examples include a sudden downpour causing slippery roads, leading to an accident involving several vehicles. Such an accident can give rise to extensive delays. Other examples include a concert or a sporting event, where the large number of vehicles converging on the same location causes major delays without any accident. Note that the inverse of the above cases can also be a noteworthy traffic event: e.g. the removal of an overturned truck, or the opening of an exit which was under construction up to the opening.

A common aspect of these traffic events is the change in the speed of traffic, typically a slow-down. Traffic data providers developed different technologies to recognize, identify and track such slow-down of the traffic. Sources of such traffic data include: the police, issuing police reports on an accident; news organizations, operating helicopters and reporting over broadcast systems (e.g. a TV station operating its own traffic chopper and broadcasting its report live); mobile telephone companies, who acquire information about the speed of vehicles by tracking how quickly mobile phone signals move from cell-phone tower to cell-phone tower; various traffic reporting/controlling agencies, who e.g. deploy a large network of sensors into the road surface and collect the data generated by these sensors, or deploy a large number of traffic cameras which observe traditional traffic bottlenecks; and road construction companies, who knowingly cause traffic delays by closing a lane or an exit for repair.

Remarkably, any one of these traffic data sources can provide incomplete data. For example, a cell phone tower senses not only the vehicles passing by on the highway but also the vehicles passing by on a nearby residential road. A red light stopping vehicles on this residential road can be falsely interpreted by the tower's unsophisticated system as a signal of a traffic-jam on the highway itself, creating a false alert. Or, sensors built into the road surface may misinterpret signals, as mentioned above in relation to a bridge collapse. Or the police/highway patrol may accurately announce when a truck overturned on a highway, but fail to report when the overturned truck is removed, leading to continued reporting of an accident which has been cleared up since.

FIG. 2 illustrates that such inefficiencies can be drastically reduced by collecting traffic information from a plurality of traffic data sources in step 111, and integrating the collected traffic information in step 113. In an example of step 111, if a mobile phone operator reports a slowdown of traffic from its cell-tower data, a traffic reporting organization (TRO), or a traffic service provider (TSP) may acquire additional traffic information from a second source of traffic data such as a live-feed from a video camera, which is pointed at the corresponding segment of the highway. Then in step 113, the TRO may integrate the traffic information from the two sources by cross referencing the cell tower data with the video camera feed to verify that indeed an accident occurred. The integrating step 113 may involve checking that the video camera feed corresponds to the same segment of the highway as the cell tower data. Or if the police do not issue an "all-clear" after an initial report of an overturned truck, a TRO may perform step 111 by directing a news chopper to the impacted section of the highway and ask for additional information. Then, in step 113, the TRO may instruct the chopper to check whether the overturned truck has been removed, describing in detail which segment of the highway the police report referred to.

Often the traffic information is complex and unusual situations and correlations occur. In many embodiments of the integrating step 113 the complex information is integrated by human intervention: an employee of the TRO summarizes the cell-tower data and cross references it with the video feed from a traffic helicopter.

In embodiments of step 111, which collect traffic information from cell-tower data, issues of privacy may be involved. To alleviate any potential problems, embodiments of the present method make sure that only anonymous information is used. For example, the actual ID of the cell phone users is not recorded or reported, only the average speed of the cell phone users, inferred e.g. from how quickly they move from cell-tower to cell-tower.

In some embodiments the analysis step 110 also involves step 112: a modeling of the traffic. For example, "neural network" models, or "real-time traffic" models can be used for modeling traffic in step 112. These models can be used to generate a traffic assessment. These assessments include predicting what kind of traffic delays will be caused by a freshly overturned truck in 10, 20, or 30 minutes, on what time scale will the traffic-jam dissipate, and how will the changing traffic patterns (such as motorists taking alternate routes) impact these predictions. There are a vast number of such traffic models and using any one of these models is understood to be within the scope of the step 112. In multi-level modeling embodiments, more than one method can be employed to generate traffic predictions and then a second level evaluator may chose which model's prediction should be accepted as the traffic assessment. In such embodiments the step 113 may involve integrating traffic data acquired in step 111 with the traffic assessments, generated during the modeling step 112.

An example can be that in a step 111 a TSP is informed about a lane closure and the TSP comes to the idea to suggest an alternate route to avoid delays. Then, a modeling step 112 is carried out to estimate whether the idea of a no-delay alternate route is verified by modeling. The modeling instead comes to the conclusion that a 10 minute delay will be likely caused by the excess traffic. In an additional step 111 the TSP acquires further traffic information in the form of road-embedded sensor data to check whether the vehicle speed on the alternate route is indeed consistent with the 10 minutes delay prediction oldie modeling. The acquired road sensor data, however, indicates only a 5 minutes delay. Finally, in an embodiment of step 113, the original lane closure information, the modeling prediction of 10 minutes delay, and the road sensor data, indicating only 5 minutes delay, are integrated, enabling the TSP to identify a traffic event of the lane closure and the accompanying 5-10 minutes delay on the alternate route. The sequence of these steps can be reordered, and some steps can be carried out more than once, as in the just described embodiment.

Figure 3:
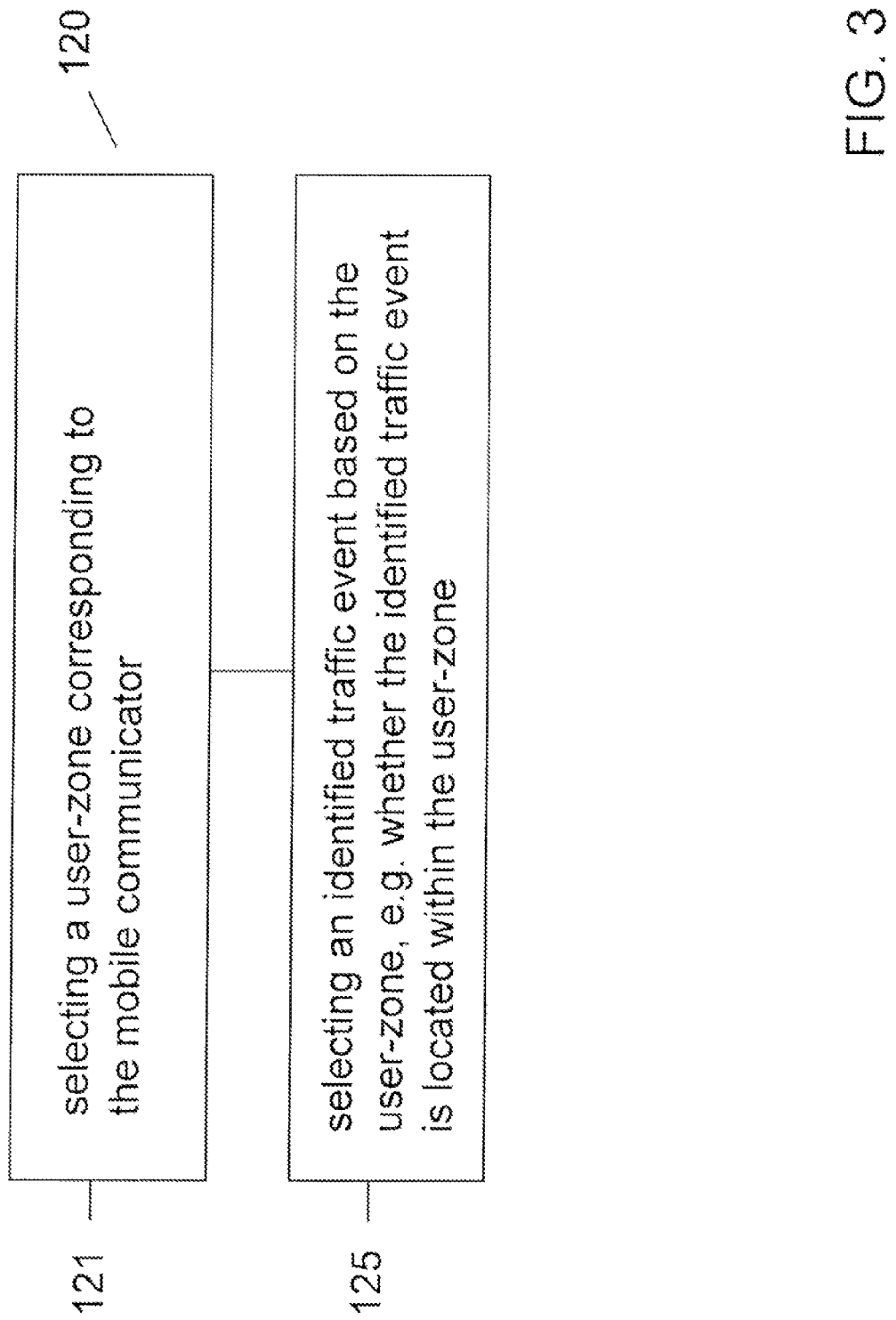
FIG. 3 illustrates the sub-steps 121-125 of the selecting a traffic event step 120.

FIG. 3 illustrates step 120, which involves selecting one of the identified traffic events. Step 120 may start with step 121: selecting a user-zone corresponding to the mobile communicator. The user-zone can be selected for various reasons. One of these reasons is to provide personalized traffic information. Selecting a user-zone around the mobile communicator identifies which road's traffic information is needed or requested by the mobile communicator. The user-zone can be selected by the TSP, e.g. as a default, or to represent a choice of the mobile communicator. In the latter embodiment, the mobile communicator may be prompted to choose a user-zone and then relay the choice to the TSP.

FIG. 4 illustrates that step 121 may include step 122: determining a location of the mobile communicator from location data provided by mobile communication stations of a mobile communication network or from data provided by a global positioning system. Step 122 can be followed by step 123: selecting the user-zone as an area centered at the location of the mobile communicator with a shape and extent. In some applications, the user-zone can be a "bubble" around the mobile communicator: e.g. 10 mile ahead the vehicle and a half mile wide on each side of the highway. Any other shape and extent can be specified as well. The extent and shape of the user-zone corresponding to each cell phone can have default values. These default values can be reset on a webpage or through a setup process during a telephone-call. It can be also specified whether the center of the user-zones, or any other distinguishing coordinate, e.g. the focal point of an elliptic user-zone, should be chosen to track the location of the mobile communicator. The shape and extent and any other characteristic of the user-zone can be updated by the mobile communicator during regular operations. In other embodiments, the shape and extent is programmed to vary according to identified traffic events by various service providers.

In an example, if a mobile communicator is alerted in step 130 that a selected traffic event is ahead of him, then the mobile communicator may wish to decide which alternate route to take. For making the right decision the mobile communicator may desire information on whether any of the possible alternate routes has a traffic jam on it. To deliver an answer, the TRO or TSP may alter the user-zone to become much wider, once a traffic event in the original user-zone has been reported, since wider user-zones prompt receiving alerts about traffic events potentially blocking some of the alternate routes. In another embodiment, the extent of the user-zones is increased as a traffic jam increases, in order to allow the driver to take alternate routes before getting caught in the traffic jam. More generally, the user-zone may be increased by the TSP so as to enable the mobile communicator to make informed choices in a timely manner, typically to take alternate routes or to pull over for shopping until the traffic jam dissolves.

Step 122 may include determining the location of the mobile communicator from location data provided by mobile communication stations of a mobile communication network. The location of the mobile communicator can be extracted e.g. by a triangulation method on the data, collected from the cell phone towers. In other embodiments, the location of the mobile communicator can be extracted from data provided by a global positioning system or a related cell-phone GPS system.

The user-zone is typically moving with the vehicle of the mobile communicator and thus it is constantly updated. In some embodiments, the location of the mobile communicator is determined by at least partially relying on the speed of the mobile communicator. The speed can be inferred e.g. from cell phone tower data. In some embodiments, the user-zones of cell phone users within a section of a metropolitan area can be tracked by a cell phone service provider in regular intervals, collecting data from cell phone towers.

In some embodiments the data about the user-zones are forwarded by the cell phone service provider to a traffic reporting organization (TRO), or to a traffic service provider (TSP), who specializes in practicing the presently described passive alerting method 100. In these embodiments the TRO or TSP tracks the moving user-zones. In other embodiments, the operators of the cell phone towers or the cell phone service providers, or the GPS service provider tracks and updates the user-zones.

In step 125 in FIG. 3 the TRO or TSP, or any other of the listed operators, may select one of the identified traffic events by updating the moving tracked user-zones of moving mobile communicators and evaluate whether any one of the identified traffic events fall within the updated user-zones. Once an identified traffic event is found to fall within the user-zone of a mobile communicator, step 130 can be carried out e.g. by alerting the mobile communicator with a passive message about the selected traffic event.

As an example, a driver on her way home from the office may switch on her cell phone. The cell phone sends identifying signals to the cell towers. The cell phone service provider transmits information about the driver to a traffic service provider (TSP), including her location (step 122) and user-zone (step 123), which were either transmitted in the identifying phase or stored based on previous communications. The TSP processes the identifying signals and extracts the location of the driver and recalls her preprogrammed user-zone which is 8 miles ahead of the vehicle and half mile wide. As the driver drives on highway US 101, the TSP continuously updates the user-zone and evaluates whether there is a traffic event within her user-zone. At some time a new traffic accident occurs 20 miles ahead of the driver on US 101. Corresponding traffic data is received by the TSP and is identified as an accident, causing a 20 minutes delay following the steps 111-113. This brings the presently active traffic accidents in the greater metropolitan area to 12. However, the TSP does not burden the driver with information regarding all 12 accidents. Instead, only when the driver arrives within 8 miles of the newly identified traffic accident, the TSP selects the accident on US 101 out of the 12 active accidents. The TSP then sends a passive alert signal only to the driver whose user-zone just overlapped with the identified traffic event that a traffic accident lies ahead, causing a 20 minutes delay. Since the driver knows that the size of her user-zone was set to 8 miles, this alert signal lets the driver know not only the existence of the traffic accident but its approximate distance from the vehicle and the probable delay caused by it.

In other embodiments, the user-zone can be selected differently. For example, the user-zone can be selected based on any kind of mobile communicator information. Embodiments include selecting a user-zone based on an address, such as the home of the mobile communicator. This choice lets the mobile communicator know whether there are traffic problems around her home, to assist her in planning the fastest route home.

In yet other embodiments, the user-zone can be based on another person. For example, the user-zone can be defined according to the location of the cell phone of the mobile communicator's spouse, family member, co-worker or business partner. These embodiments allow the mobile communicators to be informed e.g. whether a spouse or a business partner will be late for a meeting because of traffic delays.

In yet another embodiment, the TSP can modify the size of the user-zone based on the traffic event. For example, even if a driver selected only a 5 miles user-zone, but if the accident caused a 7 miles traffic jam, the TSP may override the user selection and reset the extent of the user-zone to 7 or even 8 miles. This allows the driver to become informed about the traffic jam before actually reaching it.

FIGS. 5A-E illustrate certain features of the above method 100.

FIG. 5A illustrates that the location of the driver (the diamond label) is determined in step 122*a*, e.g. from cell-tower data or GPS information. A user-zone is selected in step 123*a*, either defined during the initialization or recalled from stored data. As the driver moves, her location and the user zone are updated in regular intervals. The TSP received traffic information about various locations in the area. By practicing steps 111-113 the TSP identified two traffic accidents in the area, 125*a* and 125*ax*. These traffic events were identified through steps 111-113 by employees of the TSP integrating chopper data and cell tower data. However, the driver is not burdened and her radio program is not interrupted by information about these identified traffic events, as neither of these identified traffic events is selected, as they are both outside the driver's user-zone.

FIG. 5B illustrates the changed situation, when the most recent update of the driver's location 122*b* and her user zone 123*b* makes the identified traffic event 125*b* to fall within the updated user zone 123*b*. In an embodiment of step 120, the TSP selects the identified traffic event 125*b* based on the updated user-zone of the mobile communicator. With little or no delay the TSP carries out step 130 and alerts this specific driver to the traffic event 125*b* ahead of her. The alert is passive and does not require the driver to launch an application on her mobile communication device. In the same alert the TSP does not inform the driver about the identified traffic event 125*bx*, as that does not fall within the user's updated user-zone 123*b*.

FIG. 5C illustrates that in relation to the identified traffic event 125*c* either the TSP or the driver changed the shape and extent of the user-zone in step 123*c*. Motivations to enlarge the user-zone include exploring the status of alternate routes. Since enlarging the user-zone made the identified traffic event 125*cx* also fall into the user-zone, the TSP also selects identified traffic event 125*cx*. Then, in a step 130, the TSP alerts the driver to selected traffic event 125*c* and 125*cx*. The alert may indicate that not only the main highway 101 has a traffic accident, but the first choice alternate route 126*cx* also has an accident 125*cx*. This alert may allow the driver to choose secondary alternate route 126*cy*, where accidents do not slow down traffic.

Figure 5E:
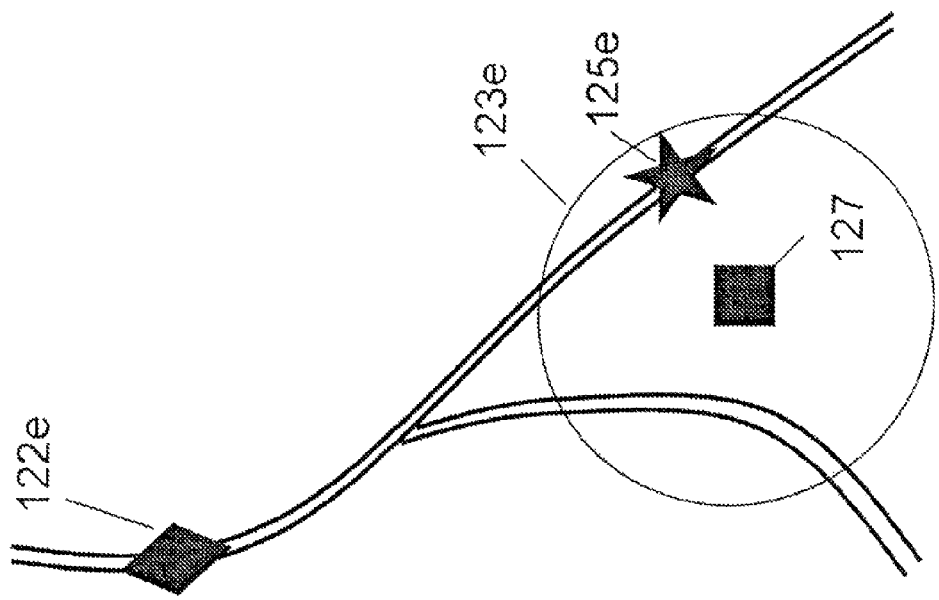
FIGS. 5A-5N and FIG. 5P illustrate various situations and embodiments involving the user-zone, the event-zone and the traffic-event.
Figure 5D:
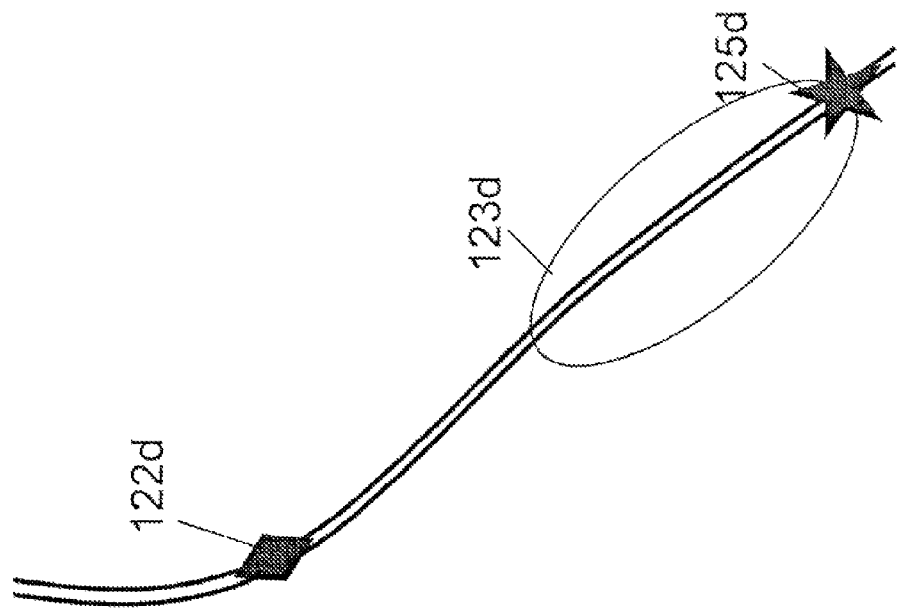

FIG. 5D illustrates another embodiment, where in the step 123*d* the user-zone is selected based not on the location of the driver but based on the location of the traffic event 125*d*.

FIG. 5E illustrates an embodiment where the user-zone is selected in step 123*e* based on the location of a selected house, such as the driver's home, or the school of the driver's children.

FIG. 5F illustrates an embodiment, where the TSP defines not only a user-zone 123*f*, but also an event-zone 127*f*. In these embodiments, the identified traffic event is selected for a particular mobile communicator, when the user-zone 123*g* of the mobile communicator overlaps with the event-zone 127*g* of the identified traffic event, as shown in FIG. 5G.

Figure 5I:
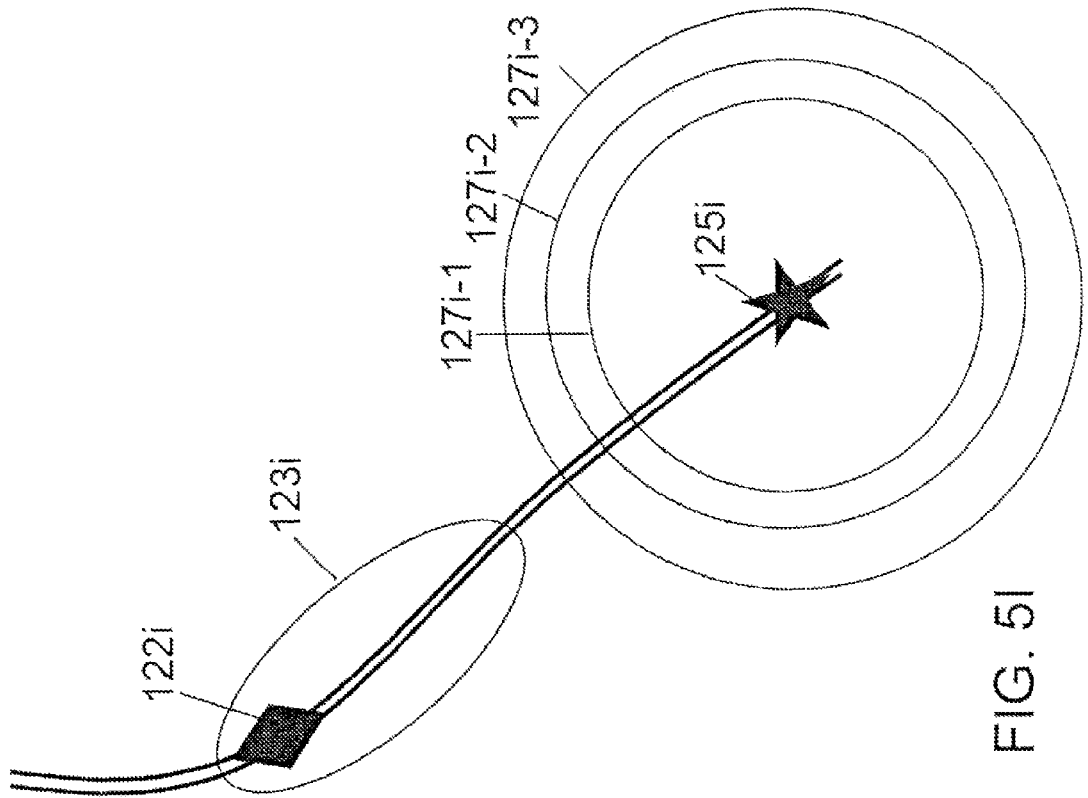
Figure 5H:
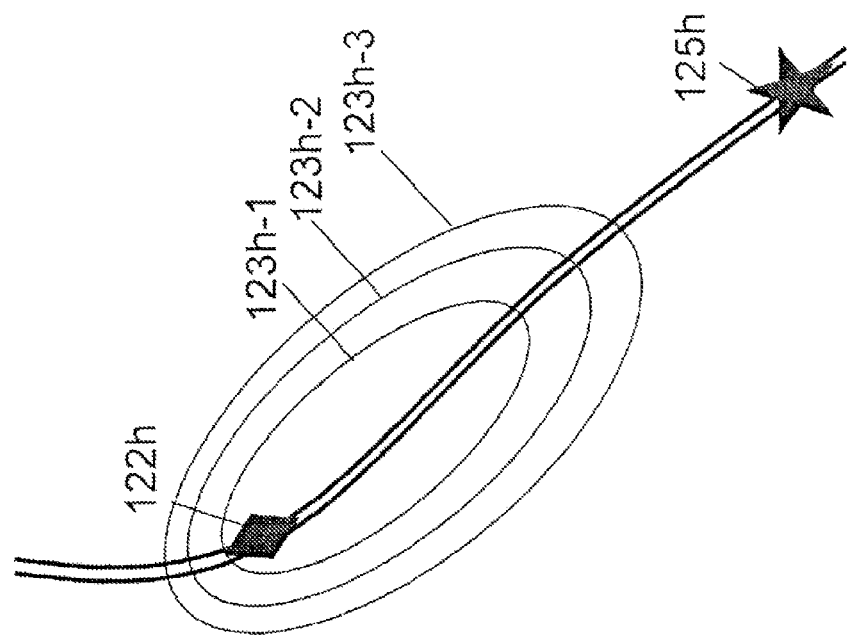

FIG. 5H illustrates that the user zone 123*h* can have a hierarchical structure, including hierarchical layers 123*h*-1, 123*h*-2, and 123*h*-3. In embodiments described below, different type of services can be provided to the mobile communicator as the identified traffic event 125*h* falls within different hierarchical layers 123*i*.

FIG. 5I illustrates that in some embodiments the event-zone may have a hierarchical structure, including hierarchical zones 127*i*-1, 127*i*-2, and 127*i*-3. In these embodiments, the mobile communicator may be offered different services as the user-zone 123*i* overlaps with different hierarchical zones 127*i* as will be described below.

Figure 5K:
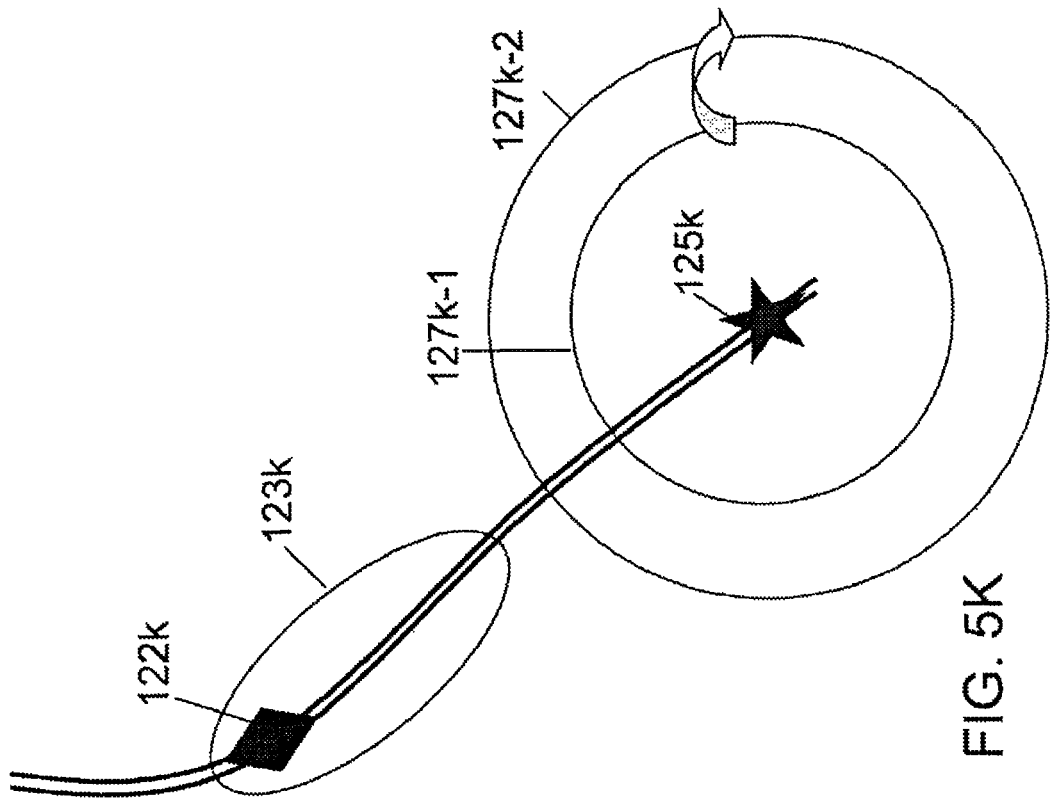
Figure 5J:
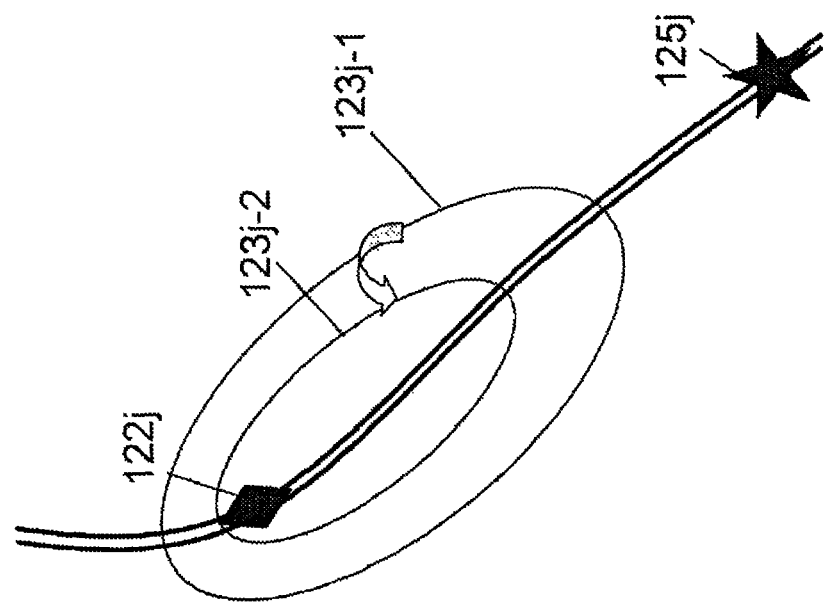

FIG. 5J illustrates that in some embodiments the extent and shape of the user zone can be varied in time, depending on changing traffic conditions. For example, the user-zone can be shrunk from 123*j*-1 to 123*j*-2 when an overturned truck is removed and thus the TSP expects that the delays will be reduced.

FIG. 5K illustrates that in some embodiments the extent and shape of the event zone can be varied in time, depending on changing traffic conditions. For example, the event-zone 127*k*-1 can be extended to 127*k*-2, when the original accident is followed up by a chemical substance spill and thus the TSP expects that the delays will be increased.

FIG. 5L illustrates that in some embodiments the user and event zones can be defined in terms of stations of a communication system. A particular embodiment defines the zones in terms of the towers of a cell-phone network: T1, T2, . . . . In particular, the user zones 123*l*-1 and 123*l*-2 can be determined in terms of the communication towers keeping track the identification numbers (ID's) of the mobile communicators, such as cell phone users. In FIG. 5L the mobile communicator communicates with tower T4, thus the user-zone 123*l*-1 of the mobile communicator 122*l*-1 gets defined as an area corresponding to tower T4, and the user zone 123*l*-2 of the mobile communicator 122*l*-2 gets defined as an area corresponding to the tower this mobile communicator is communicating with: T3.

The traffic event, or incident, 125*l* happened between towers T1 and T2. The event-zone 127*l* is defined as an area corresponding to towers T1 and T2. Visibly. in the illustrated situation the user-zone 123*l*-1 of mobile communicator 122*l*-1 does not overlap with the event-zone 127*l*, and thus mobile communicator 122*l*-1 does not get alerted in step 130. In contrast, the user-zone 123*l*-2 of mobile communicator 122*l*-2 does overlap with the event zone 127*l* and therefore mobile communicator 122*l*-2 gets alerted in a step 130.

In some cases, the event-zone is elongated along the highway itself. The event zone 127*l* can be asymmetric, i.e. longer for the direction of mobile communicators approaching the traffic incident 125*l* and shorter for mobile communicators leaving the area of the traffic incident 125*l*.

The direction of motion of mobile communicators can be determined from acquiring tower data repeatedly. For example, at a time t the TSP, or any other agent, may acquire the data that on a north-south oriented road, a mobile communicator contacted a tower Tn. Then, at a subsequent time t', the TSP/agent may record that the same mobile communicator contacted a second tower Tm, which is located south from tower Tn. From these data the TSP/agent may infer that the mobile communicator is moving southward along the road. As explained above, the TSP may use this directional information to define the event zone 127*l*.

FIG. 5M illustrates an embodiment when the event-zone 127*m*-1 gets extended from 127*m*-1 to 127*m*-2. Visibly, the tower-defined user-zone 123*m*-1 does not overlap with event-zone 127*m*-1 and thus mobile communicator 122*m*-1 does not get alerted when the event-zone is the original smaller size 127*m*-1. In this case only mobile communicator 122*m*-2 gets alerted.

However, it the TSP, or any other agent, re-evaluates the severity of the traffic incident, or the traffic jam builds up, then the TSP may decide to increase the tower-defined event zone from 127*m*-1 to 127*m*-2. In this case the mobile communicator 122*m*-1 also gets alerted in an alerting step 130.

Figure 5N:
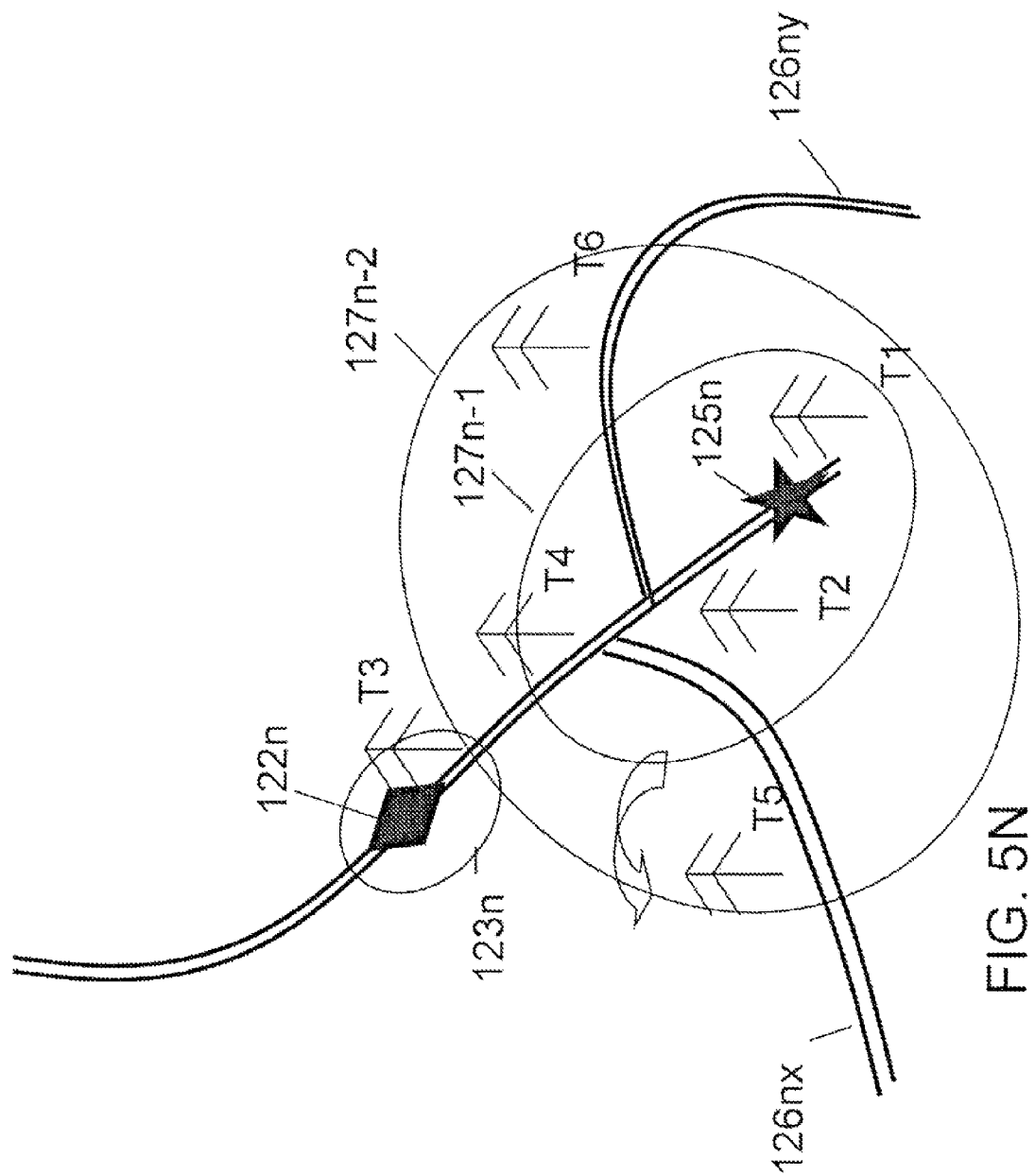

FIG. 5N illustrates another embodiment of enlarging the event-zone 127*n*-1 to 127*n*-2. Mobile communicator 122*n* has a tower-defined user-zone 123*n*, defined essentially as an area belonging to tower T3. A traffic event or incident 125*n* was identified between towers T1 and T2. At the early stages of the incident, there was only a limited buildup of traffic jam, thus the event-zone was defined as 127*n*-1, which impacted only towers T1, T2 and T4. At this stage only mobile communicators, whose user-zones 123*n* overlap with the event-zone 127*n*-1, will receive alerts. In embodiments, where the user-zone is defined by towers, the mobile communicators who are communicating through towers T1, T2 and T4, will be alerted. Accordingly, mobile communicator 122*n* is not alerted at this stage.

However, at a subsequent time the traffic service provider TSP may integrate updated traffic information, e.g. by carrying out steps 111-113, and conclude that the size of the traffic jam expanded onto subsidiary routes 126*nx* and 126*ny*. In order to alert mobile communicators on those roads, as well as helping approaching mobile communicators, who maybe contemplating taking these subsidiary routes, the service provider may decide to extend the event-zone into 127*n*-2. As the FIG. 5N illustrates, the enlarged event-zone 127*n*-2 may include towers T3, T5 and T6. In tower-defined user-zones this means that the mobile communicators who are communicating through these towers, will be alerted. According to FIG. 5N, user 122*n* will be alerted after the enlargement of the event-zone to 127*n*-2.

In various embodiments this enlargement procedure may take forms. E.g. the event zone may be constructed not as a single ellipse, but as a collection of elongated areas, formed along the main route and the subsidiary routes. These elongated areas can be updated, modified and varied independently from each other.

Also, the enlargement step can be repeated more than once, involving more and more towers. Further, as the traffic jam gets resolved, e.g. the overturned truck gets removed at 125*n*, the event-zone maybe reduced as well. Again, this can be done as an overall reduction, or piece-wise. Also, different towers may send out different alerts, as motorists may face different traffic conditions ahead on the main road and on the subsidiary roads.

Figure 5P:
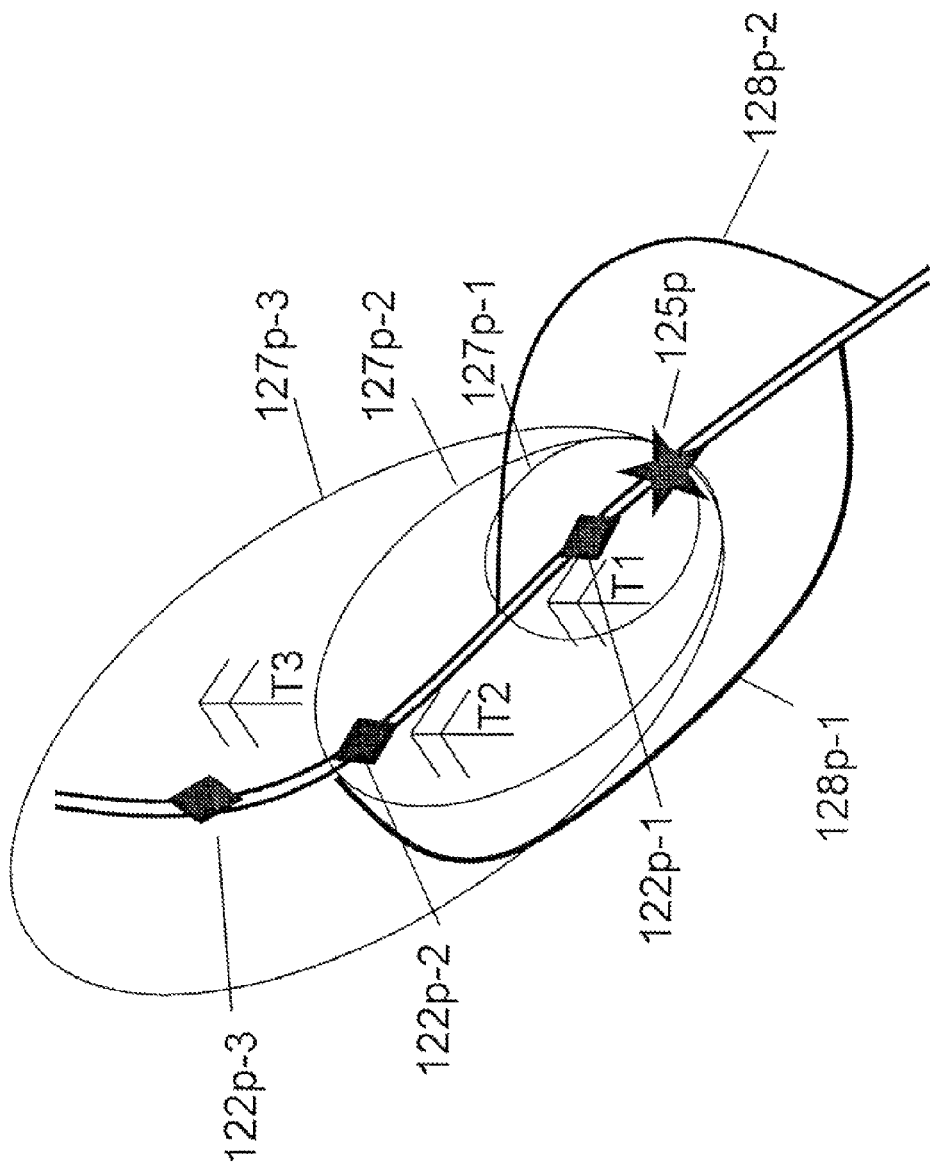

FIG. 5P illustrates another embodiment, where alert messages are sent out to mobile communicators according to an estimate of the time the mobile communicators will spend in the area of the traffic event.

In detail, the location of a traffic event 125*p* can be entered on a map by an operator of the traffic service provider TSP or by an automated system. Additional information can be entered as well, such as a predicted clean-up time of the traffic event 125*p*. Subsequently, a path resolution algorithm can be applied to estimate the time which will be spent by different mobile communicators 122*p* in the area of a traffic event 125*p*. This path resolution algorithm can compute the time for a mobile communicator 122*p* remaining on the main highway, and the times for taking alternate routes 128*p*-1 or 128*p*-2. For each path a time can be computed and the alert messages can be sent out according to the computed times.

In some embodiments the longest travel times can be computed, e.g. by assuming that the mobile communicator 122*p* gets red lights all along the main and the alternate routes 128*p*. The routes could be evaluated for the longest travel time, not longest distance as these two criteria may not coincide.

In some cases the algorithm may use a single recursive graph traversal to determine the corresponding travel times.

Some embodiments then proceed and create zones according to the estimated travel times. In some implementations a short, a medium and a long travel time zone can be created. The zones can be determined in relation to the tower locations, starting with the towers closest to the travel event and include more and more towers as the radius of the path search is enlarged. In the next step the TSP can interrogate the cell towers in the identified zones and generate lists containing the mobile communicators who are in the different zones. These zones can be stored and reused as the mobile communicators enter or exit the different zones.

FIG. 5P illustrates this process, as the graph traversal algorithm identifies zones 127*p*-1 to 127*p*-3 around travel event 125*p* according to whether the estimated travels time is "short", "medium" or "long". A wide variety of definitions can be used to define what constitutes a short/medium/long travel time. Next, cell towers T1-T3 are identified which track cell phones in zones 127*p*-1 to 127*p*-3, respectively. Subsequently, the identified cell towers T1-T3 are interrogated for the mobile communicators 122*p*-1-122*p*-3 tracked by them. In this example, mobile communicator 122*p*-1 will be entered into a "short time" list, mobile communicator 122*p*-2 will be entered into a "medium time" list and mobile communicator 122*p*-3 will be entered into a "long time" list, because they are tracked by cell towers T1, T2, and T3, respectively. As mobile communicators move e.g. on the highway, they can be moved from a farther list to a closer list. E.g. mobile communicator 122*p*-3 can be moved from the long time to the medium time list when she crosses from zone 127*p*-3 to 127*p*-2, or analogously, from being tracked by tower T3 to being tracked by tower T2. Of course, in various embodiments the number of zones and lists can vary widely.

In a next step, different messages can be generated for mobile communicators on the different lists—corresponding to the different zones, as implementations of step 130. For example, advertisements can be selected based on the position, speed and direction of the movement of the mobile communicators in the zones.

For example, for mobile communicators on the short time list, the TSP may send out a short time list alert/notification, for mobile communicators on the medium time list, a medium time list alert/notification, and for mobile communicators on the long time list, a long time list alert/notification, The cell towers can be polled in appropriate time intervals, such as periodically. The path evaluating algorithm can be either rerun, or use the previously determined path-evaluation. Mobile communicators can be added or removed based on a wide range of criteria, such as whether they moved past the accident, or taken alternate routes or stopped at a gas station or restaurant or other place.

In step 122, the location of the mobile communicator can be determined passively, i.e. without running an application on the mobile communication device.

In step 120, the traffic event can be selected without requiring the mobile communicator to specify or program a traffic route. This is in contrast to some systems, which pair drivers and traffic accidents based on the drivers entering their daily commute (or any other route of interest) onto a web-based system.

In step 130 the alert message is sent out passively. Embodiments of this step include alerting the mobile communicator without requiring the mobile communicator to respond by using hands, e.g. to terminate or interrupt an active application. This embodiment may be appreciated in countries or states where operating mobile phones with hand during driving is prohibited. Also, some systems require the driver to launch an application either to indicate their location to the TSP, or to respond to or process the traffic information, such as displaying a map, which shows the blocked highways. This requires interrupting e.g. ongoing telephone conversations: a disadvantageous feature.

The mobile communication device can be any known mobile communication device, including a mobile telephone, a mobile computer, any communication device capable of sending a with or wimax signal, any combination of these devices, e.g. a computer equipped with any sort of device making it capable of communicating over any wifi, wimax or other wireless network. In general, any electronic device configured to operate in conjunction with any kind of mobile communication networks is within the scope of the term "mobile communication device".

In step 130 the alerting may take place on a separate telephone line, if the mobile phone is configured to operate two or more phone lines.

The alerting step 130 may include alerting the mobile communicator with an alert-message, which includes at least one of an audio component, a text component, an SMS, a video component, a radio broadcast component, a television broadcast component, a multimedia component, and a multimedia messaging service component.

An example for an alert message is an audio component, which includes a ring-tone, an instruction to tune to a traffic radio and a video component including a live traffic camera broadcast.

In some embodiments, in step 130 the alert-message component can be selected based on a location of the mobile communicator relative to the selected traffic event, followed by alerting the mobile communicator with the alert-message component. Examples include providing more detailed information as the driver gets closer to the accident. Embodiments include providing first just a statement of the traffic accident, then, upon the driver getting closer to the accident site: the total time delay, then on further approach: which alternate routes to take to avoid the traffic jam, or which frequency to tune the car-radio for additional information.

In this sense, the user-zone can be viewed as having a hierarchical structure itself: more detailed information is delivered to the mobile communicator when the identified traffic event moves from an outer layer of the user-zone to an inner layer of the user-zone. As mentioned before, in some embodiments the extent and shape of the user-zone may be updated by the TSP, e.g. motivated by the increasing extent of the traffic jam. In these embodiments, if the user-zone is enlarged by the TSP, the identified traffic event can move into an inner-layer of the user-zone from an outer layer even if the mobile communicator is sitting in a traffic jam.

Alternatively, the TSP may define an increasing event-zone around the traffic event. In these embodiments These examples were specific realizations of "traffic utility information" regarding the selected traffic event. Other embodiments of the traffic utility information include information regarding an alternative route related to the traffic event, an expected duration of the traffic event, predicted times of arrival to points of interest, such as to a concert or to an airport, a parking information, an event information, and a suitable exit near the mobile communicator's location.

The parking information can include the location of a parking garage and whether that garage has empty slots or is it full. Combined exit and parking information can be especially useful near airports, concerts, or sporting events, where different auxiliary parking lots can be approached through different exits, and the parking lots can fill up, inconveniencing drivers.

In some embodiments, the traffic information is updated in a regular manner, e.g. when a prediction of a traffic delay is changed, or an overturned truck has been moved to the side. This provides the mobile communicator with valuable information for making decisions.

The traffic utility information can be offered in response to the mobile communicator requesting more information, or can be offered by automatically launching an application on the mobile communication device.

The traffic utility information can be offered as part of an advertisement-based non-paying service, or as part of a paying service. The paying service may include a monthly fee based service, a per-use service, and a service, billed in relation to the bill of the mobile communication service.

Providing a traffic alert and traffic utility information in relation to the location of a driver is a specific example of "location based services", sometimes referred to as LBS.

Embodiments of the present alerting method can be viewed as "pushing" information to the drivers: a distinction from some existing methods, where the drivers have to "pull" information from a service provider. As such, the present method offers commercial opportunities to interested sponsors.

FIG. 6 illustrates that the alert message in step 130 may contain sponsored information from interested sponsors. Within step 130, in step 131 information-sponsors can be selected based on the location of the mobile communicator, and in step 132, sponsored information can be offered to the mobile communicator, sponsored by the selected sponsors. Notably, the sponsored information may include advertisements.

For example, when the TSP determined that the mobile communicator, whose location was tracked in step 122, is facing substantial traffic delays in the vicinity of exit 42, the TSP may carry out a search in an internal database of ad-sponsors in a vicinity of exit 42, and then offer advertisements and promotions by these sponsors on the cell phone of the mobile communicator, as described in more detail below.

Figure 7:
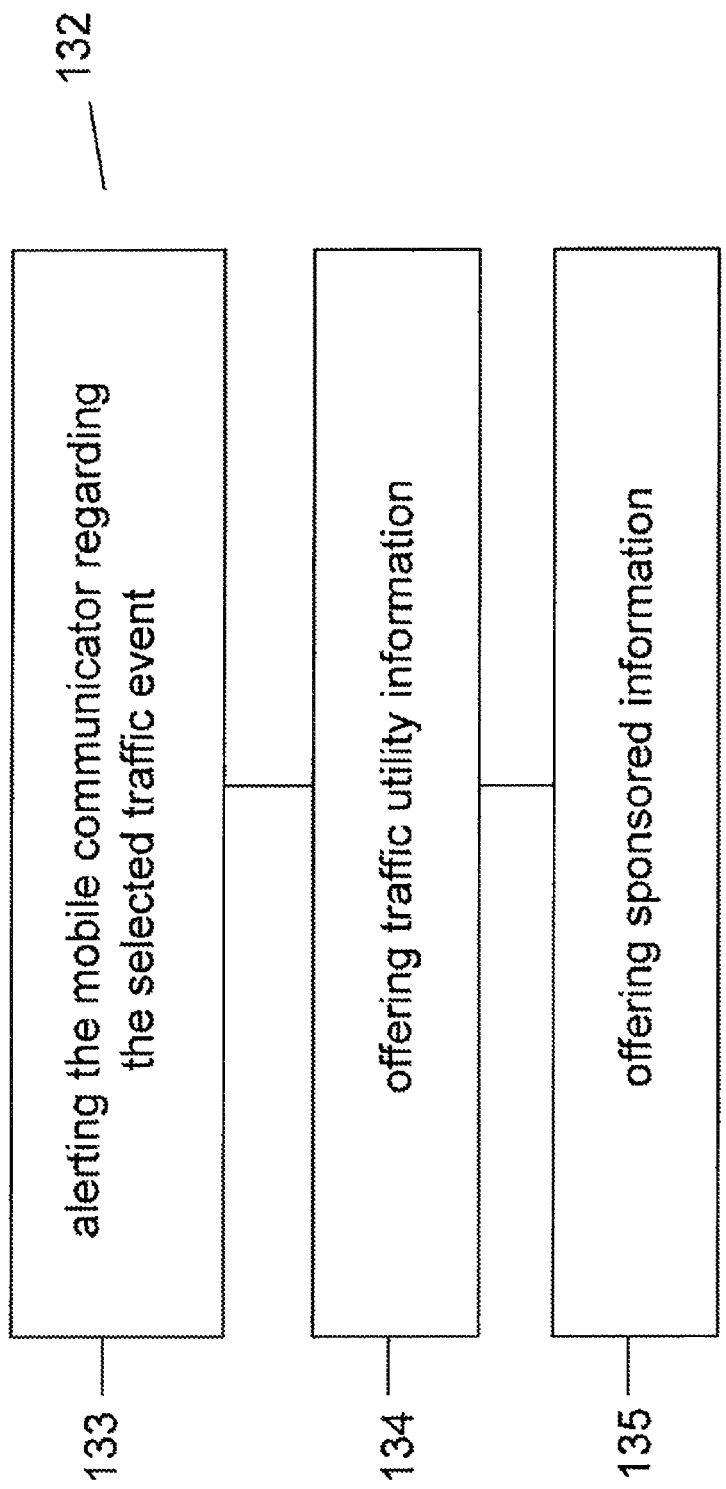
FIG. 7 illustrates a hierarchy of alert messages 133-135.

FIG. 7 illustrates that sponsored information can be offered in a hierarchical manner within step 132. Embodiments include: (step 133) alerting the mobile communicator regarding the selected traffic event, (step 134) offering traffic utility information, and (135) offering sponsored information, such as an advertisement.

The hierarchical information may be offered in hierarchical formats, or hierarchical components. These hierarchical components may include: an audio component, a text component, an SMS, a video component, a radio broadcast component, a television broadcast component, a multimedia component, and a multimedia messaging service component.

The hierarchical information may be offered in conjunction with the hierarchical structure of the user-zone or the event-zone embodiments of FIGS. 5H-I. In some embodiments, a simple ring-tone is sent when the mobile communicator enters the outermost hierarchical event-layer 127i-1. Subsequently, when the mobile communicator enters the next hierarchical event-layer 127i-2, a text message is sent to the mobile communicator's cell phone. Finally, when the mobile communicator enters hierarchical event-layer 127i-3, an application is launched automatically on the cell phone to rely more in-depth traffic information.

The video/television/media information in general, and the advertisements in particular, may be offered in streaming format, in download-and-play format, and in any other kind of audio-visual format.

Embodiments include the TSP generating a passive audio alert message for the driver by generating a modified ring tone on the driver's cell phone with an announcement that an accident lies ahead, and advising to take near-located exit 100. Alternatively, the modified ring tone may only alert the driver to the selected traffic event ahead, and a text message sent to the phone of the driver may display the expected delay or other relevant traffic information.

Once the driver takes exit 100 and opens the cell phone for further information, an application may launch automatically, or the driver may be invited to launch the application (step 133). Once the application is launched, it may present additional traffic utility information, such as a live video feed from a traffic helicopter, showing the accident site, or a web-based map, highlighting the delayed routes, including the actual estimated delay times for the main route and the primary alternative routes, and possibly identifying non-delayed alternative routes (step 134). This can be followed by step 135, where sponsored information is offered as e.g. web-based advertisements, or direct single-cast of an advertisement to the cell phone of the driver. The ads can also be placed on the screen simultaneously with the traffic utility information.

Examples of sponsored information include the ads of the restaurant, located near exit 100. Or the announcement of ongoing sales at the neighboring department store. Or a promotion (such as a price reduction) announced by a nearby gas station. The knowledge of the time delay will assist the driver to decide which promotional offer to accept at the nearest exit 100. The driver may prefer utilizing the service to avoid sitting in traffic for an inordinate amount of time, and instead using the time of the traffic jam for some overdue shopping.

In some embodiments, once the mobile communicator launches an application on his or her cell phone, the TSP may make part of this application to relay individual location information back to the TSP. In these embodiments, the TSP receives one more type of traffic information: the individual speed of the mobile communicator, beyond the average speed information, available from the cell-towers. This individual information can then be one of the collected traffic information used in step 111.

Some embodiments of the passive traffic alerting method 100 can be supported by the sponsors of the advertisements. As such, some embodiments can be offered without charge, in contrast to many present, fee-based services.

Mixed embodiments are also possible. In some cases the basic passive traffic alert may be offered free of charge, but additional components of the hierarchical messages may be fee based. For example, the more detailed traffic utility information may be provided for a fee, when the driver launches an application on his cell phone. Or, if the driver accepts an invitation for a promotional event, such as a sale in a nearby department store, then the traffic utility information may be offered free of charge.

Many forms of invitations can be implemented within the method 100. For example, a sponsor may offer a coupon to the driver in an electronic format. A particular implementation is that the coupon contains a bar coded portion attached to the invitation. Thus, the driver can take advantage of the invitation by driving to the offering department store, purchase the offered item, and during check-out swipe her cell phone with the stored bar code on its display over the laser scanner of the checkout counter.

Many other promotional items can be offered electronically, e.g. the tickets of a nearby sports game or of an entertainment event. In some embodiments, the ticket itself, possibly with a bar code or with any other identifying mark, can be sent electronically to the cell phone of the driver. Any one of these electronic promotional items, such as barcodes, can offer free products or services, or partial credit toward a full price.

In some other embodiments the promotional items may offer delayed access, e.g. the sponsoring department store may offer a coupon, which is valid for a multi-day period. Or, if a department store learns that at a future time there will be a traffic jam nearby, e.g. because of a construction of an overpass, then the department store may transmit to the driver coupons and barcodes which are valid at the future time of the traffic jam.

Some embodiments include "location-awareness" components. For example, on a highway leading from California to Nevada, a traffic accident occurs. The TSP determines the location of the mobile communicator e.g. from the data provided by the cell-phone service provider. If it is determined that the mobile communicator crossed the state-line and is in Nevada already, then not only promotional messages of local stores can be forwarded to her cell phone, but also gaming offers, e.g. bets which can be placed through the cell phone.

Some embodiments include various control mechanisms regarding the ring-tone overriding function. To avoid enabling or even allowing the creation of undesirable ring-tone overrides, various oversight functions can be implemented.

Figure 8:
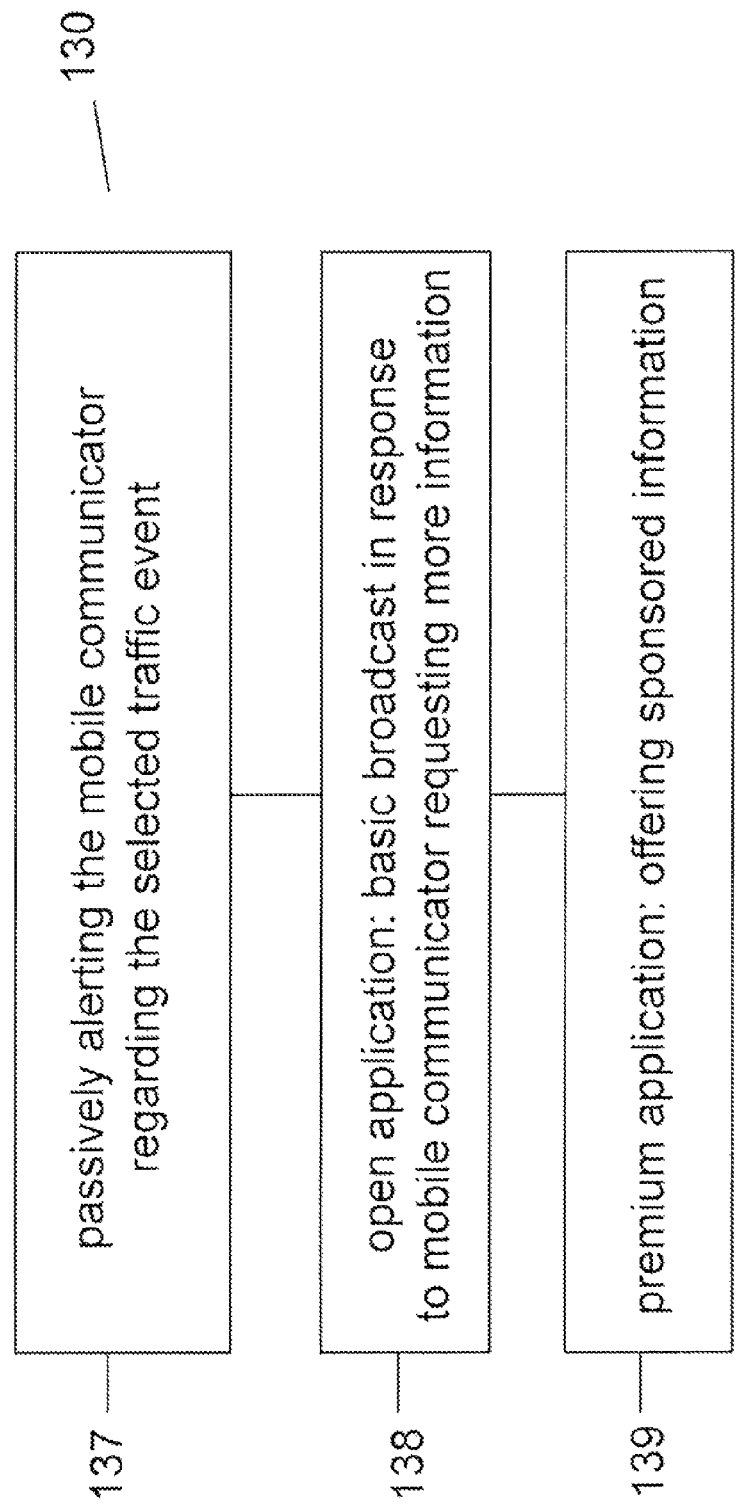
FIG. 8 illustrates a multi-level messaging embodiment.

FIG. 8 illustrates an embodiment of messaging the mobile communicator. The TSP can alert the mobile communicator with a passive alert message regarding the selected traffic event in step 137.

Then, in an open application, the TSP can provide basic broadcast information in response to the mobile communicator requesting more information in step 138.

Finally, in a premium application, sponsored information can be provided to the mobile communicator in step 139. The sponsored information can be of any variety described within this application, including in-depth traffic information, location based services, such as parking information, sales-related information, event information, promotional offers.

In some embodiments mobile communicators can program their interests through their cell phones, or through any other electronic communication device, such as their computer, specifying the type of promotional offers they more interested in receiving, or whether they are interested in getting alerted about other routes, such as their family member commute routes.

In some embodiments the delayed mobile communicator may be invited to specify third party alerts, e.g. the TSP may offer alerting a family member or a co-worker of the delayed mobile communicator.

In some embodiments, the mobile communicator is enabled to interact with the mobile communication device via voice commands. Embodiments include ordering the mobile phone to launch a traffic-related application, or to modify the user-zone, or to notify a third party about the delay the mobile communicator is experiencing.

In some embodiments the TSP responds to the mobile communicator's requests by an Interactive Voice Response (IVR) system. For example, the ring tone may alert a driver of a traffic event ahead. In response, the driver may call a pre-programmed number, preferably by a single click on the phone. From this number, the driver may be provided further information regarding the traffic event.

Figure 9:
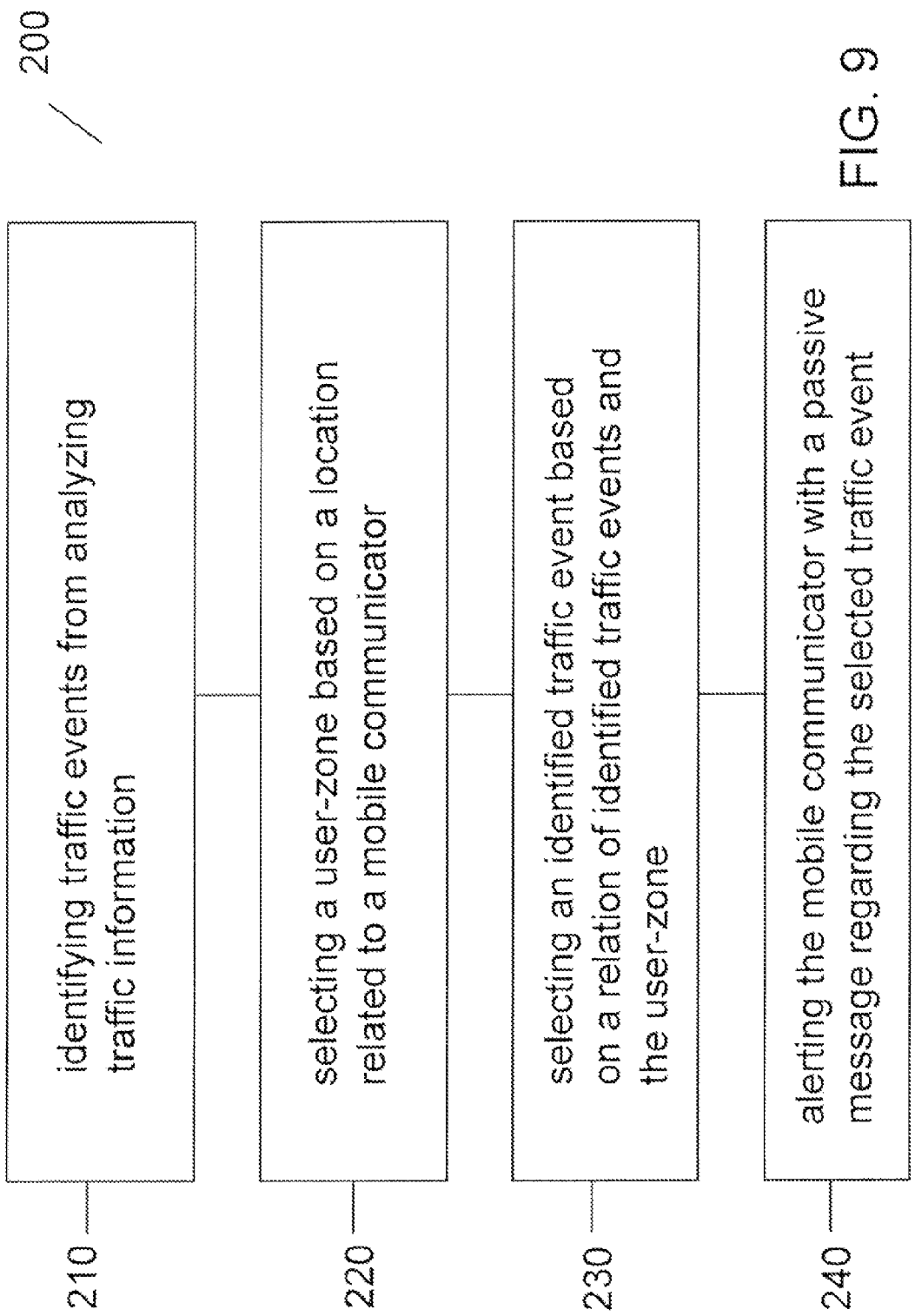
FIG. 9 illustrates an alternative embodiment 200.

FIG. 9 illustrates a related traffic alerting method 200, including the steps identifying traffic events from analyzing traffic information (step 210), selecting a user-zone based on a location related to a mobile communicator (step 220), selecting an identified traffic event based on a relation of identified traffic events and the user-zone (step 230), and alerting the mobile communicator with a passive message regarding the selected event (step 240).

Figure 10:
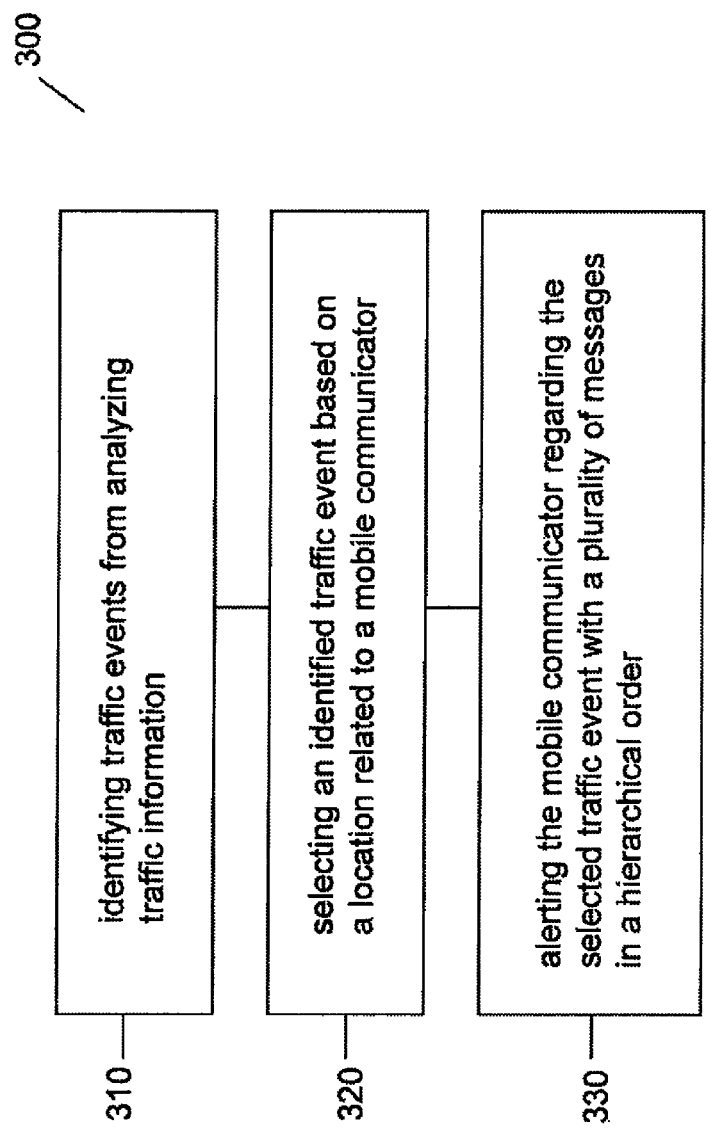
FIG. 10 illustrates another alternative embodiment 300.

FIG. 10 illustrates a related traffic alerting method 300. Method 300 includes identifying traffic events from analyzing traffic information (step 310), selecting an identified traffic event based on a location related to a mobile communicator (step 320), and alerting the mobile communicator regarding the selected traffic event with a plurality of messages in a hierarchical order (step 330).

Figure 11:
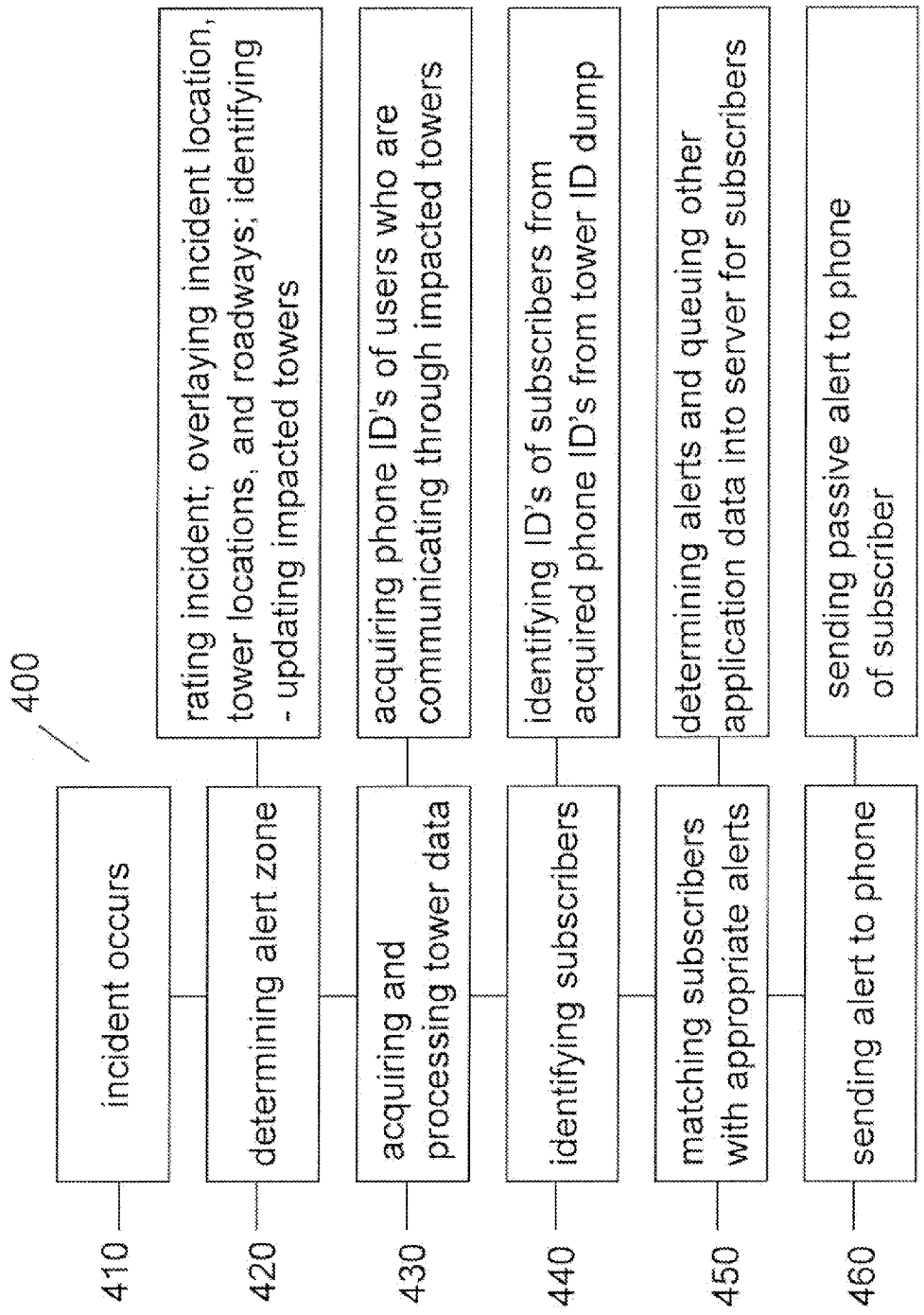
FIG. 11 illustrates an alert message generation method 400.

FIG. 11 illustrates embodiment 400 of a traffic alerting method. In particular, FIG. 11 shows the generating of the alert message in detail. In this embodiment, once the traffic event or incident occurs (410), in step 420 a determining of the alert zone gets carried out. An operator, agent, or traffic service provider, may first rate the incident data: how serious is the incident, how long delays can be expected. The ratings can be based on multiple factors, including video, helicopter, police, sensor, remote camera and other types of data. The rating of the traffic incident can be identified by carrying out earlier-described step 110.

Then the operator or agent can overlay three types of maps: a location of the incident, the map of cell phone towers, and the roadmap. From the overlaying of these three maps the operator or agent can identify the alert zone, or event zone. In this embodiment the alert/event zone can be identified in terms of mobile communication stations, such as cell phone towers. The towers which are within the alert zone will be referred to as impacted cell phone towers. They include the towers in whose vicinity the traffic incident occurred, plus the towers along which a buildup of a traffic jam is either expected, or already observed. The extent of the alert/event zone can be updated repeatedly: it can be expanded or contracted as events on the ground evolve: expanded as the traffic jam builds up and contracted as the traffic obstacle gets removed.

In the same step 420 the service provider may determine the alert which corresponds to the incident. E.g. the nature of the traffic event/incident can be determined. Examples include: the alert may specify the duration of the delay, or the type of the accident (e.g. how many cars are involved, etc.)

In step 430, cell phone tower data can be acquired and processed. For example, the identification numbers, or IDs, of mobile communicators can be collected from the impacted cell phone towers. This will identify for the service provider all cell phone users within the alert zone. This acquisition may be referred to as lower ID dump.

In step 440, the subscribers can be filtered out from the ID'd cell phone users, whose ID was acquired from the impacted towers. This will enable the service provider with a list of users, or mobile communicators, who should be provided with service from the dumped IDs.

In step 450, matching of appropriate alert can be performed. In some cases this involves determining an appropriate alert. Embodiments can maintain control over applications which generate the alert message. These embodiments can avoid the generation of inappropriate messages, which can be an important consideration. This control function is sometimes referred to as a gateway function, or "gatewaying".

In the same 450 step, other application data may be queued on the servers of the service provider. These data may include making further data available, as well as video, audio and other type of information, regarding e.g. the traffic incident. This step readies other information to provide full information application to the cell phone of the user.

In step 460 the composed appropriate message can be sent to the phone of the subscriber of the service. This message is typically a passive alert message.

Figure 12:
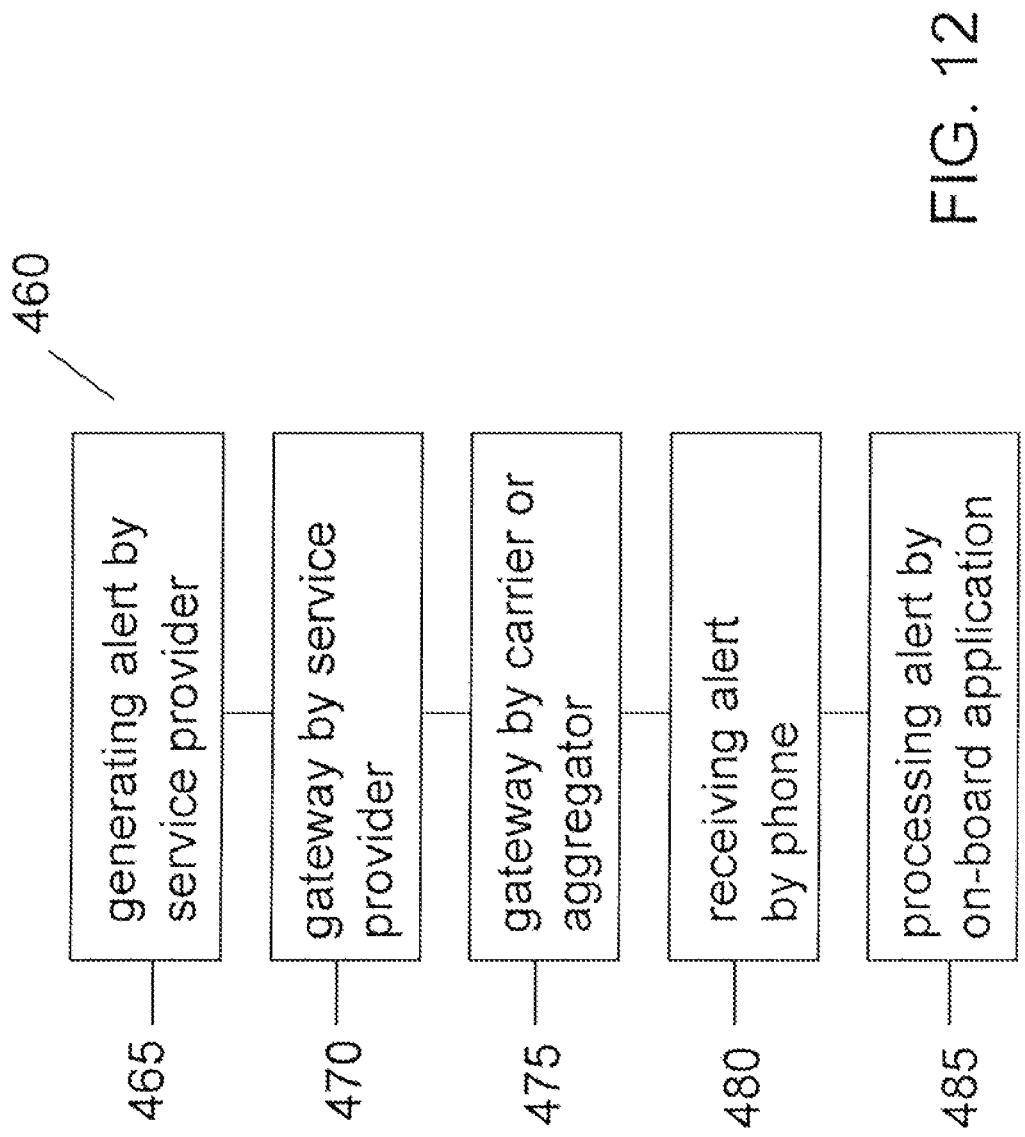
FIG. 12 illustrates an embodiment of the alert message transfer protocol.

FIG. 12 illustrates in more detail the path 460 of the alert message once it has been generated by the service provider.

In step 465 the alert message is generated, as described e.g. in steps 410-450 above and in steps 510-550 below.

In step 470 the service provider provides a gateway service. As indicated above, a purpose of this service is to prevent unauthorized users to generate inappropriate messages. In some embodiments the gateway service provides an authentication code associated with the alert message.

In step 475 the carrier, or aggregator also operates a gateway service. In some cases this carrier/aggregator gateway can search for the authentication sign from the service provider's gateway, and keep or discard the alert message depending on whether proper authentication has been identified.

In step 480 the mobile or cell phone of the individual subscriber or user may receive the alert message from the carrier.

In step 485 the alert message is actually processed by a client or application running on board of the cell phone of the subscriber or user.

Figure 13:
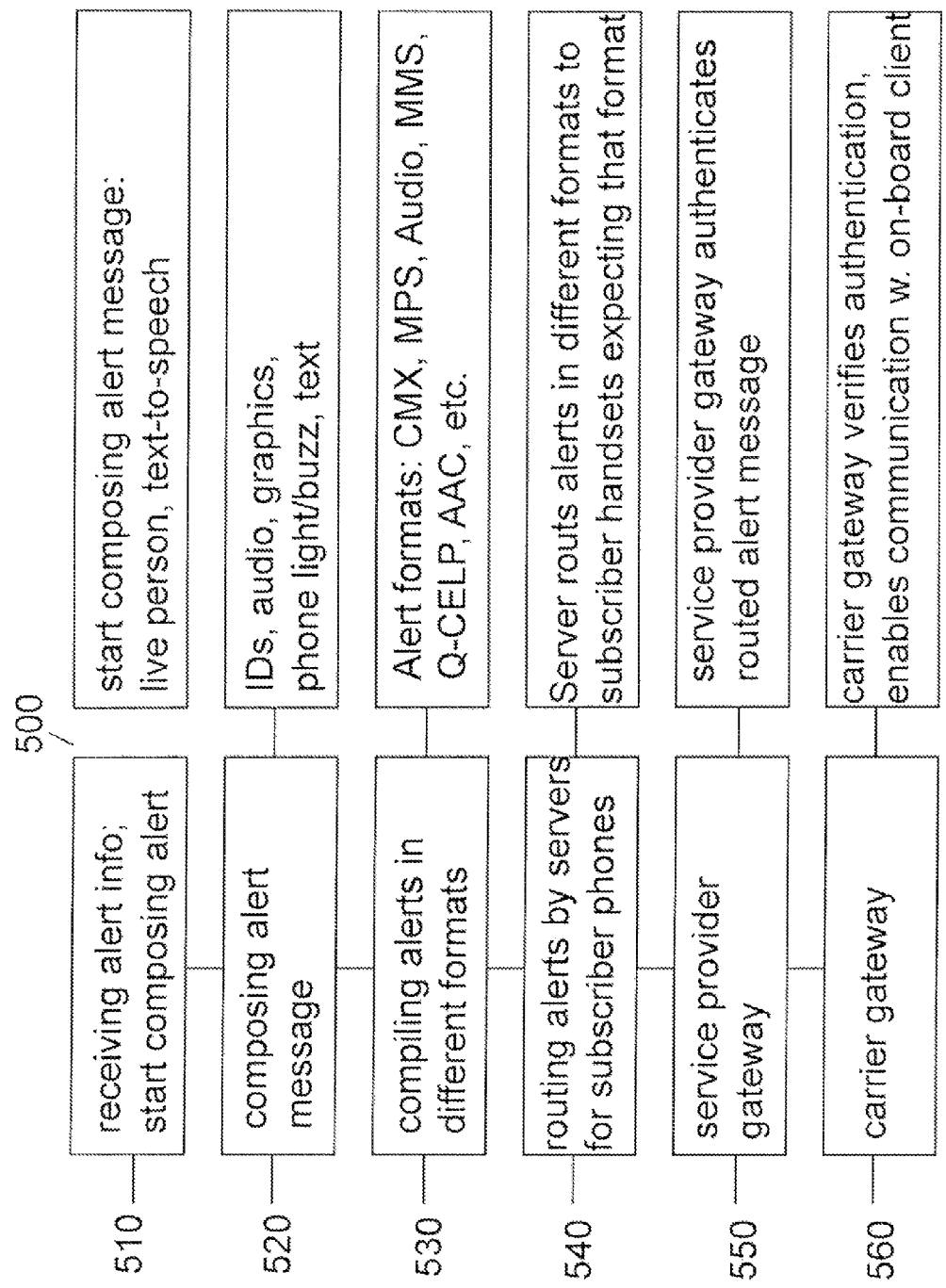
FIG. 13 illustrates an embodiment of the alert message generation method 500.

FIG. 13 illustrates another embodiment 500 of the method. Embodiment 500 shows in detail the generation of the content and format of the alert message.

In step 510, alert information is received by the system provider. In response, the system or service provider may start composing an alert message. In this first step, the alert message could be composed by a live person. This step can be performed in parallel to step 420, where the incident is rated. The live person may integrate information from various sources, including police reports, video feeds, cell tower data about the speed of passing motorists, sensors, cameras, etc. Then the live person may construct the alert message. This may involve composing a live message, or may involve text-to-speech conversion.

In step 520 the alert message can be composed. The alert message can involve an audio component, graphics, and various alert methods by the phone, such as buzzing, lighting up, vibrating, blinking, displaying text, or any other triggering. In some embodiments the phone may have a "talking telephone" application present, which makes the phone "talk" to the subscriber.

In step 530 the alert may be compiled. This may involve alert formats, including Qualcomm-CMX, MPS, Audio, Q-CELP, AAC and any other codecs for cell phones. It can also involve Multi Media Services (MMS), which can include audio, video, and text components. In some cases proprietary formats can be also utilized. This step maybe carried out in parallel with step 450 above.

In step 540 the server formats the alert message for the phones. In some embodiments the acquired and filtered IDs carry the handset profiles. These handset profiles carry information concerning the format the handset expects to receive its messages. Today about 2800 types of handsets are in use, and they require a wide variety of formats. These include the universal 3$^{rd}$ generation standard 3gpp, Apple's AAC, MP3, png, jpeg formats and many other types of restrictions, such as maximum number of characters etc.

To accommodate this expectation, the servers may establish a large sorting mechanism. This includes a sorting table, which lists all the subscribers and their handset profiles. In step 530 the alert message has been compiled in all known formats. In sorting step 540 the server may rout the message in a particular format to all those handsets, whose profile indicates that they expect the message in this particular formal. In simple terms, the server assigns the alert message in a specific format to those handsets which expect the message in that specific format.

In some embodiments, the subscriber may also specify additional preferences, such as at a given time he prefers to receive the alert only as a vibration but not as a voice alert. The handset profile may carry this information as well. In response, the server may rout an alert message to the subscriber, which is formatted accordingly, e.g. without the voice component.

This system is different from the system often used today, when the sorting system includes a large number of stacked dedicated servers, each specialized for formatting messages into a single format.

Step 550 illustrates the gateway function by the service provider, where the alert messages can be authenticated by a gateway.

Step 560 illustrates the gateway function by the carrier, which checks the authentication by the service gateway.

When finally the alert message reaches the phone, it will be processed by the on-board application, as e.g. in step 485 in FIG. 12. These mirroring gateways 550-560 allow for a safe communication between the service provider and the handset, and in particular the client on the handset, of the individual subscriber.

Other embodiments of the above method include a broadcast-based Mobile Alerting Network (MAN) Platform and service 1000, implemented in a push-to-talk-equivalent (PTTE) environment.

Figure 14:
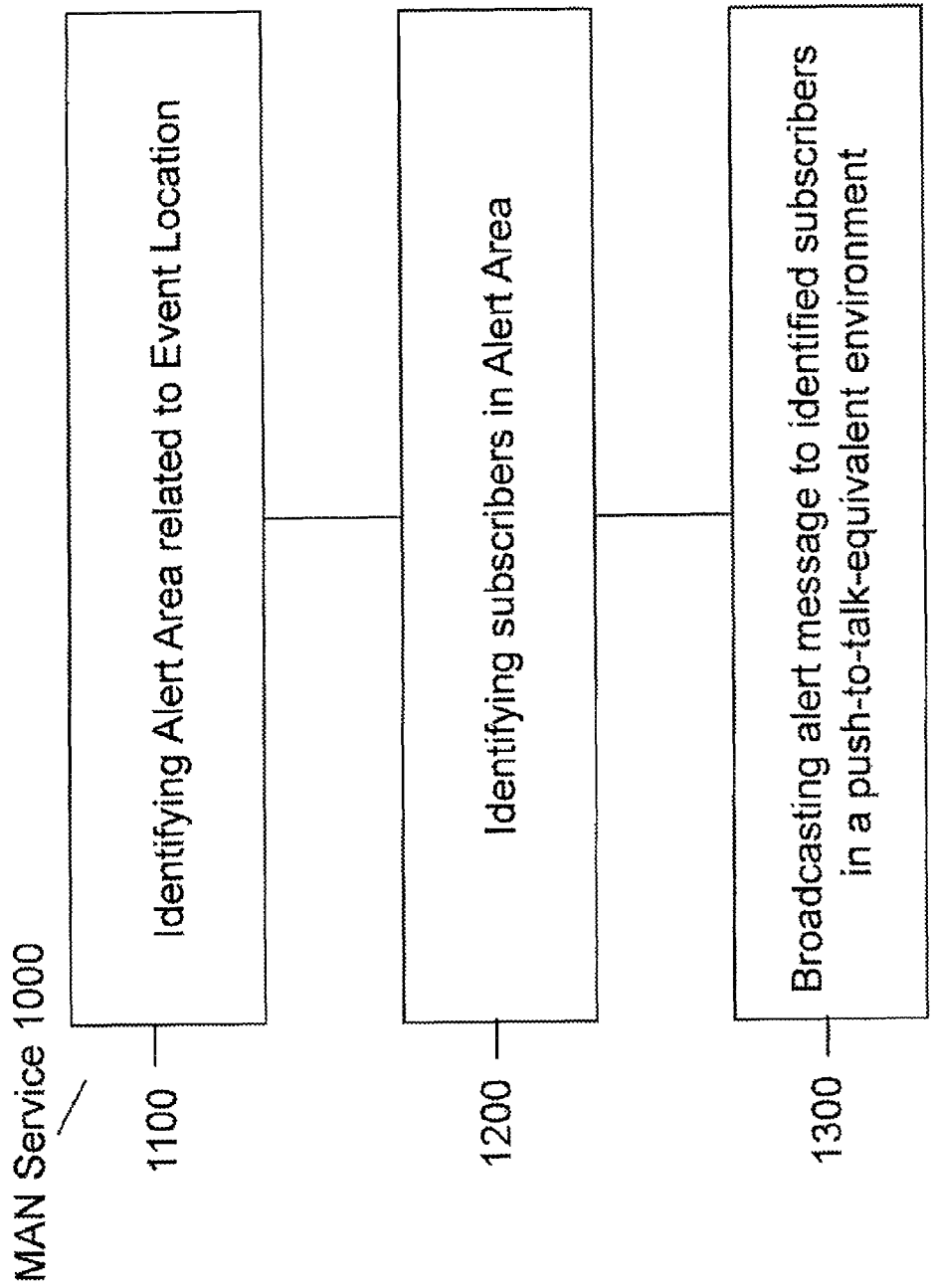
FIG. 14 illustrates an embodiment of a MAN Service 1000.

FIG. 14 illustrates the operation of the MAN service 1000.

Step 1100 may include identifying an Alert Area corresponding to an event location.

Step 1200 may include identifying subscribers in the Alert Area.

Step 1300 may include broadcasting an Alert Message to the identified subscribers in a push-to-talk-equivalent environment.

An example of MAN service 1000 can be practiced as follows.

In step 1100, a traffic event can be identified, e.g. by a "Sky Platform": "Accident occurred at exit 39 on highway 80". There can be many ways to identify the accident as described earlier in relation to steps 110, 210 and 310. These include: from traffic camera information, from Cell Tower data, signaling slow car speed, from roadside sensors, or from traffic helicopters, as described earlier. The traffic event can be identified by using a single information source, or by integrating information from more than one of the above sources, as described earlier in this application.

The event can be any one of a wide variety of events, including a traffic accident, a weather alert, a recreational or sports event, or an E911 emergency situation, e.g. a chemical or hazardous material spill, possibly threatening with a health hazard.

The Sky Platform can then determine an Alert Area passively i.e. without requiring communication with a central system of the Carrier Network. The Alert Area can be defined in terms of cell towers: the Sky Platform identifies which cell towers belong to the Alert Area. In the above example, the Alert Area includes the Cell Towers which manage the cell phone traffic in a suitably defined vicinity of exit 39 on highway 80. The Alert Area is an embodiment of the event zone 127, described earlier.

In step 1200, a group of subscribers of the Broadcasting Alert system can be identified in relation to the Alert Area, e.g. by a Sky Tracker Module. The Sky Tracker Module can acquire the list of users who are presently registered with or are in communication with the Cell Towers in the Alert Area. Then the Sky Tracker Module can cross reference this user list with a list of subscribers of the MAN service. The subscribers may be identified e.g. by overlaying the event zones 127*a-p* of the Alert Area with the above described user-zones 123*a-p*, preset by the subscribers.

Other methods include identifying subscribers by operating a Sensor Array, as described below in relation to Sensor Array-based Mobile Broadcasting Alert (SAMBA) service 2000 below.

The subscribers can be identified by their subscriber mobile ID, or by their International Mobile Equipment Identity (IMEI), or by any other handset identification information, such as an IMSI or MIN number, or by their phone number.

In cases of extreme emergency, such as a radioactive or chemical spill, a rapidly advancing fire, or a mudslide, all users will be selected, not just subscribers.

In step 1300, an Alert Message 1301 can be prepared and broadcast to the identified subscribers by a master broadcaster. The master broadcaster can be a Broadcast Module of a server of the MAN service 1000.

In prior systems, such as user-to-user push-to-talk systems, the communication was only point-to-point type. Master broadcasters were not used in push-to-talk environments.

In contrast, the MAN service 1000 may broadcast the Alert Message 1301 in a Push-To-Talk (PTT) network or Integrated Digital Enhanced Network (IDEN). PTT and IDEN are mobile telecommunications technologies, which provide their users the benefits of a trunked radio and a cellular telephone. Since in these systems the traffic is unidirectional (when the user signals the desire to talk by pushing a button, the traffic in the incoming direction is stopped), the required frequency widths of the channels are narrower. Thus, these PTT and IDEN systems are capable of managing more users in a given spectral space, compared to analog cellular and two-way radio systems. Some of the techniques used by PTT and IDEN systems use speech compression and time division multiple access (TDMA). The MAN service 1000 may also be integrated into a GSM system.

The Alert Message 1301 can include a Short Message System (SMS) message.

Figure 15B:
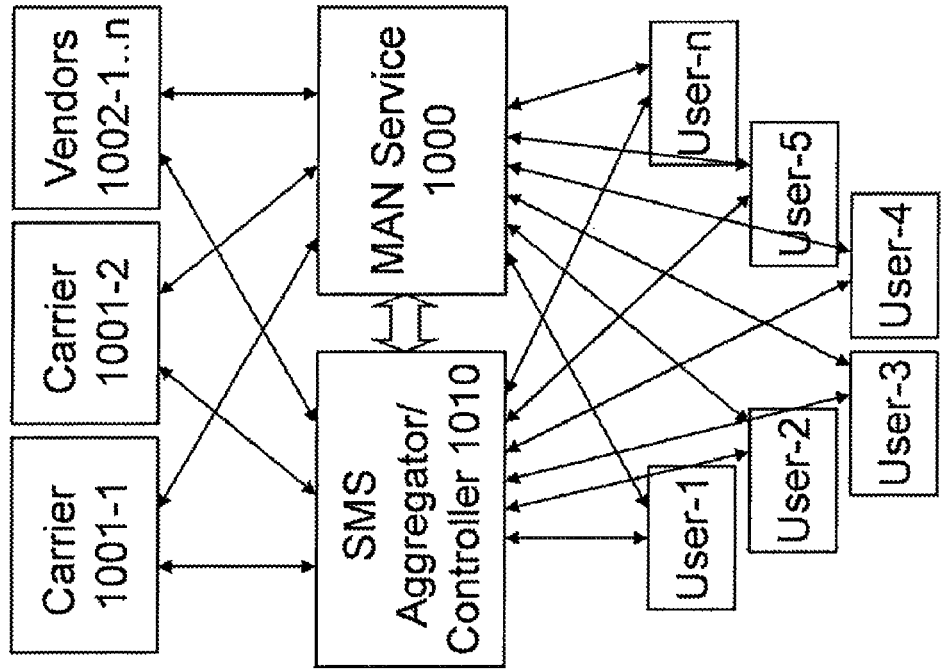
FIGS. 15A-B illustrate embodiments of a MAN System.
Figure 15A:
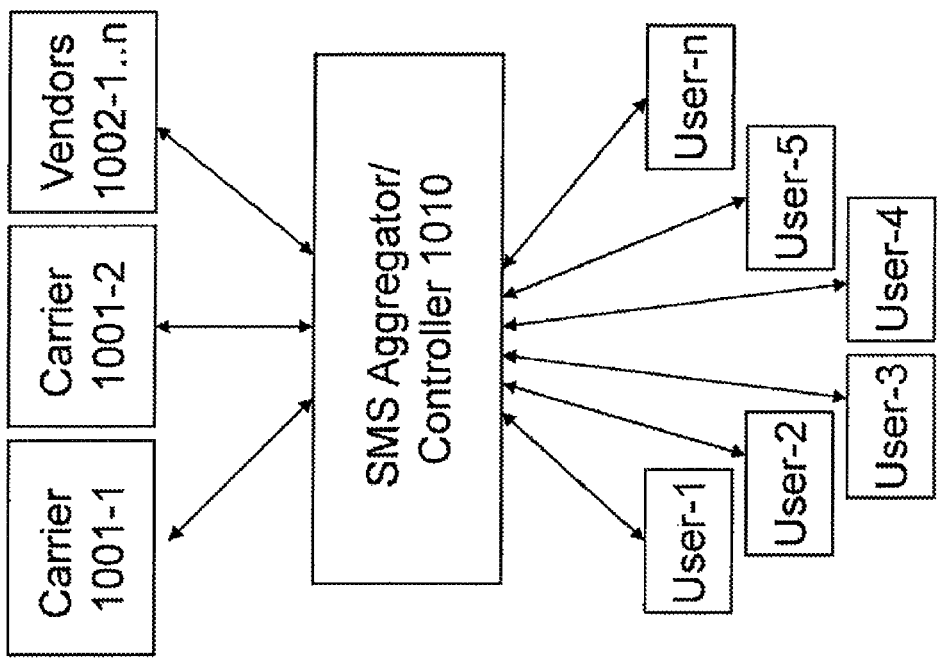

FIGS. 15A-B illustrate a network architecture of the MAN service 1000, using SMS messages.

FIG. 15A illustrates that in existing carrier networks the short messaging system (SMS) allows users to send short messages to other cell phones. These messages are typically sent to the full (typically ten digits) phone numbers of the targeted single users. In commercial applications, short codes can be utilized as target "phone numbers".

In an example a TV or radio broadcast invites listeners to send a purchase order in the form of a predefined SMS message addressed to a short code of only five digits, where the short code is linked to a full regular phone number. E.g. a disc jockey can prompt her listeners to purchase and download a ring tone composed by a band called "Band" onto their phone by announcing: "Text 'Band' to 12345 to get your new ringtone composed by the Band". Texting "Band" to 12345 by a user may prompt a commercial transaction: the downloading of the band's ring-tone to the user's phone, possibly associated with a payment for the download. Other examples include a purchase of a band-related memorabilia or a placing a vote in a contest. The payment for this commercial transaction is sometimes linked to the phone bill of the user, or to a previously set up account.

Managing these commercial transactions is a considerable task. The actual commercial transaction is carried out by prompting a vendor to deliver the purchased item e.g. through a download or through regular channels such as by mail. In turn, the user's account is reached and billed. The manager of these transactions communicates with the Carrier to get authorization for the transactions and to pay for the services provided, among others. If the user has an account with one Carrier but the transaction is taking place through another Carrier, then a Carrier-to-Carrier communication also takes place.

To manage these complex tasks, presently cell phone Carrier Networks 1001 typically utilize SMS Aggregators, or SMS Controllers 1010. These SMS Aggregators, or SMS Controllers 1010 manage the SMS-based transactions in large volumes, in bulk. E.g. an SMS Aggregator 1010 may enter into a contract with a Carrier 1001 for managing a million SMS messages per month. These SMS Aggregators/Controllers 1010 can be set up physically at or near the high level national or regional centers of the Carrier Networks.

The network topology can have different forms. In same cases the SMS Aggregators 1010 have direct connection to the Users-1 . . . n, in others the primary connection is between the Users-1 . . . n and the Carrier Networks 1001.

An even smaller number of service providers, sometimes a single national level entity, may manage the assignment of the short codes. The assignment of a particular short code to a particular full phone number can be purchased for specific periods, e.g. the run of a promotion campaign, or a TV program. Or, it can be purchased for a long period, on an ongoing basis.

FIG. 15A illustrates certain existing SMS-based systems. Users-1 . . . n can be in communication with the SMS Aggregator/Controller 1010, e.g. sending a text message to a short code, requesting a commercial transaction. The SMS Aggregator/Controller 1010 can be in communication with a Vendor 1002 and facilitate the commercial transaction, such as the mailing of a T-shirt of a band to a User. The SMS Aggregator/Controller 1010 can also communicate with Carrier 1001-1, on whose network (towers, servers, switches, etc) the actual transaction is taking place, e.g. on a "fee per message" basis. The fee can be a fixed sum or a "revenue-split" percentage of the transaction. If some of the users, such as User 1 and User 2 have their phone account with a different Carrier 1001-2, then the SMS Aggregator 1010 may locate the accounts of User 1 and User 2 at Carrier 1001-2 and bill these accounts in relation to the transaction on Carrier 1001-1.

The SMS Aggregators 1010 often use the TCP/IP, such as the short-message-peer-to-peer-protocol (SMPP) to place their messages in bulk. The commercial aspects, such as the actual payments, can be carried out in the framework of premium SMS, or PSMS systems.

FIG. 15B illustrates embodiments of the present MAN Service 1000. The MAN Service 1000 can be provided instead of, or in parallel to the regular SMS Aggregators 1010. In some cases, there can be a communication link between the MAN Service 1000 and the SMS Aggregator 1010. The MAN Service and Platform 1000 can be connected between Users-1 . . . n and Carrier 1001-1 and Carrier 1001-2. The MAN Service and Platform 1000 can also directly communicate with the Vendors 1002-1 . . . n.

In some embodiments, the MAN Service 1000 can communicate by broadcasting promotional offers to the Users-1 . . . n in relation to the Alert Messages 1301, in a Push-To-Talk-equivalent environment, as described next.

Figures 16A, 16B:
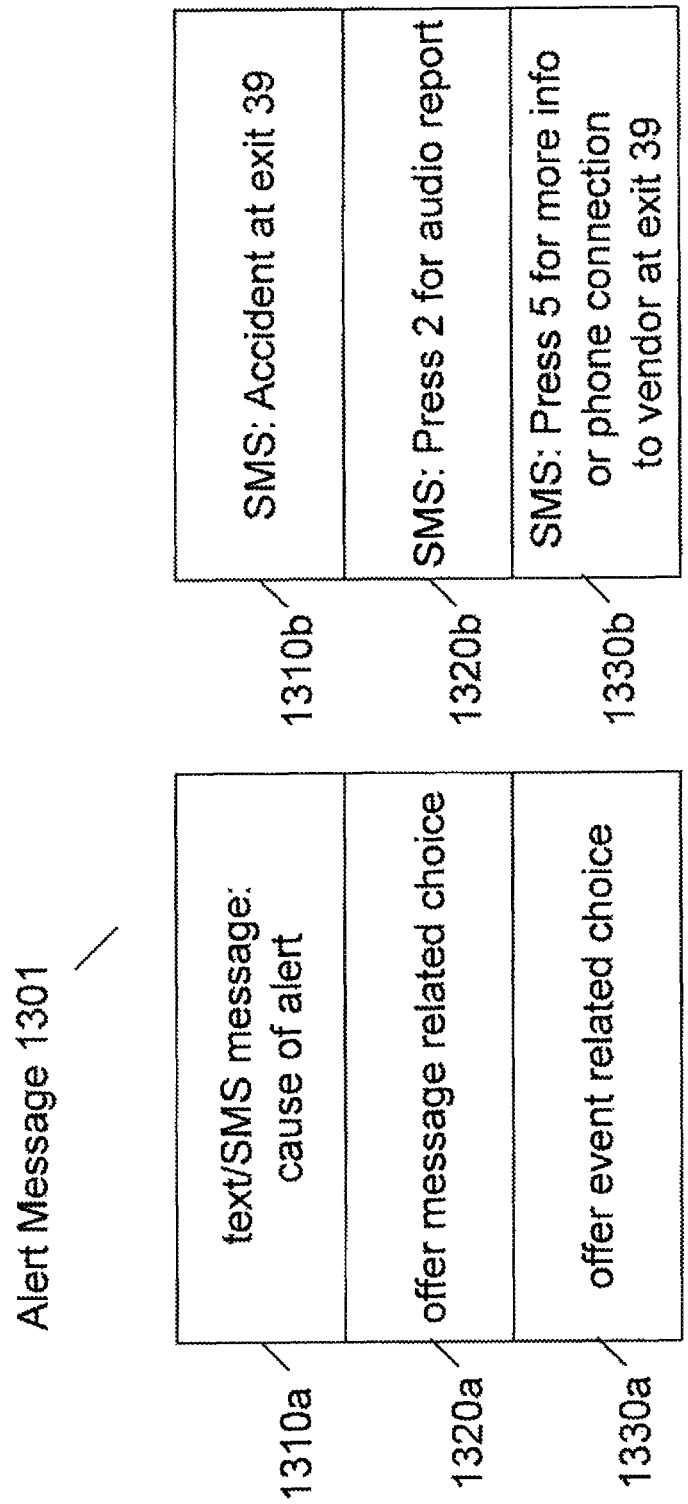
FIGS. 16A-B illustrate an Alert Message 1301.

FIGS. 16A-B illustrate embodiments of some of the Alert Messages 1301 which can be sent by the MAN Service 1000. These Alert Messages 1301 can have more than one part. In some cases the Alert Message 1301 can contain three parts.

FIGS. 16A-B illustrate a general case of a three part Alert Message 1301. Part 1310a can alert the subscribers and inform them about the cause of alert, such as an event or an accident. FIG. 16B shows an example 1310b: the Alert Message "accident at exit 39" is displayed on the phone's display as an SMS message.

Part 1320*a* can offer Alert Message related choices in general. An example is 1320*b*: the phone displays the SMS: "Press key 2 for audio report", or "Press 2 to receive the Alert Message in audio format". In a rapidly increasing number of countries, manual operation of mobile phone handsets is prohibited while driving. In such countries opting to receive the message in audio format may be preferred by many user/subscribers. If the user/subscriber pressed "2" to receive the Alert Message 1301 in audio format, then portions of the Alert Message, such as the cause of the alert and subsequent event-related information can be delivered in audio format.

The Alert Message 1301 can be implemented in a "Push-To-Talk" environment. In such implementations the lead part 1310 of the Alert Message 1301 can already be an audio message. Implementations on Carrier Networks, which provide real Push-to-Talk services can include sending to and playing on the handset a direct audio announcement, without any action required from the subscriber, announcing that an accident happened at exit 39. This is an implementation of step 130 above, where the mobile communicator is alerted with a passive message, which does not require the launching of an application or client. In fact, it does not require any initial manual operation from the subscriber—an advantage in traffic-related applications, for example.

In "Push-To-Talk-Equivalent" (PTTE) implementations, the incoming SMS message may wake up the Alert Client, which has been downloaded onto the handset previously, to announce that "An accident happened ahead. For more information, press 2". In the rest of the application the PTT and PTTE implementations will be generally referred to as PTTE implementations.

Part 1330*a* may offer event related choices. Part 1330*b* is an example: the phone displays the SMS offering a "hot key" which translates to a phone number: "Press key 5 for more information or for a phone connection to a vendor at exit 39". Or, the phone speaker may state the same, if key 2 was pressed in 1320*b*. By pressing the hot key 5, the individual subscriber/user can retrieve further information. In some embodiments, pressing such a "hot key" can activate a client, which is capable of connecting to an Internet web address of a vendor describing a promotion through an Internet protocol. In other embodiments, pressing the hot key can connect the user to a vendor who placed the promotional Alert Message.

An example of 1330*b* is an SMS message being displayed: "At exit 38, all pizzas are 20% off at Domino's. For more information, press 5". Pressing 5 can activate a client on the handset, which proceeds to download a Multi Media message, such as an internet based web page, an audio, a video or a message in any other media format, which provides information about the offer at Domino's.

Several different types of multimedia messages can be downloaded on the phone, including coupons and bar-codes related to promotions, and more announcements. Such coupons or barcodes can be stored on board. When the subscriber walks up to the counter at Domino's to pay for his pizza, the subscriber may pull up the stored bar code on the screen of the cell phone and hand the phone over to the check-out clerk. The clerk may swipe the display over a sensor, which recognizes the bar code and give the customer the 20% discount.

Another example of 1330*b* is displaying offering an option: "To be connected to Domino's by phone, press 5".

Figure 17:
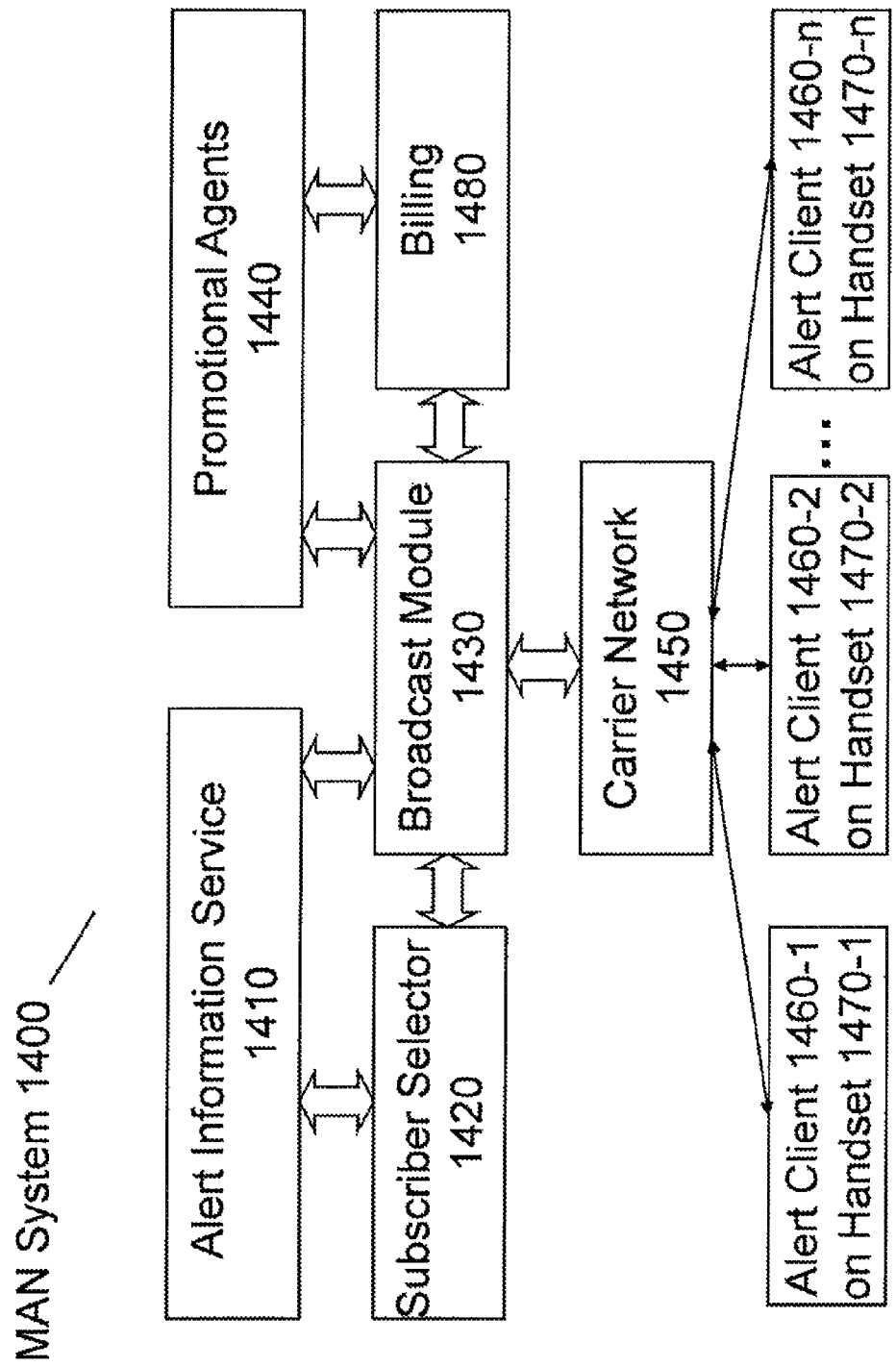
FIG. 17 illustrates a MAN system 1400.

FIG. 17 illustrates the modules and their interaction of a MAN system 1400, associated with the above MAN service 1000.

An Alert Information Service 1410 can provide the information subscribers are interested in and subscribed for.

Figure 18:
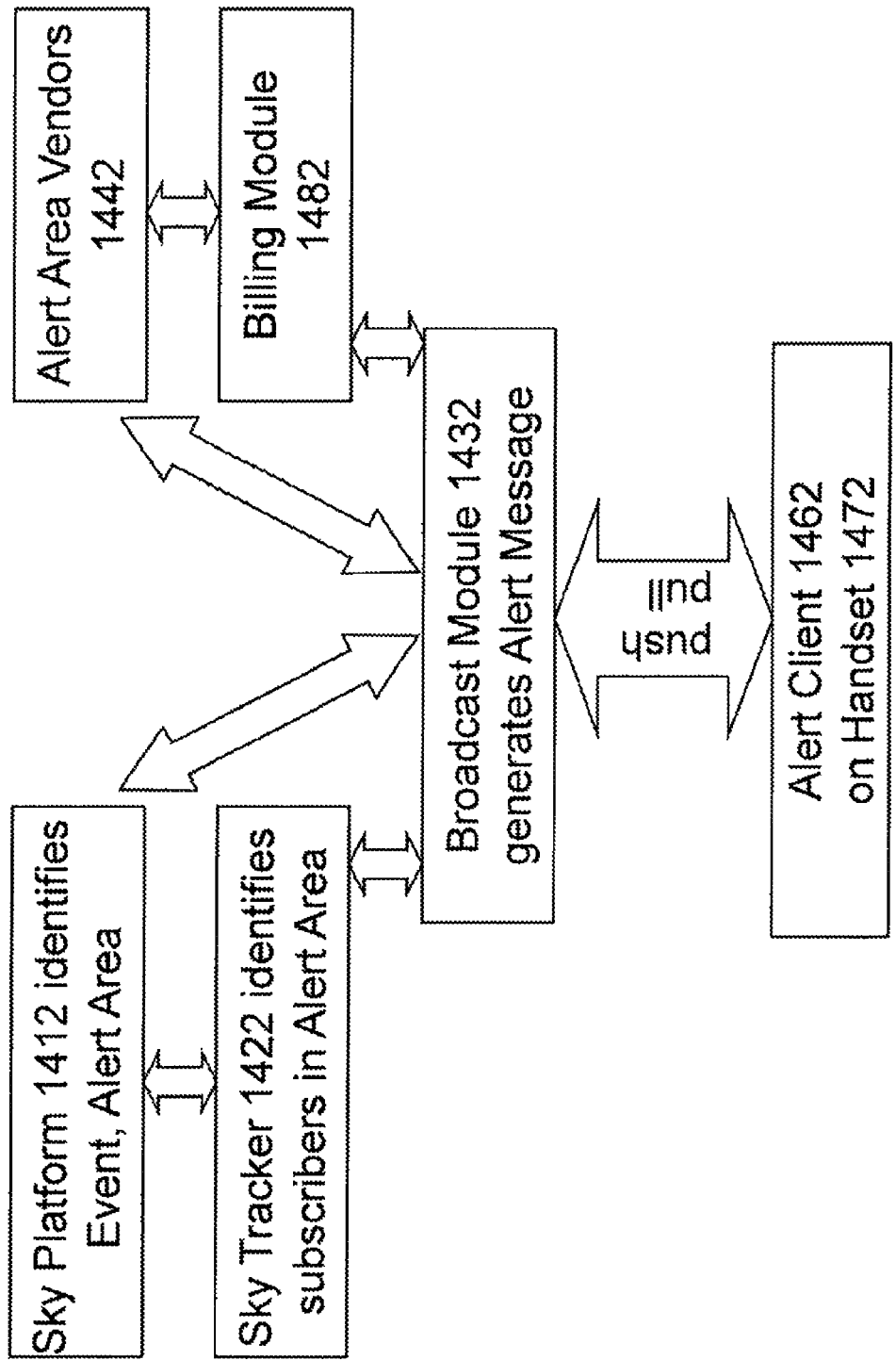
FIG. 18 illustrates a MAN system.

FIG. 18 illustrates a specific example of a MAN system 1400, where the Alert Information Service 1410 includes a Sky Platform 1412, as described above, which identifies traffic events of interest, such as traffic jams or hazard conditions, as described in relation to steps 110, 210, 310, and 1100 in previous embodiments. The Sky Platform 1412 may then determine the Event Location and a corresponding Alert Area in relation to the identified Event Location.

In the above traffic example, the Identified Event may be a traffic jam at exit 39. In this case the Sky Platform 1412 may identify the section of highway 80 between exits 35 and 39 as the Alert Area.

Returning to FIG. 17, the Alert Information Service 1410 may be coupled to a Subscriber Selector 1420. The Alert Information Service 1410 can provide information to the Subscriber Selector 1420, which identifies subscribers who should be contacted related to this information.

FIG. 18 illustrates that the Sky Platform 1412 can be coupled to a Subscriber Selector such as a Sky Tracker Module 1422 and can forward the Identified Event and Alert Area to it. The Sky Tracker Module 1422 can then select subscribers who may be interested in the information related to the Identified Event. This determination can involve cross-referencing the list of users registered at Cell Towers in the Alert Area with a list of subscribers.

In embodiments using e.g. Cell Tower data, no GPS application needs to be activated on the handset to locate the subscribers. These embodiments have higher operational speed and require less battery power from the handset than GPS based applications. Nevertheless, the Subscriber selector can also utilize GPS to locate subscribers in other embodiments. Yet other embodiments can use the Sensor Array-based Mobile Broadcasting Alert (SAMBA) systems 2400, as described below in relation to FIG. 25.

In the above traffic example, the Sky Tracker Module 1422 may identify the Cell Towers which serve the drivers in the Alert Area on highway 80 between exits 35 and 39, request and receive the list of all cell phone users who are registered at these Cell Towers, and cross reference this list of registered users with a subscriber list to establish which subscribers to reach.

The Alert Information Service 1410 can be a wide variety of other service providers, who provide information related to traffic, sports, finance, news, emergency, or entertainment. In many of these cases, the information service is not necessarily location based. In some implementations, the information is event based, such as the end of a ball game, or the closing of the stock market, or tickets becoming available for a show, or hotels rooms becoming available at a reduced rate, or the end of a bidding, betting, or voting period. In these cases, the Subscriber Selector 1420 may select all, or a large fraction of the subscribers who are within the service area.

The Subscriber Selector 1420 may contact a Broadcast Module 1430 with the Alert Information and the list of Selected Subscribers. In some embodiments, there is a direct communication link between the Alert Information Service 1410 and the Broadcast Module 1430. In some of these arrangements the Alert Message can be assembled without knowledge or reference to the Subscribers.

In the Example of FIG. 18, the Broadcast Module 1432 can receive communication form either the Sky Platform 1412 or the Sky Tracker 1422, or both.

In any one of these arrangements, the Broadcast Module 1430 may generate and assemble an Alert Message in response to the communication from the Alert Information Service 1410 and the Subscriber Selector 1420.

The Alert Message can contain the message portion 1310*a-b* related to the Identified Event and may offer the event-related promotional choices 1320*a-b*.

These promotional choices may originate at Promotional Agents 1440.

As FIG. 18 illustrates, such Promotional Agents 1440 may include Alert Area Vendors 1442 in the Alert Area, or in its proximity.

In the above traffic example, the Alert Area Vendors 1442 can include those fast food vendors, who are contracted with the provider of the MAN service 1000 and are located in the proximity of exits 35 to 39, such as the Domino's pizza at exit 37. For example, the headquarters of the Domino's fast food chain may have set up a running contract with the provider of the MAN service 1000, which lists the location of all Domino's restaurants where the MAN service 1000 is available. The contract may specify that every time a traffic event occurs, the MAN system 1400 shall identify the Domino's which is located within the Alert Area, e.g. the stretch between exits 35-39, as Alert Area Vendor 1442. This step is analogous to step 131, where information sponsors were identified based on the area of the handset user. Then the Broadcast Module 1432 can generate an Alert Message related to the traffic jam at exit 39, which includes an offer of discounted pizza at the Domino's located at exit 37.

As shown in FIGS. 17 and 18, the Alert Message is then broadcast by the Broadcast Module 1430/1432 to Alert Clients 1460-1, 1460-2, . . . 1460-*n* which have been downloaded onto the subscriber's Handsets 1470-1, 2, . . . n. The Alert Message is typically broadcast through one or more Carrier Networks 1450.

As discussed above, running an application on a handset can drain the power from the handset fast. Therefore, it is advantageous that the Alert Clients 1460 can be a small client on the handset. Thus, while the Alert Client 1460 is active on the handset, it may require only minimal power to operate and poses only a limited demand on the battery of the handset. In some PTTE implementations, the handsets may have only a minimal Alert Client 1460. And, as explained earlier, for the initial step of receiving the Alert Message, some PTTE implementations may not use an Alert Client 1460 whatsoever.

The Alert Message can be structured as follows. While the length of the SMS messages in principle could vary in a wide range, presently the length of the typical SMS message is 160 characters. Thus, implementations of the above three part Alert Message 1310-1330 can be 160 characters long.

The actual SMS of the Alert Message may contain the following components:

<date, time, message ID, size, hot key#>

The date and time can provide a time stamp for the message. The "message ID" can identify a prestored message already on the phone. In a simple example "message ID=1" can wake up a client on the cell phone which then generates the audio message: "To get more information about the event, press 5" (the number of the hot key). In more complex installations, a database can be stored on the handset, containing entries for all vendors who are associated with the MAN service 1000. In the above traffic example, "message ID=223" can identify Domino's as one of these vendors, generating the display or audio message: "To be connected to Domino's by phone, press 5".

In some implementations, the MAN service 1000 may not be based solely on location or traffic. E.g. the MAN service 1000 can be based on events. An example is a service associated with a sports club, such as the Yankees. This implementation of the MAN service 1000 may send an Alert Message to a subscriber when the Yankees game is over. A "message ID=272" may launch a pre-recorded audio announcement on the phone: "The Yankees game is over. To receive the result of the ball game, press 5".

The MAN service 1000 can be associated with a wide variety of events. The events can be weather related, e.g. alerting subscribers to tornados. Or, the service can be financial, alerting the subscribers if a stock goes below a price level: "The stock GOOG dropped below $500. To get a stock update, press 5".

Figure 19:
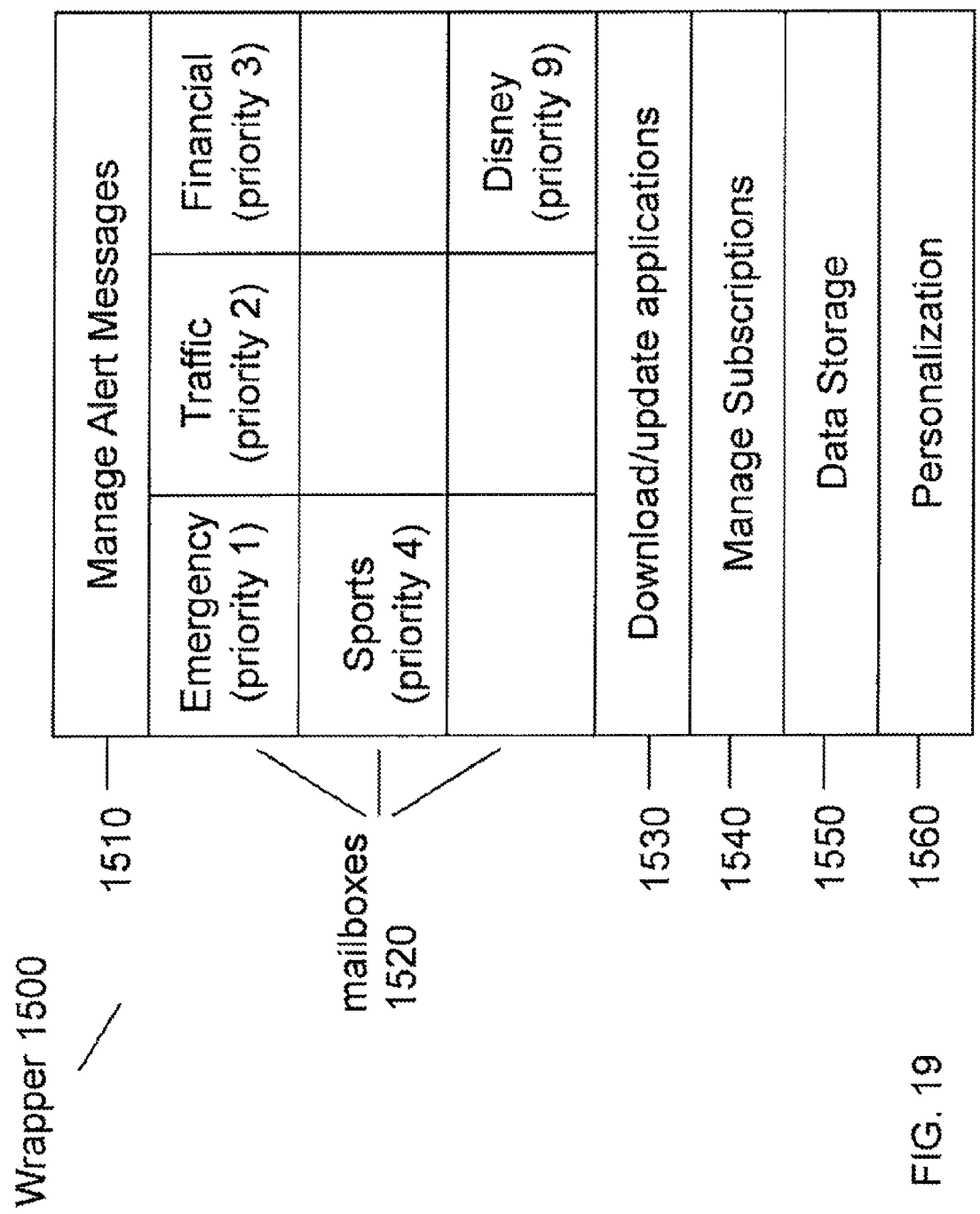
FIG. 19 illustrates a Wrapper 1500.

FIG. 19 illustrates that managing the Alert Messages in relation to the SMS queue and the various subscriptions in parallel may be a complex task. Some implementations carry out these functions with deploying a Wrapper 1500, possibly as a part of the Alert Client 1460.

The functions of the Wrapper 1500 may include:
  1510—Managing Alert Messages;
  1520—Managing a mailbox function, including prioritizing messages;
  1530—Downloading and updating applications;
  1540—Managing subscriptions;
  1550—Storing Data, related to messages and promotions; and
  1560—Personalizing.

In detail, the Alert Message Manager 1510 may be capable of (i) recognizing an incoming Alert Message within the SMS queue, (ii) pulling it from the queue without disrupting the active SMS sessions, and (iii) presenting the Alert Message to the subscriber.

It is often the case that the subscriber has several SMS sessions active on the handset. Some of these SMS queues can contain literally hundreds of SMS messages lined up. It typically requires manual operation (i) to move from one SMS session to another, and (ii) to scroll to the most recent SMS message.

If the Alert Message were treated as one of the regular SMS messages, it would not serve one of its central functions, alerting. The Wrapper Alert Message Manager 1510 is an application, which can review all incoming SMS traffic, and is capable of identifying the Alert Messages as non-regular SMS messages and process them accordingly. The Wrapper Alert Message Manager 1510 can pull the Alert Messages from the SMS queue and display them with the highest priority. In some implementations, the wrapper can perform these functions without breaking the queue of the regular SMS messages, e.g. without deactivating the active SMS sessions. The Wrapper Alert Message Manager 1510 is capable of performing these functions without manual operation required from the subscriber.

If a subscriber subscribes to more than one Information or Alert Information Service 1410, then the Wrapper 1500 may manage the various Alert Messages through a Mailbox Module 1520. The Mailbox Module 1520 can store alerts from different MAN services 1000.

In an example, a subscriber of several MAN services may be driving home. Her Traffic MAN service may broadcast a Traffic Alert Message regarding an accident ahead. The Wrapper Alert Message Manager 1510 may identify the Traffic Alert Message, lift it from the SMS queue, attach the highest priority "1" to it, and present it in a Push-To-Talk format to the subscriber. The subscriber may choose to respond to the Traffic Alert Message by asking for more information regarding the accident.

During this transaction, her Financial MAN service may send a Financial Alert Message regarding the closing prices of her stocks. The Wrapper Alert Message Manager 1510 may again identify the Financial Alert Message, lift it from the SMS queue, but attach to it a priority "3", e.g. based on the initial setup of the Mailbox Manager 1520 by the subscriber. Therefore, while the subscriber is processing the Traffic Alert Message, the wrapper may store the Financial Alert Message in a Financial mailbox 1520-2. The Wrapper Mailbox Manager 1520 may present the content of the Financial Mailbox 1520-2 after the traffic-related transaction has ended.

In another example, the subscriber can be making an actual phone call when a new Alert Message is received. The Wrapper Mailbox Manager 1520 may then store the Alert Message in the corresponding Mailbox and present it after the phone call is finished. Or, if some Alert Messages are given higher priority than phone calls, the Wrapper Mailbox Manager 1520 may even interrupt the phone call and present the Alert Message. This may occur e.g. if the subscriber is making a long personal call, and the phone receives an emergency type E911 Alert Message about a radioactive spill on the road ahead.

The Wrapper Applications Manager 1530 may be able to review the applications on board, communicate with the central servers of the MAN service and report the versions of the applications, and if newer versions are available, then reach out and locate the newer version, download them onto the phone, unpack the download and update the applications by installing the newer version.

In an example, if the subscriber has a game on board, the Wrapper Applications Manager 1530 may be notified by the game's provider that a newer version is available. Then the Wrapper 1500 may proceed and download the newer version of the game and install it on board.

The Wrapper Subscription Manager 1540 may be able to manage the different subscriptions associated with the applications on board and the Alert Messages. E.g. some of the applications may have a fixed time-period license, or the updates may require payments. Some of the Alert Message Information Service providers 1410, such as the Financial Alert Message Service, may also require fees, e.g. on a periodical basis. The Wrapper Subscription Manager 1540 can manage these obligations.

The Wrapper Data Storage Manager 1550 may manage all storage functions required by the various applications. E.g. some Alert Message Service Providers may wish to enhance the impact of their Alert Message, or subsequent promotion message by sound effects. The service can be accelerated if these sound effects are already stored on board. In some cases the Data Storage Manager 1550 may organize the over-writing of stored data, if that data is out of date.

In an example, an Entertainment Alert Service provider may play a theme song, which was stored on board before presenting the actual message of surplus theatre tickets being available. Or, a Financial Alert Service provider may start its message by a stock phrase announced by Donald Trump, pre-recorded and stored on board.

While in some embodiments the Alert Message maybe transmitted within an SMS protocol, in other embodiments the Simple Mail Transfer Protocol (SMTP) can be used. This can be of importance as in some countries and in some situations it is increasingly difficult or even illegal, to charge a fee for SMS transmissions. Further, in some areas in the United States, the SMS response time of the big carriers may slow down substantially e.g. in peak traffic hours, or after a sports game, in some cases to tens of seconds. Finally, the SMTP is compatible with the recently introduced 3GPP protocol, supporting extremely fast response times. The above considerations underline that systems using the SMTP protocol can be quite effective in supporting high speed communications, and thus can be used to implement the Alert Messaging system.

In implementations which use SMTP protocols instead of SMS protocols, the Wrapper 1500 may be able to pull and activate the Alert Message which arrived in an email format, and process it with highest priority. This is a departure from established mail protocol, which typically requires the email recipient to actively pull up or acknowledge the receipt of the email.

Figure 20:
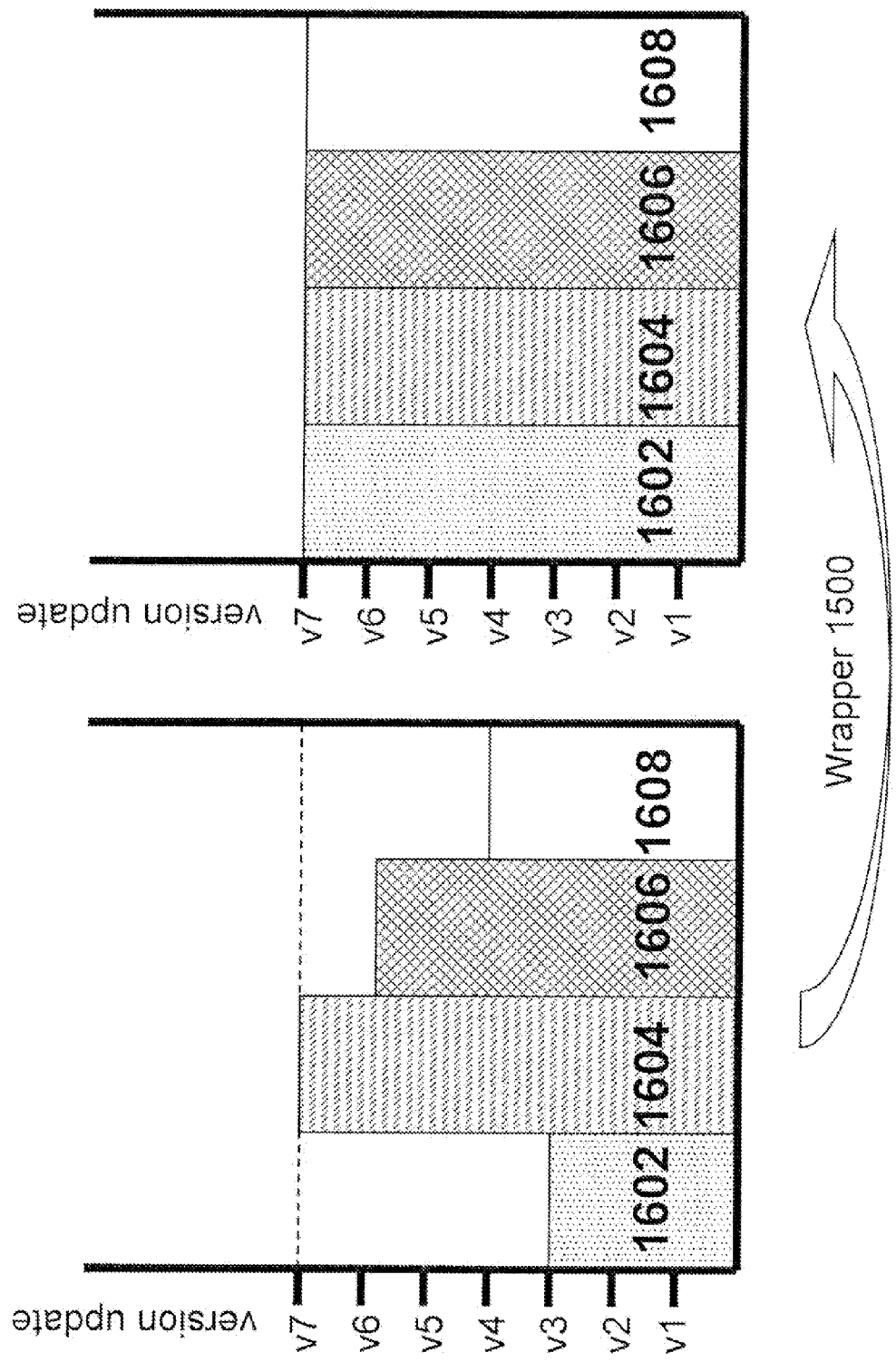
FIG. 20 illustrates an updating function of the Wrapper.

FIG. 20 illustrates the updating function of the Wrapper 1500. The columns 1602-1608 represent four applications, which are required to properly display a multimedia message (MMM), in response to the subscriber requesting more information regarding the promotion. In an example, the subscriber may wish to see a trailer or preview of a show in a MMM format, for which discount tickets are being offered. Displaying this MMM message may require the most recent version of a video player, such as version 7 of the Flash or Shockwave video players. Other applications may include the Communication Protocol (CP), the Real Time Text Protocol (RTTP), or the QCP for the ring tones. In typical situations these sub-applications operate over the Operating System (OS), which itself may need updating.

The dotted line indicates the case when properly displaying a requested MMM requires that the handset has version 7 of all the applications, players, plug-ins and protocols. Of course, in many cases, the latest versions have different version numbers.

The Wrapper 1500 may profile the handset and determine which versions of the applications are installed on board. In the present example, version 3 of the application 1602, version 7 of application 1604, version 6 of application 1606 and version 4 of application 1608 is on board.

After this profiling step, Wrapper 1500 may reach out to the MAN service provider or the regular Carrier Network, locate version 7 of the applications in need of updating, i.e. 1602, 1604, and 1608, and download and install version 7 of the identified applications on the handset.

Some cell phones may not have the proper hardware for the MAN service 1000. Thus, even downloading the required software may not prepare the phone for processing the MMM properly.

In fact, many phones simply do not have a speakerphone. In these phones implementing either the PTT-based MAN service 1000, or even the PTT Equivalent (PTTE) service can be a challenge. Some implementations can solve this problem by the Wrapper 1500 profiling the hardware of the handset as well, e.g. concluding that no speakerphone is available, then locate an application on the internet which can modify the ring-tone generation of the handset. Downloading and installing the ring-tone modifying application may create a functionality with which the phone is capable of alerting its subscriber to the receipt of an Alert Message through the modified ring-tone, even if no proper speakerphone hardware is on board.

Some implementations of the Alert Client 1460 and the Wrapper 1500 may be as short as 32 kbyte. The power consumption of e.g. the Alert Client 1460 can be further reduced in some implementations. The phone may be equipped with a motion or acceleration sensor. The subscriber may spend most of the day in an office and thus may have little or no interest in traffic conditions. In such setups of the service, the power consumption may be reduced by switching off the Alert Client 1460 completely as long as the motion or acceleration sensor does not sense a (sufficiently strong) motion or acceleration.

When the subscriber starts to go home, the motion or acceleration sensor may sense a sufficiently fast movement or acceleration. In response, it may wake up the Alert Client 1460 so that it can start receiving traffic related messages. In other embodiments, the waking up of the Alert Client 1460 may be programmed according to the time of the day, e.g. waking up the Alert Client at 4:30 pm, if the subscriber typically leaves the office at 5 pm. Then the Alert Client 1460 may receive the message about a traffic jam blocking the main route homes in time so as to advise the subscriber to choose an alternate route instead.

As illustrated in FIG. 18, the interaction of the Broadcast Module 1430 and the Alert Clients 1460 can be of the "push-pull" type. The Broadcast Module 1430 sending the Alert Message is an initial push step. The Alert Client 1460 can then respond by pulling more information from the Broadcast Module 1430.

Implementations of the "pull" step can be prompted by the subscriber in response to Alert Message portion 1330a-b. In the traffic example, the subscriber is invited to press 5 to get a promotion. In the example of FIG. 6, this corresponds to the step 132 of "offering sponsored information". In either case, the subscriber may choose to press 5, which prompts the Alert Client 1460 to pull additional sponsored information to the handset from the Broadcast Module 1430.

The additional sponsored information can be of a wide variety. It can be a multimedia message, a webpage uploading on the handset via IP/WAP, a more detailed representation of the offer, an image of a coupon which can be redeemed, or a barcode.

Some embodiments of the system may be practiced in relation to personal digital assistants (PDAs) or other integrated mobile devices, e.g. devices which have navigational/GPS capabilities.

Once the promotional multimedia message is retrieved or downloaded on the handset, the Alert Client 1460 may play it without further intervention by the subscriber.

The downloaded additional information can be simply more information, such as providing a map to the location of the Promotional Agent 1440. However, in many implementations, the additional download can involve a commercial transaction. These implementations include urban MAN services 1000, e.g. in large metropolitan areas alerting subscribers if a show in a nearby theater has unsold tickets available at reduced prices. In such implementations, the subscriber may want to initiate a commercial transaction in response, such as buy the offered tickets.

Commercial transactions may require authorization and billing procedures. The billing procedures can be managed through Billing Module 1480, which can be in communication with Broadcast Module 1430 and Promotional Agent 1440, as shown in FIGS. 17-18.

In some existing systems, a manager of mobile commercial transactions needs to get an authorization from the Carrier Network which provides the actual network services, from another Carrier Network which manages the account of the subscriber who initiated the purchase, from the Vendor, who is offering the product for sale, and the involved SMS Aggregator. Getting the authorization of the purchase from all these parties may pose considerable challenges.

In some implementation of the MAN service 1000 the authorization may be much simpler. (i) Since in the implementation of FIG. 15 the MAN service provider can offer its service in parallel to the SMS Aggregator, the authorization of the SMS Aggregator may not be needed. (ii) Second, the subscriber may set up an account with the MAN service provider itself, and thus there may be no need to reach out to the Carrier Network supervising the account of the subscriber to get another authorization. (iii) As mentioned above, from a regulatory point of view it is increasingly difficult to charge users for SMS messages. Implementations of the MAN service can overcome this regulatory problem by using the SMTP protocol instead of the SMS protocol, for which no such regulations exist at present. All in all, implementations of the present MAN service 1000 may not be burdened with Mobile Origination fees and time consuming billing authorizations, accelerating the performance of the service.

Agents of promotional campaigns often desire to track the addressee's response to the campaign. However, tracking systems face multiple challenges. Carrier Networks do not provide "guarantee of service", i.e. the delivery of SMS messages. Instead, today's standard is referred to as "best effort", i.e. the Carrier Network makes a reasonable effort to deliver the SMS, but not more. The challenges include the following. (i) lithe driver's handset started to receive an SMS message, but then the car drives into a tunnel while receiving the SMS, the Carrier Network may not even know that the SMS was never properly delivered. (ii) Some Carrier Networks will retry sending an SMS if an initial attempt to deliver it failed. However, the eventually successful delivery may take place only hours later. Since many of the promotional offers are time sensitive, such delays reduce the value of the promotional service. E.g. letting a subscriber know at 9 pm that there were reduced price tickets available for an 8 pm show is of little value. (iii) The Promotional Agents also may desire to know that even if the SMS arrived properly, did the subscriber actually request, or pull, the more detailed information. An Agent can be keenly interested to know what percent of targeted users actually pull the more detailed information, such as the photos of the new, deep-dish Domino's pizza, offered at reduced rates. (iv) The Promotional Agents also may desire to know that of those subscribers, who pulled more extensive MMM promotional information, which did place an order, such as actually buy the tickets for a show after having viewed a trailer.

Implementations include a logger application 1600, which can carry out one or more of the above reporting functions. The logger application 1600 may be deployed dominantly or exclusively on the handsets. Other embodiments of the logger 1600 may cooperate more extensively with supervisory applications sitting on the servers of the MAN service provider. In most embodiments, the MAN servers can summarize the reports coming in from the large number of logger applications, reporting the operations of the individual handsets. These MAN servers can perform a large variety of post-processing, collating, tabulating and analyzing the reports. Eventually, the MAN servers can communicate these metrics, i.e. the summary and analysis of the reports to the Promotional Agents 1440, such as the Alert Area Vendors 1442. These metrics can also be used in setting prices, revenue-splitting percentages in future contracts, and the share of Carriers etc.

Figure 21:
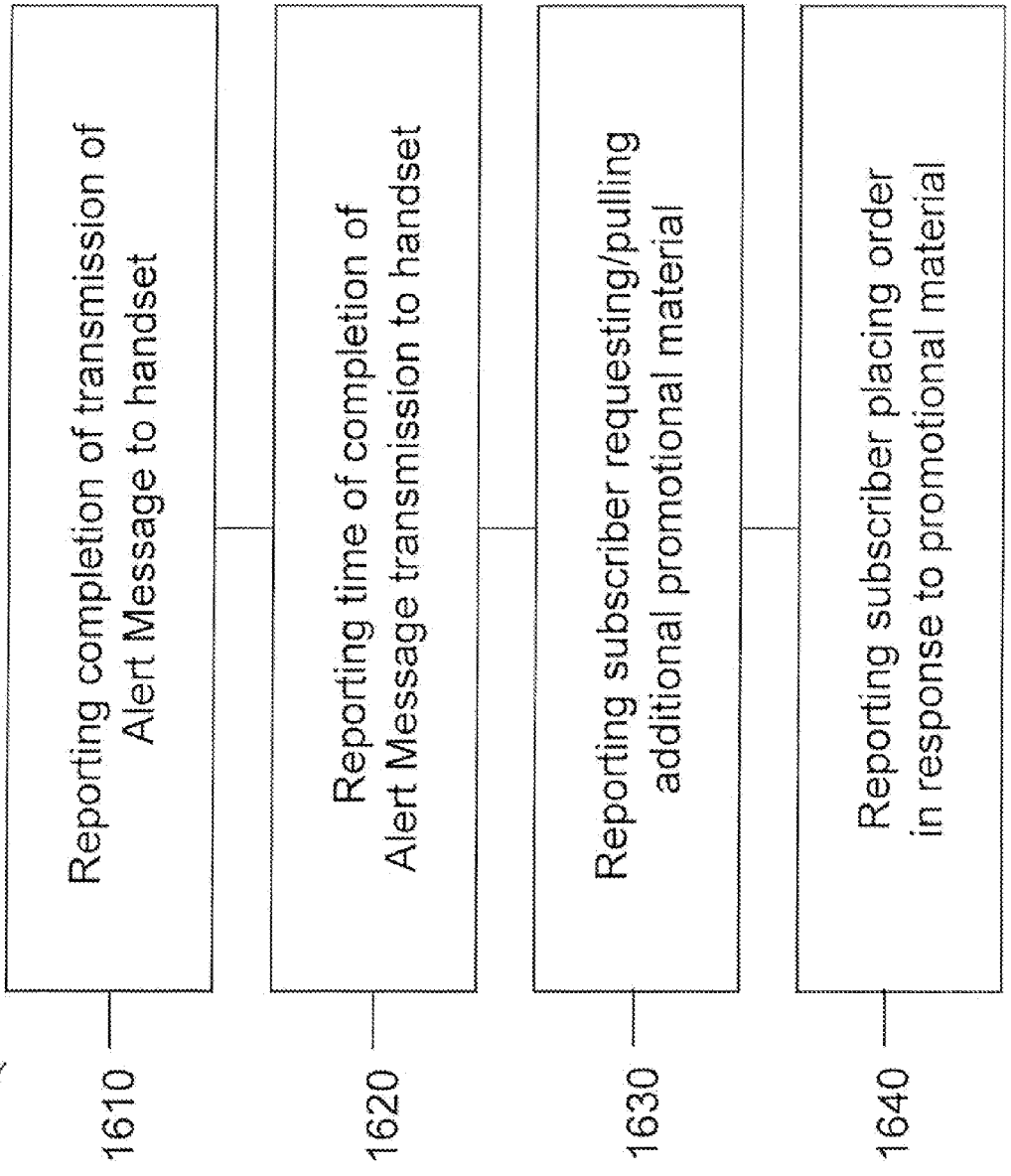
FIG. 21 illustrates a Logger 1600.

FIG. 21 illustrates that step 1610 of the Logger 1600 may record and report that the transmission of the Alert Message has been completed.

Step 1620 may include the Logger 1600 recording and reporting the time when the transmission of the Alert Message was completed.

Step 1630 may include the Logger 1600 recording and reporting that, in response to the Alert Message offering additional promotional material, the subscriber actually requested, or pulled the available promotional material.

Step 1640 may include the Logger 1600 recording and reporting that the subscriber placed an actual order in response to the promotional message.

In various embodiments different billing steps may be associated with the different reports of the Logger 1600. E.g.

a Promotion Agent may be billed an increasing fee depending on whether the report regarding steps 1610-1640 was positive. In some implementations a base fee can be billed if only the Alert Message was transmitted, a higher fee ilk was transmitted on time, an even higher fee if the subscriber pulled the additional information, and a premium fee, if the subscriber actually placed an order.

The Logger 1600 application can contain monitoring components to carry out these steps on board the handset. The monitored events can then be recorded either on board of the handset, or reported back to the servers of the MAN service, which record them. The reporting can be done either immediately or after some collecting and buffering. Different embodiments have different portions of the Logger applications deployed on board and in a centralized manner.

Figure 22:
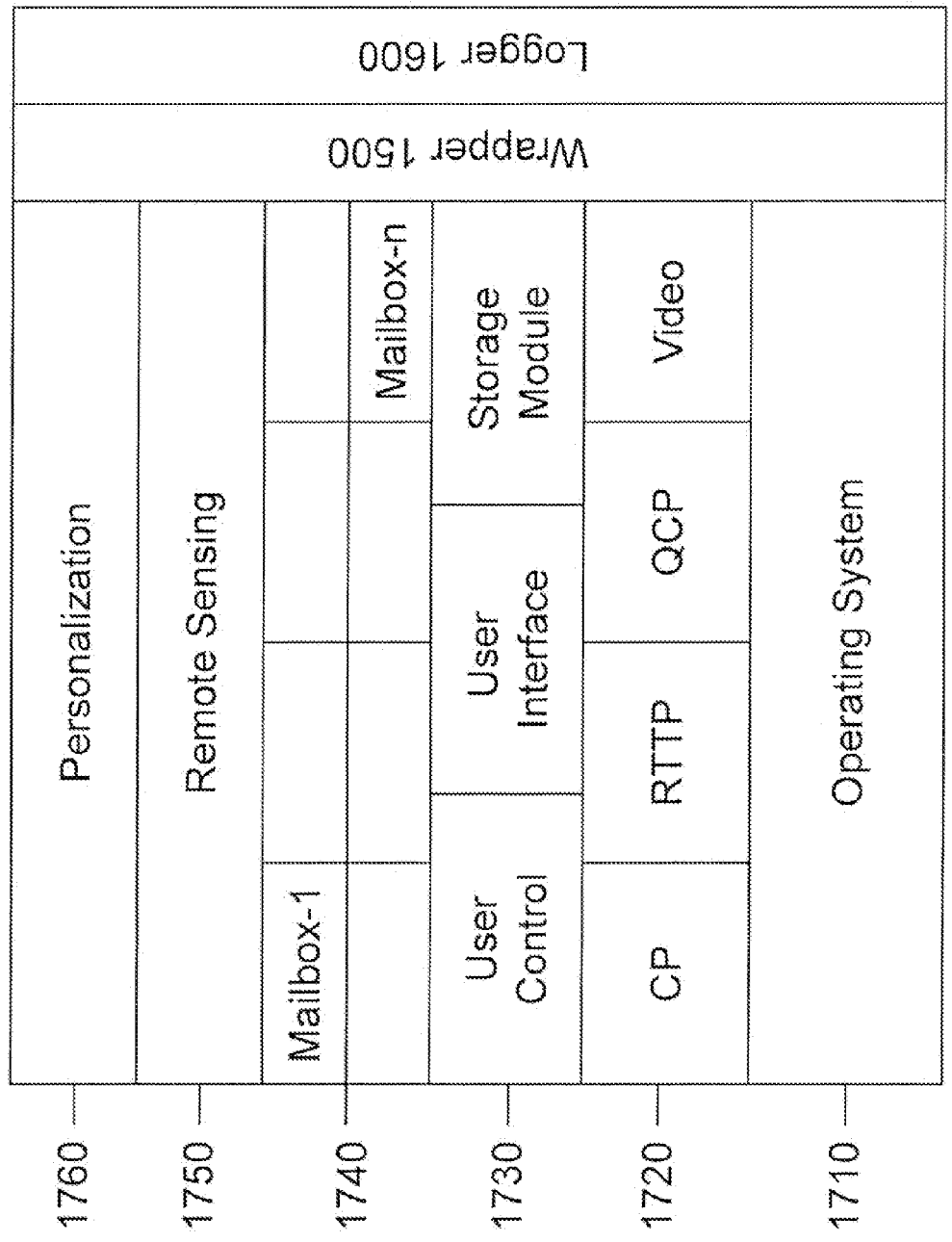
FIG. 22 illustrates an Alert Client 1700.

FIG. 22 illustrates a specific Alert Client 1700 including various modules as an example of Alert Client 1460.

An Alert Client 1700 may include an Operating System 1710, underlying most of its specific operations.

There can be numerous specific applications 1720 deployed over the Operating System 1710. Such applications were discussed in relation to FIG. 20, and may include: a Communication Protocol (CP), a Real Time Text Protocol (RTTP), a QCP for the ring tones, various Video players, among others.

Various controls and interfaces can be on board as well. These controls 1730 may include User Controls, e.g. mapping keys to request functions: such as promoting a key to a hot key linking it to a website to request MMM related to the promotions. A Storage Module may be present e.g. to store promotional materials, such as a downloaded barcode. Such storage modules may have a rolling erase function. Finally, a User Interface may facilitate e.g. the display of the downloaded bar code for swiping fore redemption.

Mailbox Module 1740 and its various functions have been described earlier. In various configurations the Mailbox Module 1740 can be part of the Wrapper 1500, as described earlier.

The Remote Sensing module 1750 offers numerous options. These include the provider of the MAN service 1000 being able to sense remotely the applications and modules on board and initiate their updating, if necessary. Such an updating may be performed on a module-by-module basis. The Remote Sensing Module 1750 may cooperate with the Wrapper 1500. Both of these modules may profile the handset, report the result of the profiling and take action, such as updating modules on board. Some of their functions can be different though. The Remote Sensing Module 1750 can be activated and controlled primarily front outside, such as under the control of the MAN service provider. For this reason, some subscribers may be reluctant to authorize such an expressly remote controlled Sensing Module. In contrast, the Wrapper 1500 may be a more sovereign module. When the subscriber wishes to download an MMM, the Wrapper 1500 may, on its own, review the level of updates, necessary for displaying the MMM, compare this level to the level available on board, and initiate the necessary module updates. These steps are performed by the Wrapper 1500 on its own control, without centralized commands.

Some Alert Clients 1700 may have room for personalized modules 1760 as well.

As described earlier, some or all of these modules 1710-1760 may be accessible to or even integrated with the Wrapper 1500 and Logger 1600 Modules. The Wrapper 1500 may perform the just described updating and managing functions on any of the modules. It can also impact or even override the applications which manage the SMS queues, such as the RTTP module, as described above.

The Logger 1600 may report to central MAN servers on the actions of any of the modules, e.g. in relation to a promotional message or commercial transaction. In an example, the Logger 1600 may record and report the actions of the SMS manager whether the reception of an Alert Message was properly completed. Or, the Logger 1600 may record and report whether the user engaged the User Interface to pull/request the additional promotional material. Or, the Logger may record and report whether the user actually purchased a promotional barcode and stored it in the Promotion Storage module.

Some of the above implementations described the handset side of the overall implementations.

Implementations of the MAN service 1000 also include web-based interfaces or platforms for the Promotional Agents 1440. Such an interface may offer a wide variety of choices for a Promotional Agent 1440, such as an Alert Area Vendor 1442.

Figure 23:
FIG. 23 illustrates a Campaign Interface 1800.

FIG. 23 illustrates such a web-based Campaign Interface 1800. A Participating Vendor may use such a Campaign Interface 1800 to publish various campaign items.

In module 1810 the Participating Vendor may specify the Type of Alert Messages he/she wishes to associate his/her promotions. In an example, an indoor skydiving venture along highway 80 may want to broadcast promotional offers in case of a traffic jam occurring between exits 35 and 40. Or a sports-equipment manufacturer may want to broadcast a promotional offer whenever the ballgame comes to a close at the nearby ballpark.

Since different Alert Information come from different Alert Information Services 1410, the MAN service 1000 can act as a middle-man to facilitate a contract between the Participating Vendor and the Alert Information Services 1410.

In module 1820 the details of the Promotional Offer may be specified, such as the percent reduction in price of sports memorabilia after a lost game, or a barcode or coupon to be downloaded for a show in a nearby theatre, etc.

In module 1830 the Participating Vendor may specify the location aspects of the Promotional Offer, such as the location of the store to go to, the location of the theatre of the show, etc.

In module 1840 the Participating Vendor may specify other logistics of the campaign, such as the duration of the Offer. Examples include until the traffic jam lasts, until the last ticket of the theatre show is sold, etc.

In module 1850 the Billing Arrangements are worked out, possibly in an interactive manner. The Participating Vendor may publish the desired campaign items 1810-1840 on the Campaign Interface 1800. In response, the MAN service provider may relay to the Participating Vendor that e.g. the Traffic Alert Information Service Sky Platform 1412 is willing to provide the requested traffic alert information for a 30% split on all associated revenues in the requested stretch of exits 35-40, or for a fixed fee per Alert Message. Or that the local sports channel is only willing to provide Sports Alert Information Services for a Participating Sports Bar owner at a premium because the stadium did not fill up yet, etc. The MAN service provider also may report what cut the Carrier Network is asking. In response, the Participating Vendor may change some of the campaign items, such as the duration of the campaign, in order to publish a final campaign within its target budget.

The Reporting Module 1860 can provide feedback to the Vendor how the campaign is going. The Reporting Module 1860 can have graphics and statistical displays about the number of users who were reached by the Alert Message, the number of people who requested additional promotional material, and the number of people who actually realized a commercial transaction. This information is primarily assembled by the MAN service center from the reports of the individual Loggers 1600.

All of the above functions can be facilitated and managed by the MAN System Manager 1900, deployed on MAN servers.

Figure 24:
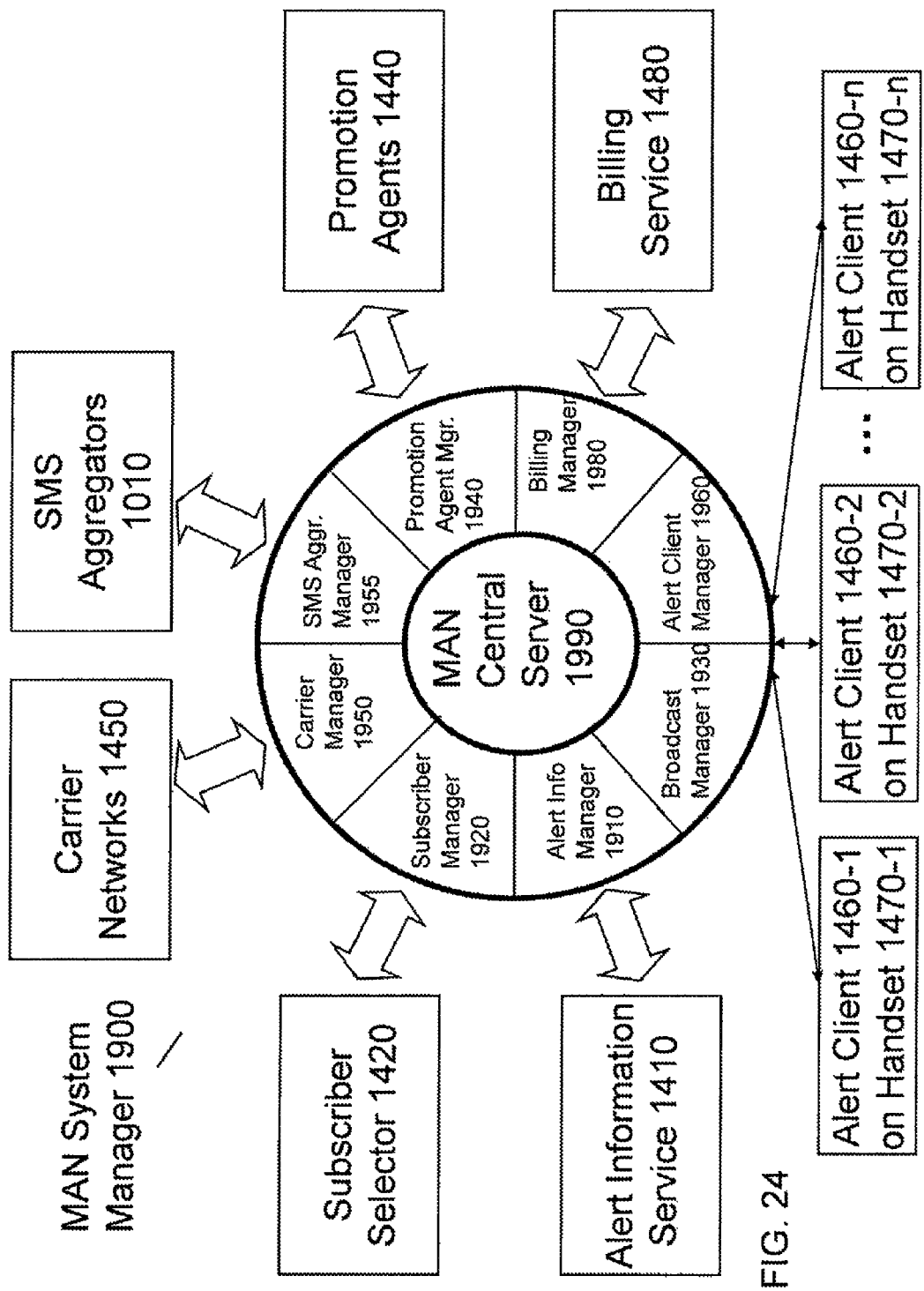
FIG. 24 illustrates a MAN System Manager 1900.

FIG. 24 illustrates that the MAN System Manager 1900 may include the following Managers:
Alert Information Manager 1910,
Subscriber Manager 1920,
Broadcast Manager 1930,
Promotion Agent Manager 1940,
Carrier Manager 1950,
SMS Aggregator Manager 1955,
Alert Client Manager 1960, and
Billing Manager 1980.

These MAN Managers 1910-1980 of the MAN System Manager 1900 can be deployed in Central Servers 1990 of the MAN System 1400. In some cases there is a single MAN Central server 1990, in others a hierarchical or flat network of MAN Central Servers 1990-1 . . . n.

One of the functions of the MAN System Manager 1900 is to facilitate, oversee and manage the operations of the corresponding modules of the MAN System 1400, as described in FIGS. 14-23. As such, the functions and the operation of the MAN Managers 1910-1980 can be well understood from the description of the operation of the earlier-described corresponding MAN System Modules 1410-1480, in relation to FIGS. 14-23. Therefore, the above functions and operations of the modules will not be repeated here. Instead, an example will be given to illustrate the cooperation oldie central MAN Managers 1910-1980 with the MAN System Modules 1410-1480, Clients, Applications and Interfaces of the MAN system.

For example, Alert Client Manager 1960 can be configured to communicate with the Alert Clients 1460-1 . . . n on board of the handsets 1470-1 . . . n. Also, the Alert Client Manager 1960 can work together with the individual Wrappers 1500-1 . . . n on board of the handsets 1470-1 . . . n to carry out their functions. These functions were described in relation to FIGS. 19-22 and include Managing Alert Messages, Managing Mailboxes, Managing On-board Application, Managing Subscriptions, Managing Storage and Personalization.

For example, the Wrapper 1500 on handset 1470-42 may profile its host handset 1470-42, and recognize that the RTTP has on old version on board. Then Wrapper 1500-42 may communicate with the Alert Client Manager 1960 to request a new version of RTTP. The Alert Client Manager 1960 may reach out and acquire the latest version of the RTTP, communicate with Wrapper 1500-42 and these two modules may cooperate to download the new version of the RTTP on the handset 1470-42.

The Alert Client Manager 1960 may also cooperate with the individual Loggers 1600-1 . . . n on board. This cooperation can include receiving and recording the reports from the Loggers 1600-1 . . . n from the handsets, including the successful completion of the reception of the Alert Messages, the subsequent pulling of promotional messages, and the completion of actual commercial transactions. The Alert Client Manager 1960 may collect these reports from the individual Loggers 1600-1 . . . n, collect, archive, process, organize, and analyze them. The result of such an analysis can be conveyed e.g. to the Promotional Agents 1440, e.g. through the Campaign Interfaces 1800.

These were only examples, to illustrate the possible cooperation between the MAN Managers 1910-1980 with the individual MAN System Modules 1410-1480. In a particular embodiment, various elements may not be installed, or may be connected differently.

Finally, a Sensor Array-based Mobile Broadcast Alert (SAMBA) service 2000 and corresponding SAMBA system 2400 will be described.

Figure 25:
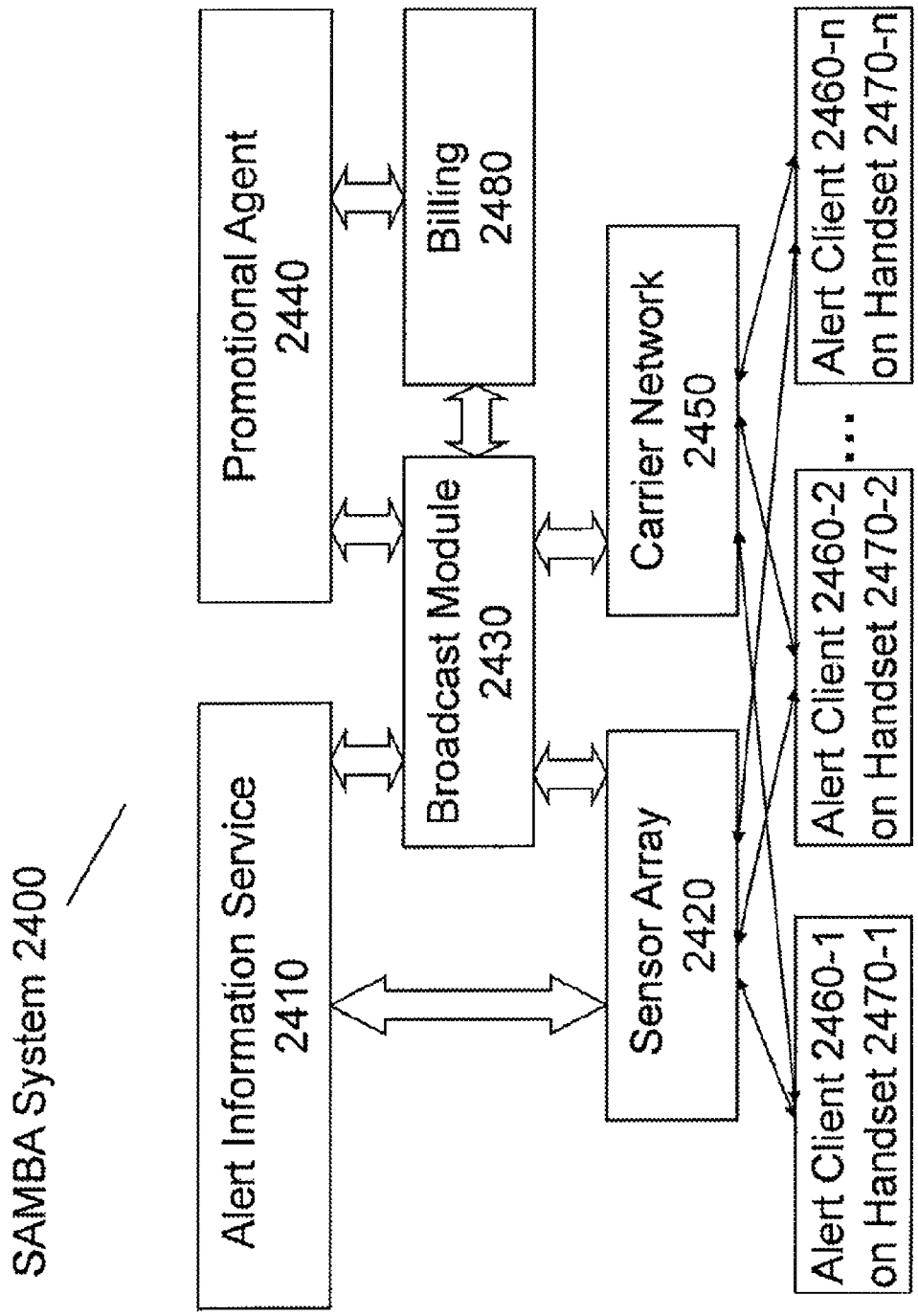
FIG. 25 illustrates a SAMBA system 2400.

FIG. 25 illustrates that the SAMBA system 2400 has many components which are analogous to those of the MAN System 1400 of FIG. 17. The SAMBA System Modules 2410-2480, which are analogously numbered as the MAN System Modules 1410-1480 of FIG. 17, have analogous functions and will not be described again. Blocks and modules, which were described in FIGS. 14-24 as analogous to those in FIG. 17 are also within the scope of the equivalently numbered SAMBA System Modules 2410-2480.

Figure 26:
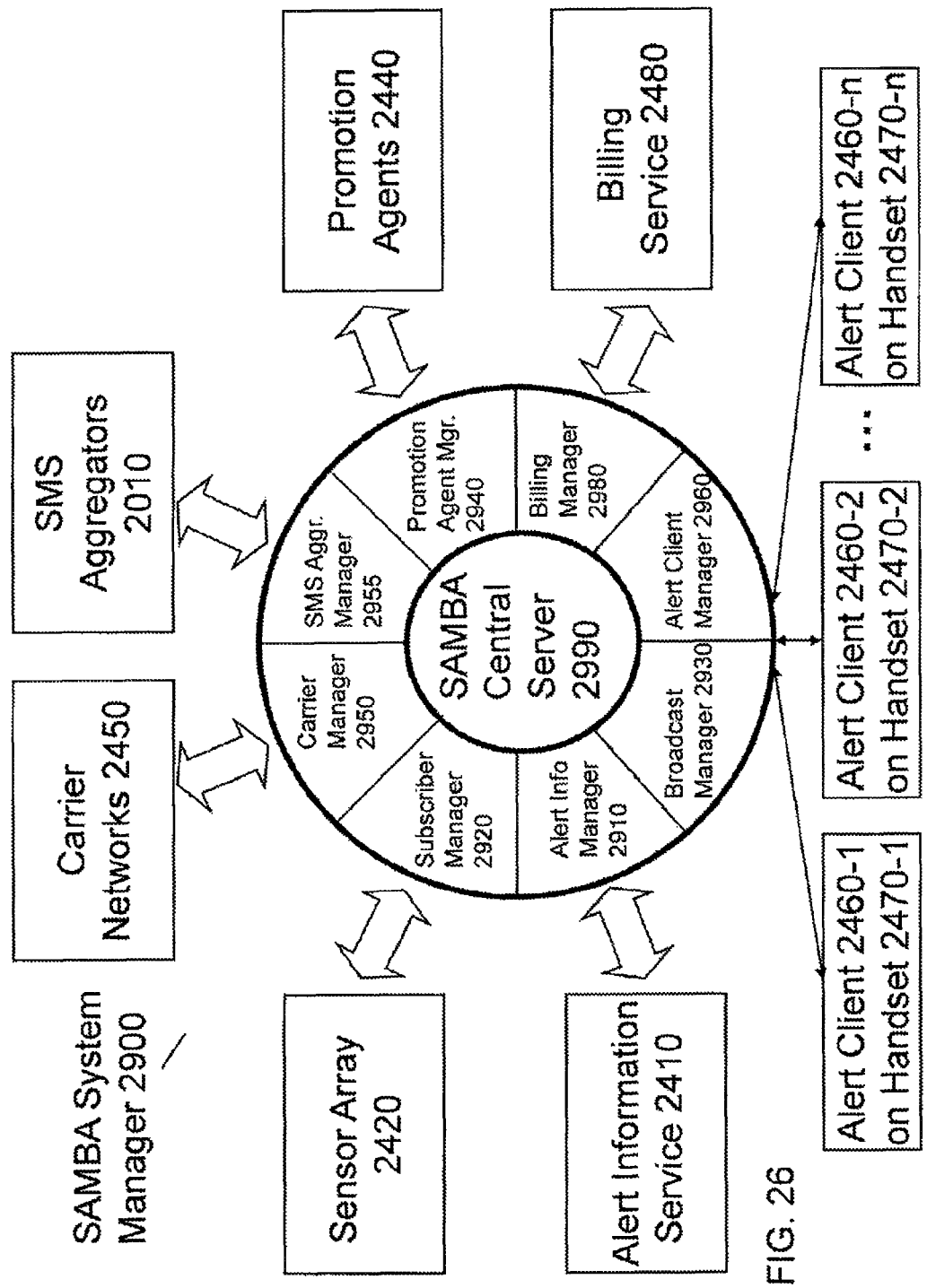
FIG. 26 illustrates a SAMBA System Manager 2900.

FIG. 26 illustrates that a SAMBA System Manager 2900 may include the following SAMBA Managers 2910-2980, deployed in a SAMBA Central Server 2990:
Alert Information Manager 2910,
Subscriber Manager 2920,
Broadcast Manager 2930,
Promotion Manager 2940,
Carrier Manager 2950,
SMS Aggregator Manager 2955,
Alert Client Manager 2960, and
Billing Manager 2980.

The functions of the SAMBA Managers 2910-2980 are analogous to those of the MAN Managers 1910-1980, described in relation to FIGS. 14-24 and will not be repeated here.

Some of the differences from the MAN system 1400 include that the SAMBA System 2400 may locate and select subscribers differently than Subscriber Selector module 1420 of the MAN system 1400. The location of the subscribers may not be determined by collecting Cell Tower data, as in some of the other implementations of the MAN System 1400.

Figure 27:
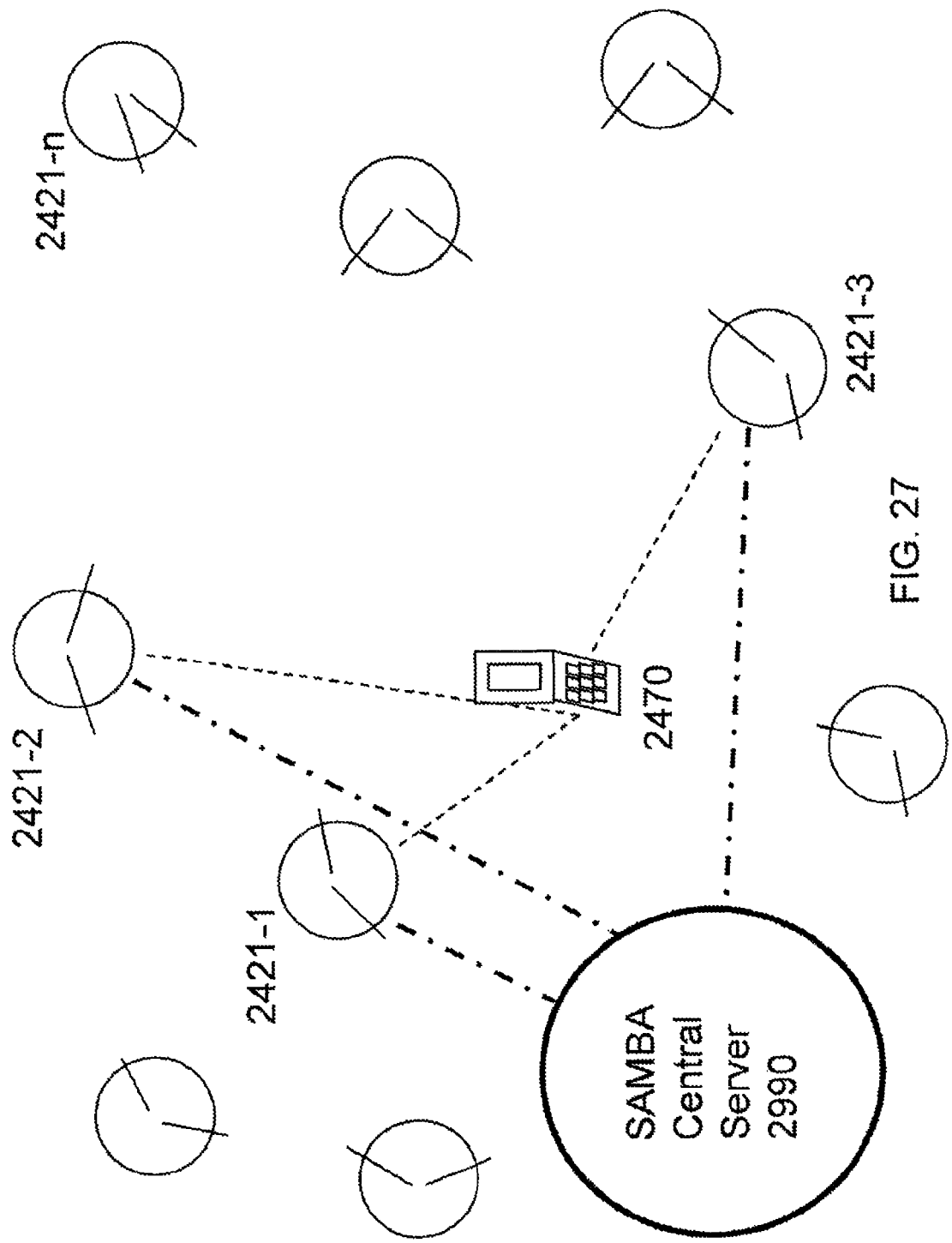
FIG. 27 illustrates a Sensor Array.

FIG. 27 illustrates that, instead of the subscriber selector 1420, the SAMBA System 2400 may acquire location information using a specialized Sensor Array 2420. The Sensor Array 2420 may contain a large number of sensors 2421-1 . . . n, whose functionalities include receiving broadcasts from cell phones and processing the received information. Such sensor arrays 2420 can be e.g. an array of the sensors manufactured by Air-Patrol Corp. The two rays on the individual sensors indicate the spatial angles or reception. These sensors, or antennae, can be configured to be able to receive signals from the full spatial angle, or from a limited spatial angle. They can be installed in areas of greater interest, which have a higher density of subscribers. Areas of installments may include: major traffic intersections, commuting routes leading in and out from metropolitan centers which are known to develop traffic jams and other problems, high density entertainment areas, such as Disneyland, the Strip in Las Vegas, the highway section at the Nevada state border line, where gaming becomes legal for drivers, the main floor of gaming operations, the theatre district in New York, the vicinity of sports venues, all kinds of educational settings such as college campuses, and airports, among others. Of course, implementations can include any other areas of interest, e.g. corporate environments, high security environments, and federal environments.

Figure 28:
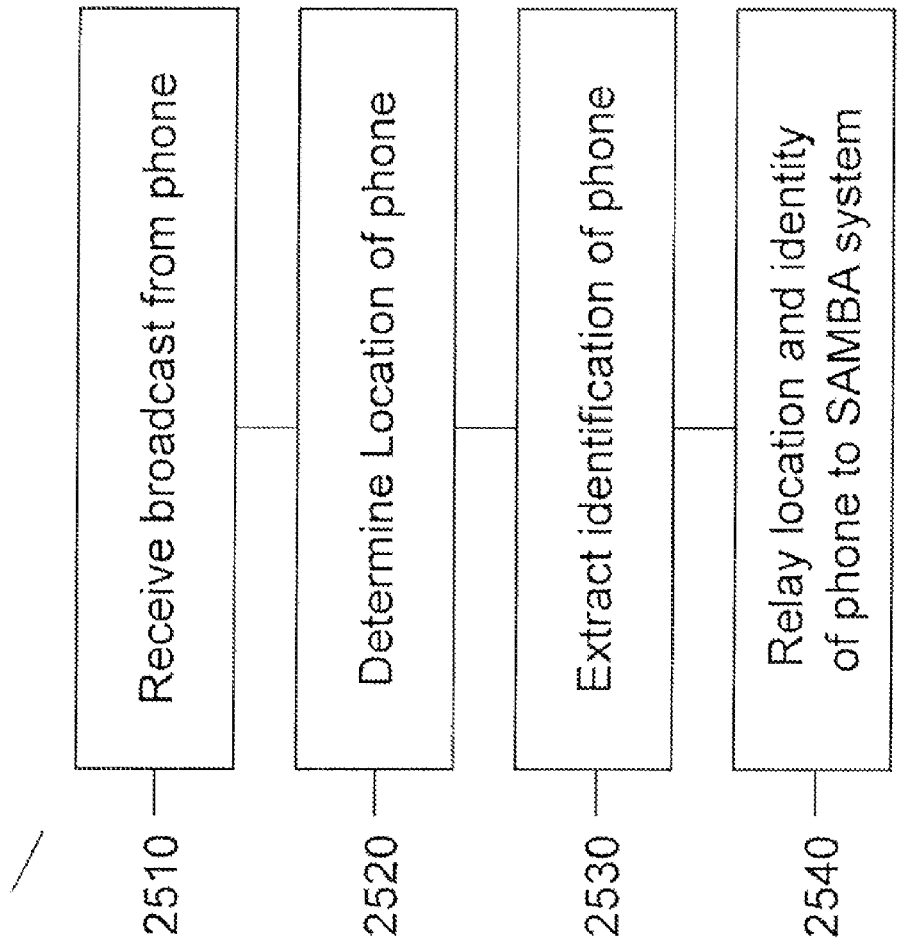
FIG. 28 illustrates a Sensor Array Operation 2500.

FIG. 28 illustrates a Sensor Array Operation 2500.

In step 2510 one or more sensors 2421 can receive a signal of a subscriber mobile phone 2470. The scope of the term "signal" is used very broadly here. It can involve signals of any sorts. Embodiments include signals associated with the phone managing an active phone call, or a data session, or processing SMS traffic. Or the signal can be an induced signal, in response to a ping or tic-tac from an outside source. The signal may even be generated when the phone is in a passive state.

In step 2520 several of the 2421 sensors can cooperate to determine the physical location of the broadcasting phone from the received signal. There are numerous ways to determine the location of the phone based on phone signals, including triangulation, GPS based methods, and more sophisticated techniques. Triangulation can be carried out by applying well known formulae based on wave propagation theory and geometrical relations, applied to the signals received by three sensors. The spatial resolution of a Sensor or Antenna Array manufactured by the Air Patrol Corp. can be of the order of one or few feet.

The embodiments are described here in terms of cell phones. However, the scope of the embodiments is meant to be very general, as explained earlier. The mobile communication device, or handset 1470 or 2470, can be any known mobile communication device, including a mobile telephone, a mobile computer, any communication device capable of sending a will or wimax signal, or any combination of these devices, e.g. a computer equipped with any sort of device making it capable of communicating over any wifi, wimax or other wireless network. It can be any device configured to emit a self-identifying signal. In general, any electronic device configured to operate in conjunction with any kind of mobile communication networks is within the scope of the term "handset", "cell phone", or "mobile communication device".

In step 2530 the identity of the cell phone and the corresponding user is established. This step may require cooperation between the Sensor Array 2420 and the SAMBA Central Servers 2990 and will be described in detail in relation to FIG. 29.

In step 2540 the established location and the identity of the cell phone is forwarded to the SAMBA Central Servers 2990. This location and identity information can be used by the SAMBA Central Servers 2990 in a manner analogous to the MAN Central Servers 1990.

Figure 29:
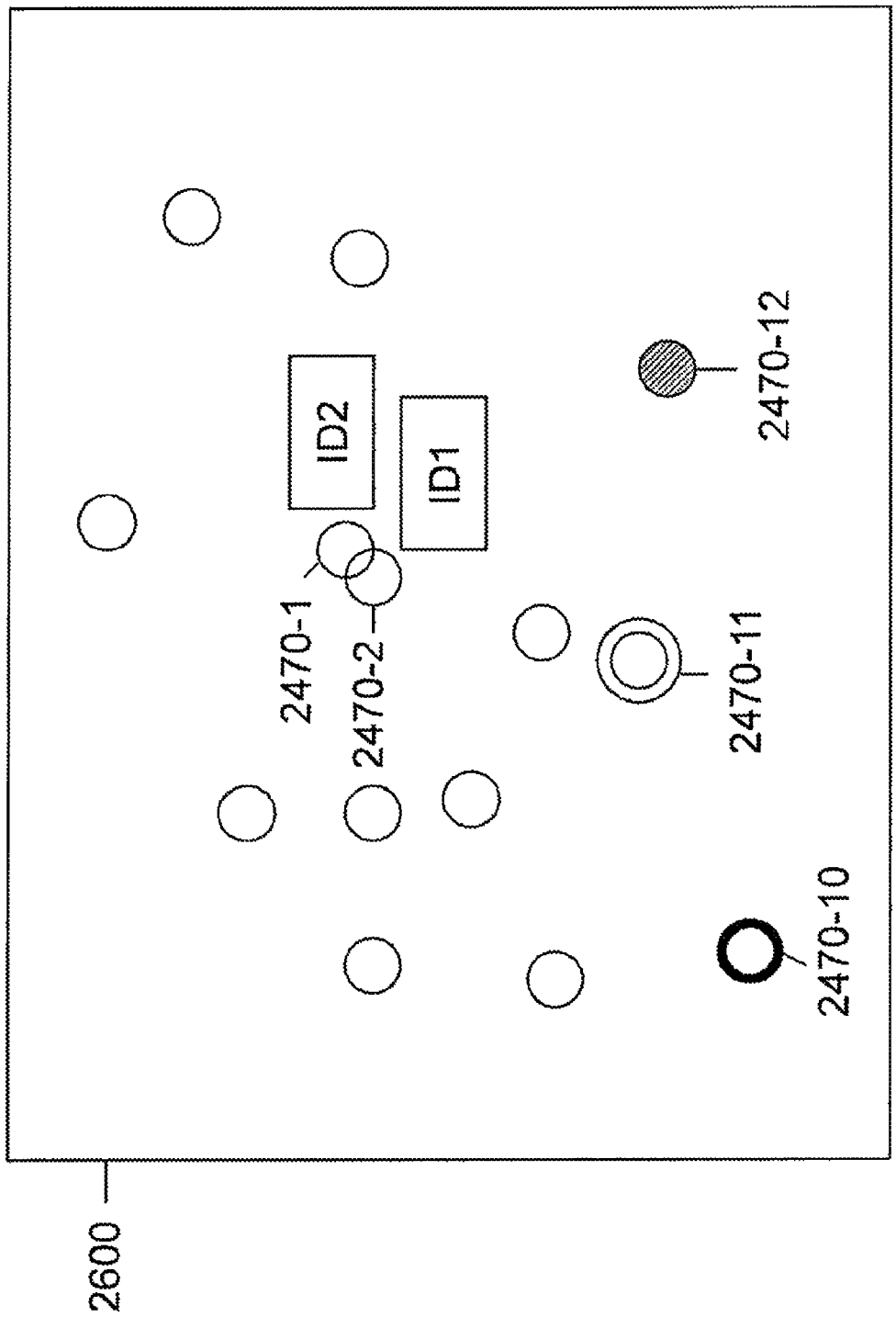
FIG. 29 illustrates a SAMBA Operation Display 2600.

FIG. 29 illustrates a SAMBA Operation Display 2600. The circles represent the locations of individual mobile phones or any other mobile communication devices within a space of operation of the SAMBA System 2400, such as an entertainment venue, a convention center, or a traffic related space, such as an area of a downtown or a busy traffic intersection. Cell phones broadcast their identification information in regular intervals to signal their locations to nearby Cell Towers and to register with these Cell Towers to receive service. In some cases the regular intervals can be in the range of a few seconds to 90 seconds. The sensors 2421 use these cell phone signals to determine the location of the broadcasting cell phone e.g. by triangulation.

In these broadcasts the cell phones relay some of their identification information, so that the Carrier Networks can locate them when an incoming call is trying to reach the phone. This identification information may include the mobile ID, the International Mobile Equipment Identity (IMEI), or any other handset identification information, such as an IMSI or MIN. In some cases this identification information can be a GPS information, which can then be used to establish the MIN (Mobile Identification Number of the phone number of the handset. In some cases the identification information can be any combination of the above.

In principle the triangulation or GPS information can determine the precise location of the cell phone and the broadcast identification information can determine the identity of the cell phone and its user. This information should be sufficient for the operation of the rest of the SAMBA system 2400, such as sending out Alert Messages and promotions to the SAMBA subscribers among the localized and identified users.

For example, in a gaming application, a Sensor Array 2420 can be implemented in a gaming establishment, such as a casino. Patrons may be approached to subscribe e.g. when entering a gaming venue. Once subscribed, the subscribers can be sent an Alert Message that a blackjack table at a specified location became hot or more active, or a betting limit has been raised at blackjack tables in another area of the gaming floor.

In an educational application, a Sensor Array 2420 can be set up on a college campus. The Sensor Array 2420 can track students on campus. Students can subscribe to different services, such as sports event related services, education related services etc. Alert messages can be sent to students who signed up for sport-related services, if there is e.g. a traffic jam around the football stadium. Or an alert message can be sent to students who enrolled in a class in case the class is cancelled, or the field trip starts in a different location. An emergency alert message can be sent to all students if a criminal or violent activity took place on campus, advising the students of unsafe areas, or relaying police instructions.

In yet other implementations, a Sensor Array 2420 may track cell phones without ever decrypting their identification information, only determining their location. Such implementations may be used to track movement of cell phones only. In traffic implementations embodiments may be used to determine only the speed of movement of the phones in an effort to identify traffic jams. In entertainment implementations such embodiments may be used to determine crowd movement patterns, e.g. to map out under-visited areas on a casino floor. In these implementations the identity of the users is never determined, they remain anonymous.

The identification of the users may pose challenges as well. The SAMBA system 2400 may be deployed in settings where the density of the subscribers is high. If two cell phone users walk near each other, close to the resolution limit of the Sensor Array 2420, and the Sensor Array 2420 receives broadcast from both of them, the Sensor Array 2420 may determine the location of two cell phones nearby each other and determine the identity of two cell phones broadcasting from this area, but may incorrectly assign the identities to the two cell phones.

FIG. 29 illustrates a SAMBA Operation Display 2600 of the Sensor Array 2420 displaying the above problem. The SAMBA Operation Display 2600 shows the described situation, when two cell phones 2470-1 and 2470-2 are very close to each other physically. The Sensor Array 2420 may receive their broadcast and extract the two broadcast identification numbers, such as the IMEI, IMSI, MIN or other handset identification information.

However, it remains a challenge to identify which IMEI, IMSI, MIN or other handset identification information belongs to which phone. This problem can be exacerbated by the various system delays, which may introduce as much as 4-5 seconds of delay into the processing of the IMEI, IMSI, MIN or other handset identification information, by which time the patrons and their handsets may have moved a considerable distance from the location determined by the Sensor Array 2420. To address these challenges, some implementations of the SAMBA system 2400 include verification cycles to determine the proper identification.

FIG. 30 illustrates an embodiment of an Identification-Verification Cycle 2700.

In step 2710 new patrons can be given invitations to subscribe/enroll to the SAMBA Service 2000, in exchange of receiving some enticements, such as a certain amount of free service. This invitation may be offered at a controlled location, such as the entrance of a gaming floor. The subscription/enrollment may require sending a text/SMS message to an address. Text/SMS messages include the IMEI, IMSI, MIN or other handset identification information of the sending phone.

In step 2720 the patron can enroll into the SAMBA Service 2000 by texting a message. The Sensor Array 2420 can pick up this message and extract the IMEI, IMSI, MIN or other handset identification information of the enrolling patron.

In step 2730, in response to the text message, the patron may be informed about the details of the SAMBA Service 2000, which lists its advantages as well as informs the patron about the tracking/locating aspect of the service. The patron maybe invited to opt in into the SAMBA Service 2000, having been informed about these tracking features.

In step 2740, the patron may opt in into the SAMBA Service 2000, e.g. by texting "yes" to the previous address.

In step 2750 an Alert Client 2460 may be downloaded onto the patron's handset. There are numerous ways to download a client, e.g. by making a key hot. The patron pressing the hot key can initiate the download without elaborate actions by the patron.

In step 2760 the Alert Client 2460 may report to the SAMBA servers 2990 the phone number or any other identification information of the patron.

In other embodiments of the Identification-Verification cycle 2700 "tic-tac"-ing can be used as well, which can involve interrupting and restarting the various communication channels to the handsets. When the cell phone attempts to restart various connections and reopen the communication channels, such as Internet based connections, it repeatedly broadcasts its IMEI, IMSI, MIN or other handset identification information and/or phone number. These broadcasts can be used to verify the identification information.

During these Identification and Verification Cycles 2700 the IMEI, IMSI, MIN or other handset identification information and phone number maybe transmitted more than once. The steps after the first receipt of the phone numbers serve as verification cycles. This aspect may serve as a safeguard that indeed that patron gets enrolled who opted into the SAMBA service 2000 and not a person nearby who is not interested in benefiting from the SAMBA service 2000.

The phone numbers and IMEI, IMSI, MIN or other handset identification information can be used to develop a database regarding the patrons. Cross-linking the location and identity of the patrons, and recording their movement and commercial activities is of interest to Promotion Agents, and can be the basis of extending the above described MAN and SAMBA services to offer more specific offers to subscribers, where the Promotion Agents may expect a higher level of interest from the subscriber. These analogous and equivalent services are all within the scope of the present application.

Returning to FIG. 29, in some embodiments of the SAMBA Operation Display 2600, different classes or groups of users can be indicated by different symbols, such as symbols with different size, color or other identifier. Handsets 2470-10, -11, -12 illustrate examples of such different symbols. These symbols can correspond to a wide range of customer identifiers. Possible identifiers include any kind of demographic data or data about the purchasing habits of the user. In a gaming implementation these identifiers may reflect the playing habits or playing levels of the user, such as whether he/she is a high roller.

The SAMBA Central Server 2990 may use any kind of data bases to associate these data with the identified users in the described graphic manner. In other embodiments, actual letters, labels or texts can be displayed associated with the symbols. All of these implementations may assist a Promotion Agent 1440 or 2440 to efficiently use the campaign interface 1800 to push out advertisements to the appropriate users which is of high interest for them. Such implementations increase the likelihood of the targeted subscriber initiating a commercial transaction based on the Alert Message or Offer.

In a gaming implementation, the identification-verification cycle 2700 may identify subscribers of the SAMBA service 2000. Then the SAMBA Central Server 2990 may use a data base to identify high rollers among the subscribers. The SAMBA Operation Display 2600 may indicate regular players with a blue symbol and high rollers with a red symbol. A Promotion Agent 2440 may then choose to broadcast different promotion offers to regular players and to high rollers. E.g. the Promotion Agent 2440 may broadcast only to high rollers that a new set of tables have been opened up only for high rollers in a VIP area of a gaming floor.

In an educational implementation students enrolled in different classes may be indicated by different color symbols. In an example, a Promotion Agent 2440 may send out an offer regarding a software update only to students who are enrolled in computer science classes.

While the invention was described in relation to specific embodiments only, these descriptions should not be construed as limiting. On the contrary, these embodiments were provided only by way of illustrations. Any combination of the above examples and all types of inclusions of equivalent embodiments are within the scope of the invention. The invention is only limited by the appended claims.

The invention claimed is:

1. A method comprising:
receiving, on a receive-only sensor array, a signal from a mobile device;
detecting, from the signal received on the receive-only sensor array, contextual parameters associated with the mobile device, wherein the contextual parameters include at least a location associated with the mobile device;
preparing, based on the contextual parameters, a message for the mobile device; and
transmitting, over a network separate from the receive-only sensor array, the message to the mobile device.

2. The method of claim 1, wherein receiving the signal from the mobile device includes receiving a signal broadcast for reception by the network separate from the receive-only sensor array.

3. The method of claim 1, wherein preparing the message includes identifying an event proximate to the location associated with the mobile device.

4. The method of claim 1, wherein detecting the contextual parameters includes determining a unique identifier associated with the mobile device from the signal.

5. The method of claim 4, wherein determining the unique identifier includes identifying a user, registered with a service provider, and assessing data associated with the user.

6. The method of claim 5, wherein preparing the message includes identifying a promotional message based at least in part on the data associated with the user and the location.

7. The method of claim 1, wherein detecting the contextual parameters includes invoking a verification cycle on the mobile device, and receiving a signal indicative of the mobile device running the verification cycle.

8. The method of claim 1, further including receiving, from the mobile device, an opt-in message indicating that a user of the mobile device approves transmission of messages based on the contextual parameters associated with the mobile device.

9. The method of claim 1, further including receiving, on the receive-only sensor array, a plurality of signals from a plurality of mobile devices.

10. The method of claim 9, further including analyzing location information detected from each of the plurality of mobile devices to determine traffic flow within an area covered by the receive-only sensor array.

11. The method of claim 10, wherein preparing the message for the mobile device includes analyzing how the location associated with the mobile device compares to the traffic flow within the area covered by the receive-only sensor array.

12. A system comprising:
   a receive-only sensor array to receive a signal from a mobile device;
   a server communicatively coupled to the receive-only sensor array and at least one other network, the server including:
      an alert information service to detect, from the signal received on the receive-only sensor array, contextual parameters associated with the mobile device, and prepare, based on the contextual parameters, a message for the mobile device; and
      a broadcast module to transmit, over the other network, the message to the mobile device.

13. The system of claim 12, wherein the receive-only sensor array receives the signal from the mobile device, wherein the signal was broadcast for reception by a network separate from the receive-only sensor array.

14. The system of claim 12, wherein the alert information service is to identify an event proximate to the location associated with the mobile device, and include the event within the message for the mobile device.

15. The system of claim 12, wherein the alert information service detects contextual parameters including determining a unique identifier associated with the mobile device from the signal.

16. The system of claim 15, wherein the alert information service identifies, from the unique identifier, a user registered with a service provider, and accesses data associated with the user.

17. The system of claim 16, wherein the alert information service identifies a promotional message based at least in part on the data associated with the user and the location.

18. The system of claim 12, wherein the alert information service receives, from the mobile device, an opt-in message indicating that a user of the mobile device approves transmission of messages based on the contextual parameters associated with the mobile device.

19. The system of claim 12, wherein the receive-only sensor array receives a plurality of signals from a plurality of mobile devices; and
   wherein the alert information service analyzes location information detected from each of the plurality of mobile devices to determine traffic flow within an area covered by the receive-only sensor array.

20. A non-transitory machine-readable storage medium including instructions that, when executed by a machine, cause the machine to:
   receive, on a receive-only sensor array, a signal from a mobile device;
   detect, from the signal received on the receive-only sensor array, contextual parameters associated with the mobile device, wherein the contextual parameters include at least a location associated with the mobile device;
   prepare, based on the contextual parameters, a message for the mobile device; and
   transmit, over a network separate from the receive-only sensor array, the message to the mobile device.

* * * * *